US012490053B2

United States Patent
Volkerink et al.

(10) Patent No.: US 12,490,053 B2
(45) Date of Patent: Dec. 2, 2025

(54) DISTRIBUTED INTELLIGENT SOFTWARE FOR INDUSTRIAL IOT

(71) Applicant: TRACKONOMY SYSTEMS, INC., San Jose, CA (US)

(72) Inventors: Hendrik J. Volkerink, Palo Alto, CA (US); Ajay Khoche, West San Jose, CA (US)

(*) Notice: Subject to any disclaimer, the term of this patent is extended or adjusted under 35 U.S.C. 154(b) by 705 days.

(21) Appl. No.: 17/448,346

(22) Filed: Sep. 21, 2021

(65) Prior Publication Data

US 2022/0095079 A1 Mar. 24, 2022

Related U.S. Application Data

(60) Provisional application No. 63/087,319, filed on Oct. 5, 2020, provisional application No. 63/087,486, filed on Oct. 5, 2020, provisional application No. 63/081,284, filed on Sep. 21, 2020.

(51) Int. Cl.
*H04W 4/029* (2018.01)
*G16Y 20/10* (2020.01)

(52) U.S. Cl.
CPC ............ *H04W 4/029* (2018.02); *G16Y 20/10* (2020.01)

(58) Field of Classification Search
CPC ......... H04W 4/80; H04W 4/70; H04W 4/029; H04W 84/18; H04W 12/75; H04W 8/183; H04W 8/205; H04W 84/20; H04W 4/02; H04W 4/35; H04W 76/14; H04W 4/40; H04W 60/04; H04W 8/005; H04W 4/08; G16Y 20/10; G06Q 10/0833;
(Continued)

(56) References Cited

U.S. PATENT DOCUMENTS

| 5,917,433 A | 6/1999 | Keillor et al. |
| 6,614,392 B2 | 9/2003 | Howard |
| 6,919,803 B2 | 7/2005 | Breed |

(Continued)

FOREIGN PATENT DOCUMENTS

| CA | 3008512 A1 | 12/2019 |
| JP | 2008239282 | 10/2008 |

(Continued)

OTHER PUBLICATIONS

U.S. Appl. No. 10/057,722, filed Aug. 21, 2018, Skaaksrud.

(Continued)

*Primary Examiner* — Diane D Mizrahi
*Assistant Examiner* — Jing Gao

(57) ABSTRACT

A tracking system includes a plurality of tape nodes, each including a battery, a short-range wireless interface, a processor, and a memory storing a liquid operating system (OS) having machine readable instructions that when executed by the processor cause the processor to receiving, within the tape node, a mission defining at least one goal for the tape node, the tape node acting as a master agent of the tracking system to complete each of a plurality of tasks defined by the mission, managing power usage of the battery to complete the mission, the liquid OS delegating the task to another node of the tracking system to reduce power usage; performing a second task received from a second node, the tape node acting as a slave in response to the second task.

20 Claims, 29 Drawing Sheets

(58) Field of Classification Search
CPC .. G06Q 10/087; G06Q 20/20; G06Q 20/3224; G06Q 30/0261; G06Q 30/0269; Y02D 30/70
See application file for complete search history.

(56) References Cited

U.S. PATENT DOCUMENTS

| | | | |
|---|---|---|---|
| 7,009,517 | B2 | 3/2006 | Wood |
| 7,353,259 | B1 | 4/2008 | Bakke |
| 7,427,918 | B2 | 9/2008 | Fano |
| 8,258,953 | B2 | 9/2012 | Stem et al. |
| 8,356,207 | B2 | 1/2013 | Hosek et al. |
| 8,754,748 | B2 | 6/2014 | Orlassino |
| 9,015,071 | B2 | 4/2015 | Breed |
| 9,182,231 | B2 | 11/2015 | Skaaksrud |
| 9,189,226 | B2 | 11/2015 | Driesen et al. |
| 9,767,516 | B1 | 9/2017 | Konrardy et al. |
| 9,799,149 | B2 | 10/2017 | Davidson |
| 9,824,329 | B2 | 11/2017 | Stirling et al. |
| 9,854,556 | B2 | 12/2017 | Skaaksrud et al. |
| 9,860,688 | B2 | 1/2018 | Kulkarni et al. |
| 9,875,459 | B2 | 1/2018 | Altamirano et al. |
| 9,984,350 | B2 | 5/2018 | Skaaksrud |
| 10,674,346 | B2 | 6/2020 | Faccin et al. |
| 11,115,732 | B2 | 9/2021 | Lucrecio et al. |
| 2003/0018927 | A1 | 1/2003 | Gadir et al. |
| 2004/0193467 | A1 | 9/2004 | Williams et al. |
| 2007/0049291 | A1 | 3/2007 | Kim et al. |
| 2007/0095905 | A1 | 5/2007 | Kadaba |
| 2008/0151801 | A1* | 6/2008 | Mizuta ............... H04W 52/46 370/311 |
| 2008/0239282 | A1 | 10/2008 | Zou et al. |
| 2008/0279103 | A1 | 11/2008 | Yong et al. |
| 2009/0147702 | A1 | 6/2009 | Buuhikot et al. |
| 2010/0029268 | A1 | 2/2010 | Myer et al. |
| 2010/0045436 | A1 | 2/2010 | Rinkes |
| 2010/0067420 | A1 | 3/2010 | Twitchell, Jr. |
| 2010/0082870 | A1 | 4/2010 | Tokuhara |
| 2010/0299401 | A1 | 11/2010 | Lloyd |
| 2011/0139871 | A1 | 6/2011 | Yturralde et al. |
| 2013/0070636 | A1 | 3/2013 | Farley et al. |
| 2013/0107770 | A1 | 5/2013 | Marsden et al. |
| 2013/0278412 | A1 | 10/2013 | Kelly et al. |
| 2015/0154531 | A1 | 6/2015 | Skaaksrud |
| 2015/0154538 | A1 | 6/2015 | Skaaksrud |
| 2015/0154544 | A1 | 6/2015 | Skaaksrud |
| 2015/0154554 | A1 | 6/2015 | Skaaksrud |
| 2015/0156747 | A1 | 6/2015 | Skaaksrud et al. |
| 2016/0217399 | A1 | 7/2016 | Roelofs et al. |
| 2016/0233927 | A1 | 8/2016 | Wu |
| 2016/0234104 | A1 | 8/2016 | Hoffmann |
| 2017/0039666 | A1 | 2/2017 | Kuersten et al. |
| 2017/0279892 | A1 | 9/2017 | Skaaksrud |
| 2017/0280297 | A1 | 9/2017 | Skaaksrud |
| 2018/0046964 | A1 | 2/2018 | Leoni et al. |
| 2018/0132183 | A1 | 5/2018 | Gattu |
| 2018/0165568 | A1 | 6/2018 | Khoche |
| 2018/0302807 | A1 | 10/2018 | Chen et al. |
| 2019/0025818 | A1* | 1/2019 | Mattingly ............... H04W 4/46 |
| 2019/0174449 | A1 | 6/2019 | Shan et al. |
| 2019/0179298 | A1 | 6/2019 | Hosek et al. |
| 2019/0215729 | A1 | 7/2019 | Oyman et al. |
| 2019/0222055 | A1* | 7/2019 | Khoche ............... B60C 23/0408 |
| 2019/0254013 | A1 | 8/2019 | Chang et al. |
| 2019/0272458 | A1* | 9/2019 | Khoche ............ H04M 1/72454 |
| 2019/0281588 | A1 | 9/2019 | Zhang et al. |
| 2019/0325173 | A1 | 10/2019 | Tingler et al. |
| 2019/0362215 | A1 | 11/2019 | Khoche |
| 2019/0370624 | A1 | 12/2019 | Khoche |

FOREIGN PATENT DOCUMENTS

| | | | | |
|---|---|---|---|---|
| WO | WO-2013100834 | A1 * | 7/2013 | ............ H04W 8/005 |
| WO | WO 2019/028269 | A1 | 2/2019 | |

OTHER PUBLICATIONS

International Patent Application No. PCT/US2019/042488, International Search Report and Written Opinion dated Nov. 5, 2019.

International Patent Application No. PCT/US2019/046588, International Search Report and Written Opinion dated Jan. 6, 2020 9 pages.

Chong Shen et al., "A mobility framework to improve heterogeneous wireless network services," Inderscience Enterprises Ltd., 2011.

Lucas Iacono, Wireless Sensor Network Protocols, Universidad De Mendoza, Argentina, 2011.

M.A. Matin et al., Overview of Wireless Sensor Network, Intech, 2012 (http://dx.doi.org/10.5772/49376.1).

Mario G. C. Cimino et al., "Wireless communication, identification, and sensing technologies enabling integrated logistics: a study in the harbor environment," Research Gate, Oct. 2015 (https://www.researchgate.net/publication/283117890_Wireless_communication_identification_and_sensing_technologies_enabling_integrated_logistics_a_-study_in_the_harbor_environment).

International Patent Application No. PCT/US2019/046588, International Preliminary Report on Patentability, dated Feb. 16, 2021, 7 pgs, Geneva, Switzerland.

PCT Application No. PCT/US2021/023545, International Search Report and Written Opinion dated Jun. 24, 2021, 10 pages.

European Patent Application No. 19837758.2 extended European search report, dated Feb. 25, 2022, 7 pages.

European Patent Application No. 19850357.5 extended European search report, dated Mar. 4, 2022, 8 pages.

U.S. Appl. No. 17/208,765 Office Action dated Jul. 14, 2022, 9 pages.

International Patent Application No. PCT/2021/051383, International Search Report and Written Opinion dated Dec. 28, 2021, 15 pages.

International Patent Application No. PCT/2021/053442, International Search Report and Written Opinion dated Jan. 14, 2022, 17 pages.

Non-Final Office Action for U.S. Appl. No. 16/680,469 dated Apr. 28, 2022, 14 pages.

Non-Final Office Action for U.S. Appl. No. 16/680,469 dated Nov. 10, 2022, 12 pages.

Non-Final Office Action for U.S. Appl. No. 17/208,765 dated Jul. 14, 2022, 9 pages.

* cited by examiner

| WIRELESS AGENT ATTRIBUTES TABLE | | | ~2729 |
|---|---|---|---|
| MASTER AGENT | SECONDARY AGENT | TERTIARY AGENT | |
| Child Node | Intermediate Parent Node | Parent Node | |
| Low Power Communications Interface (White) | Low and Medium Power Communications Interfaces (Green) | Low, Medium, High Power Communications Interfaces (Black) | |
| Bluetooth LE | Bluetooth LE<br>Lora | Bluetooth LE<br>LoRa<br>Cellular<br>NFC<br>RFID | |

FIG. 27

DISTRIBUTED INTELLIGENT SOFTWARE FOR INDUSTRIAL IOT

RELATED APPLICATIONS

This application claims priority to U.S. Patent Application Ser. No. 63/081,284, titled "Distributed Intelligent Software for Industrial IOT," filed Sep. 21, 2020, U.S. Patent Application 63/087,486, titled "Liquid Operating System and Virtualization," filed Oct. 5, 2020, and U.S. Patent Application Ser. No. 63/087,319, titled "Adhesive Tape Platform for Diagnostic Testing of Infrastructure," filed Oct. 5, 2020, all of which are incorporated herein in their entirety by reference.

FIELD OF THE DISCLOSURE

This disclosure generally relates to Industrial Internet of Things (IOT) and more particularly to asset management, including tracking, warehousing, inventorying, and monitoring items (e.g., objects, tools, and other equipment).

BACKGROUND

Tracking devices may be used to track people and objects (collectively referred to herein as "assets") in real time and communicate the collected tracking data (e.g., location data) to a server or client device. In a conventional Internet of Things (IOT) system, tracking devices deployed at different nodes may communicate to a central system that provides tracking data to users. In some cases, the tracking devices continuously communicate the full range of tracking data collected to the central system at all times. However, this "always-on" communication results in high power consumption, particularly when the tracking devices are using wireless communication to send data to the central system. Situations may arise where the tracked person or object does not require the full functionality of the tracking device or only requires a limited set of functionalities.

SUMMARY

Disclosed herein is a distributed intelligent software for supporting communications with and operations of members (e.g., devices and systems) of a tracking system that collects tracking data. The tracking system includes one or more tracking devices, a central database and controller, and one or more client devices. Each tracking device collects tracking data (e.g., location data) on a tracked item and communicates with the central database and controller, the one or more client devices, other tracking devices, or some combination thereof. An example of a tracking device may include a tracking device (also referred to herein as an "adhesive tape platform) with a flexible, adhesive tape form factor. The adhesive tape platform may function both as a tracking device that collects and communicates tracking data and as an adhesive tape for sealing or adhering to assets (e.g., objects, parcels, packages, tools, people, etc.) that are being tracked. In some embodiments, the tracking data includes sensor data collected by sensors in the adhesive tape platform relevant to the tracked item or person (e.g., vibrations, acceleration, temperature, humidity, or other sensor data). The adhesive tape platform is able to wirelessly communicate with a central database and controller, according to some embodiments. A tracking device may also be a device other than the adhesive tape platform, in some examples.

The distributed intelligent software controls the behavior of the tracking devices and the central database and controller. The distributed intelligent software defines expectations for the tracked items and provides software instructions for the tracking devices, the central database and controller, and the client devices based on the collected tracking data, the current state of the adhesive tape platform, and the expectations for the tracked items. In some embodiments, the distributed intelligent software includes rules or events to be detected based on the expectations for the tracked item. In response to the determining that a rule is satisfied or that an event has been detected based on tracking data collected by a tracking device, the distributed intelligent software alters the state of the tracking device to fit the situation. The entirety of the distributed intelligent software may be distributed on the tracking device, or a plurality of tracking devices, and the central database and controller such that the tracking device can operate and change modes without direct instruction from the central database and controller.

In one embodiment, a tracking system for tracking an asset, includes a first tape node attachable to the asset and having a liquid operating system (OS) that causes the first tape node to: receive a first mission defining goals for the first tape node, and operate as a master agent to complete the first mission; and a second tape node having the liquid OS that causes the second tape node to operate as a secondary agent and provide a slave service to the first tape node.

In another embodiment, a tape node of a tracking system, includes: a battery; a short-range wireless interface; a processor; and a memory storing a liquid operating system (OS) having machine readable instructions that when executed by the processor cause the processor to: receive, within the tape node, a mission defining at least one goal for the tape node, the tape node acting as a master agent of the tracking system to complete each of a plurality of tasks defined by the mission; manage power usage of the battery to complete the mission, the liquid OS delegating the task to another node of the tracking system to reduce power usage; and perform a second task received from a second node, the tape node acting as a slave in response to the second task.

In another embodiment, a tracking system, includes a plurality of tape nodes, each tape node having a liquid operating system (OS) and being capable to operate as a master agent to fulfil a first mission of the tape node and capable to operate as a slave node to support a second missions of other tape nodes.

In another embodiments, a method includes receiving, by a wireless IOT device of a tracking system, a mission determined by the liquid operating system (OS) of the wireless IOT device defining at least one goal for the wireless IOT device, the wireless IOT device acting as a master agent of the tracking system to complete each of a plurality of tasks defined by the mission; and managing, by the wireless IOT device, power usage of the battery to complete the mission, the liquid OS delegating a first task of the plurality of tasks to another node of the tracking system to reduce power usage, wherein the wireless IOT device acts as a master agent, and the other node of the tracking system acts as a slave agent, in response to receiving instructions based on the delegation of the first task to the other node.

BRIEF DESCRIPTION OF THE DRAWINGS

FIG. 27 is a table showing attributes of three different types of agent used in the IOT system and tracking systems: master agent, secondary agent, and tertiary agent, in embodiments.

DETAILED DESCRIPTION

Figure 1:
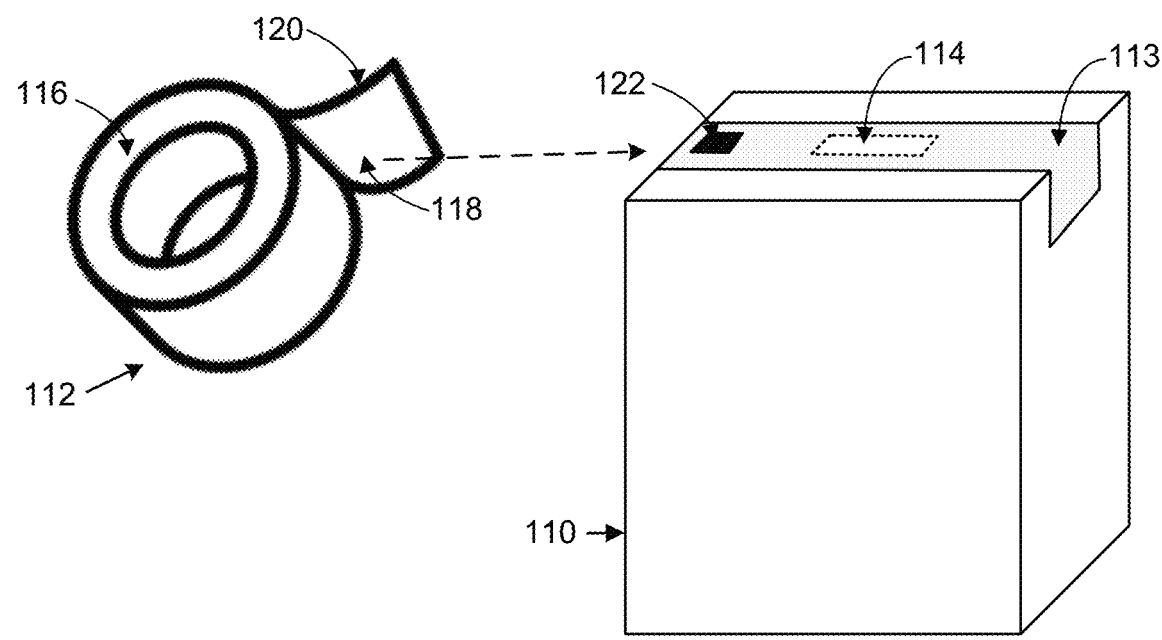
FIG. 1 shows an example adhesive tape-agent platform, including a wireless transducing circuit, used to seal a package for shipment, in embodiments.

The present invention is not limited in any way to the illustrated embodiments. Instead, the illustrated embodiments described below are merely examples of the invention. Therefore, the structural and functional details disclosed herein are not to be construed as limiting the claims. The disclosure merely provides bases for the claims and representative examples that enable one skilled in the art to make and use the claimed inventions. Furthermore, the terms and phrases used herein are intended to provide a comprehensible description of the invention without being limiting.

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

In some contexts, the term "agent" may refer to a "node", and an "agent" or "node" may be adhesively applied to a surface and denoted as an "adhesive tape platform," a "tape node," or "tape agent." These terms may be used interchangeably, depending on the context. Further, the "agent" or "node" may have two forms of hierarchy: one depending on the functionality of the "agent" or "node", such as the range of a wireless communication interface, and another depending on which "agent" or "node" may control another "agent" or "node". For example, an agent with a low-power wireless-communication interface may be referred to a "master agent".

In some embodiments, a low-power wireless communication interface may have a first wireless range and be operable to implement one or more protocols including Zigbee, near-field communication (NFC), Bluetooth Low Energy, Bluetooth Classic, Wi-Fi, and ultra-wideband. For example, the low-power wireless-communication interface may have a range of between 0 and 300 meters or farther, depending on the implemented protocol. The communication interface implementation, e.g., Zigbee or Bluetooth Low Energy, may be selected based upon the distance of communication between the low-power wireless-communication interface and the recipient, and/or a remaining battery level of the low-power wireless-communication interface.

An agent with a medium-power wireless communication-interface may be referred to as a "secondary agent". The medium-power wireless communication interface may have a second wireless range and be operable to implement one or more protocols including Zigbee, Bluetooth Low Energy interface, LoRa. For example, the medium-power wireless-communication interface may have a range of between 0 and 20 kilometers. The communication interface implementation, e.g., Zigbee, Bluetooth Low Energy, or LoRa, may be selected based upon the distance of communication between the medium-power wireless-communication interface and the recipient, and/or a remaining battery level of the medium-power wireless-communication interface.

An agent with a high-power wireless communication-interface may be referred to as a "tertiary agent". The high-power wireless communication interface may have a third wireless range and be operable to implement one or more protocols including Zigbee, Bluetooth Low Energy, LoRa, Global System for Mobile Communication, General Packet Radio Service, cellular, near-field communication, and radio-frequency identification. For example, the high-power wireless-communication interface may have a global range, where the high-power wireless-communication interface may communicate with any electronic device implementing a similar communication protocol. The communication interface protocol selected may depend on the distance of communication between the high-power wireless-communication interface and a recipient, and/or a remaining battery level of the high-power wireless-communication interface.

In some examples, a secondary agent may also include a low-power wireless-communication interface and a tertiary agent may also include low and medium-power wireless-communication interfaces, as discussed below with reference to FIGS. 7A-C and/or 8A-C. Further continuing the example, a "master agent", a "secondary agent", or a "tertiary agent" may refer to a "master tape node", a "secondary tape node", or a "tertiary tape node".

With regard to the second form of hierarchy, the "agent", "node", "tape agent", and "tape node", may be qualified as a parent, child, or master, depending on whether a specific "agent" or "node" controls another "agent" or "node". For example, a master-parent agent controls the master-child agent and a secondary or tertiary-parent agent controls a master-child agent. The default, without the qualifier of "parent" or "child" is that the master agent controls the secondary or tertiary agent Further, the "master tape node" may control a "secondary tape node" and a "tertiary tape node", regardless of whether the master tape node is a parent node.

Further, each of the "agents", "nodes", "tape nodes", and "tape agents" may be referred to as "intelligent nodes", "intelligent tape nodes", "intelligent tape agents", and/or "intelligent tape agents" or any variant thereof, depending on the context and, for ease, may be used interchangeably.

An adhesive tape platform includes a plurality of segments that may be separated from the adhesive product (e.g., by cutting, tearing, peeling, or the like) and adhesively attached to a variety of different surfaces to inconspicuously implement any of a wide variety of different wireless communications-based network communications and transducing (e.g., sensing, actuating, etc.) applications. In certain embodiments, each segment of an adhesive tape platform has an energy source, wireless communication functionality, transducing functionality (e.g., sensor and energy harvesting functionality), and processing functionality that enable the segment to perform one or more transducing functions and report the results to a remote server or other computer system directly or through a network (e.g., formed by tape nodes and/or other network components). The components of the adhesive tape platform are encapsulated within a flexible adhesive structure that protects the components from damage while maintaining the flexibility needed to function as an adhesive tape (e.g., duct tape or a label) for use in various applications and workflows. In addition to single function applications, example embodiments also include multiple transducers (e.g., sensing and/or actuating transducers) that extend the utility of the platform by, for example, providing supplemental information and functionality relating characteristics of the state and/or environment of, for example, an article, object, vehicle, or person, over time.

Systems and processes for fabricating flexible multifunction adhesive tape platforms in efficient and low-cost ways also are described in US Patent Application Publication No. US-2018-0165568-A1. For example, in addition to using roll-to-roll and/or sheet-to-sheet manufacturing techniques, the fabrication systems and processes are configured to optimize the placement and integration of components within the flexible adhesive structure to achieve high flexibility and ruggedness. These fabrication systems and processes are able to create useful and reliable adhesive tape platforms that may provide local sensing, wireless transmitting, and positioning functionalities. Such functionality together with the low cost of production is expected to encourage the ubiquitous deployment of adhesive tape platform segments and thereby alleviate at least some of the problems arising from gaps in conventional infrastructure coverage that prevent continuous monitoring, event detection, security, tracking, and other logistics applications across heterogeneous environments.

As used herein, the term "or" refers an inclusive "or" rather than an exclusive "or." In addition, the articles "a" and "an" as used in the specification and claims mean "one or more" unless specified otherwise or clear from the context to refer the singular form.

The terms "module," "manager," "component", and "unit" refer to hardware, software, or firmware, or a combination thereof.

FIG. 1 shows an example adhesive tape-agent platform 112, including a wireless transducing circuit 114, used to seal a package 110 for shipment. In this example, a segment 113 is dispensed from a roll 116 to give the adhesive tape platform 112 that is affixed to the package 110. The adhesive tape platform 112 includes an adhesive side 118 and a non-adhesive surface 120. The adhesive tape platform 112 may be dispensed from the roll 116 in the same way as any conventional packing tape, shipping tape, or duct tape. For example, the adhesive tape platform 112 may be dispensed from the roll 116 by hand, laid across the seam where the two top flaps of the package 110 meet, and cut to a suitable length either by hand or using a cutting instrument (e.g., scissors or an automated or manual tape dispenser). Examples of such tape agents include tape agents having non-adhesive surface 120 that carry one or more coatings or layers (e.g., colored, light reflective, light absorbing, and/or light emitting coatings or layers). Further, the segment 113 may include an identifier 122 (e.g., a QR code, RFID chip, etc.) that may be used to associate the segment 113 with the package 110, as discussed below.

Figure 2:
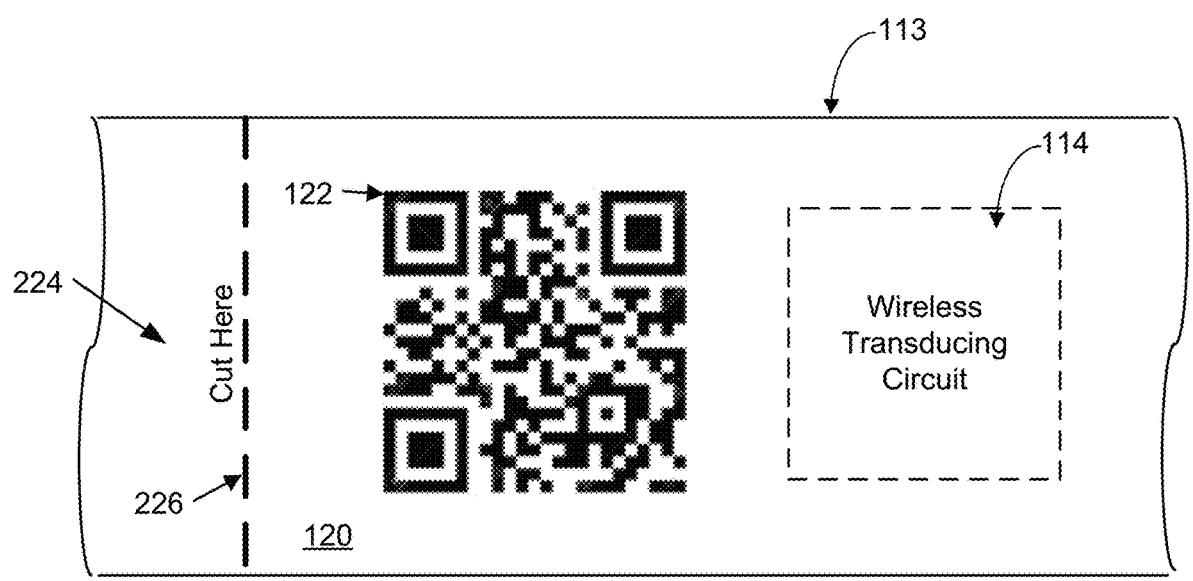
FIG. 2 shows the non-adhesive surface of the segment of the adhesive tape-agent platform 112 of FIG. 1 in further example detail, in embodiments.

FIG. 2 shows the non-adhesive surface 120 of the segment 113 of the adhesive tape-agent platform 112 of FIG. 1 including writing or other markings that convey instructions, warnings, or other information to a person or machine (e.g., a bar code reader), or may simply be decorative and/or entertaining. For example, different types of adhesive tape-agent platforms may be marked with distinctive colorations to distinguish one type of adhesive tape-agent platform from another. In the illustrated example of FIG. 2, the segment 113 of the adhesive tape-agent platform 112 includes an identifier 122 (e.g., a two-dimensional bar code, such as a QR Code), written instructions 224 (e.g., "Cut Here"), and an associated cut line 226 that indicates where the user should cut the adhesive tape-agent platform 112. The written instructions 224 and the cut line 226 typically are printed or otherwise marked on the top non-adhesive surface 120 of the adhesive tape-agent platform 112 during manufacture. The identifier 122 (e.g., a two-dimensional bar code), on the other hand, may be marked on the non-adhesive surface 120 of the adhesive tape-agent platform 112 during the manufacture of the adhesive tape-agent platform 112 or, alternatively, may be marked on the non-adhesive surface 120 of the adhesive tape-agent platform 112 as needed using, for example, a printer or other marking device.

To avoid damaging the functionality of the segments of the adhesive tape-agent platform 112, the cut lines 226 may demarcate the boundaries between adjacent segments at locations that are free of any active components of the wireless transducing circuit 114. The spacing between the wireless transducing circuit 114 and the cut lines 226 may vary depending on the intended communication, transducing and/or adhesive taping application. In the example illustrated in FIG. 1, the length of the adhesive tape-agent platform 112 that is dispensed to seal the package 110 corresponds to a single segment of the adhesive tape-agent platform 112. In other examples, the length of the adhesive tape-agent platform 112 needed to seal a package or otherwise serve the adhesive function for which the adhesive tape-agent platform 112 is being applied may include multiple segments 113 of the adhesive tape-agent platform 112, one or more of which segments 113 may be activated upon cutting the length of the adhesive tape-agent platform 112 from the roll 116 and/or applying the segment 113 of the adhesive tape-agent platform to the package 110.

In some examples, the wireless transducing circuits 114 embedded in one or more segments 113 of the adhesive tape-agent platform 112 are activated when the adhesive tape-agent platform 112 is cut along the cut line 226. In these examples, the adhesive tape-agent platform 112 includes one or more embedded energy sources (e.g., thin film batteries, which may be printed, or conventional cell batteries, such as conventional watch style batteries, rechargeable batteries, or other energy storage device, such as a super capacitor or charge pump) that supply power to the wireless transducing circuit 114 in one or more segments of the adhesive tape-agent platform 112 in response to being separated from the adhesive tape-agent platform 112 (e.g., along the cut line 226).

In some examples, each segment 113 of the adhesive tape-agent platform 112 includes its own respective energy source. In some embodiments, the energy source is a battery of a type described above, an energy harvesting component or system that harvests energy from the environment, or both. In some of these examples, each energy source is configured to only supply power to the components in its respective adhesive tape platform segment regardless of the number of contiguous segments that are in a given length of the adhesive tape-agent platform 112. In other examples, when a given length of the adhesive tape-agent platform 112 includes multiple segments 113, the energy sources in the respective segments 113 are configured to supply power to the wireless transducing circuit 114 in all of the segments 113 in the given length of the adhesive tape-agent platform 112. In some of these examples, the energy sources are connected in parallel and concurrently activated to power the wireless transducing circuit 114 in all of the segments 113 at the same time. In other examples, the energy sources are connected in parallel and alternately activated to power the wireless transducing circuit 114 in respective ones of the segments 113 at different time periods, which may or may not overlap.

Figure 3:
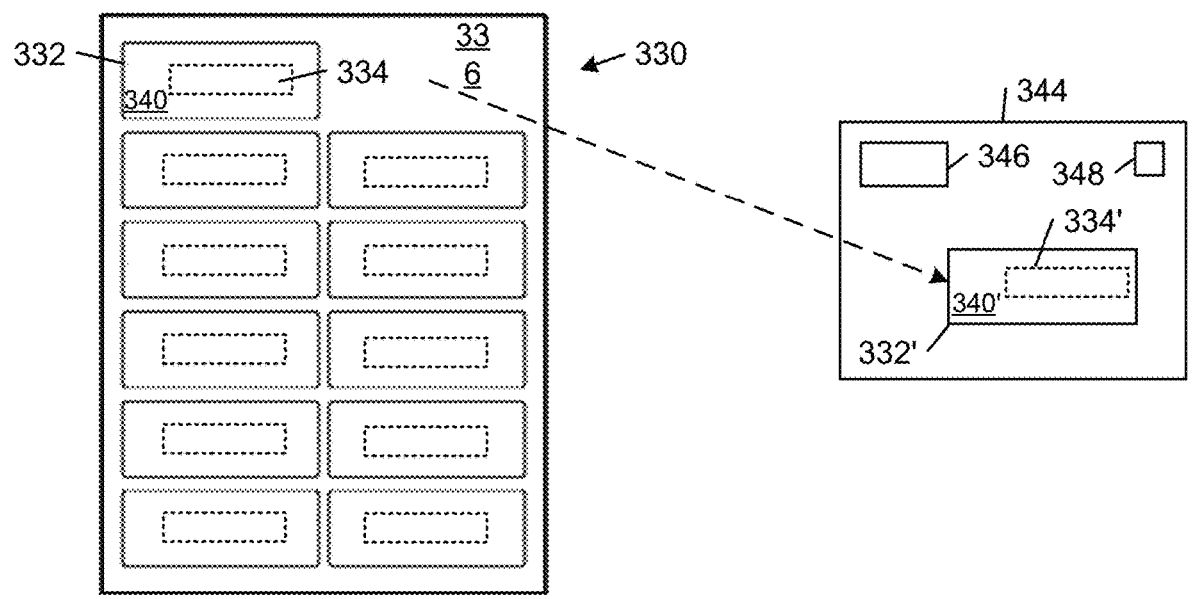
FIG. 3 shows one example adhesive tape platform that includes a set of adhesive tape platform segments, each of which has a respective set of embedded wireless transducing circuit components, and a backing sheet with a release coating that prevents the adhesive segments from adhering strongly to the backing sheet, in embodiments.

FIG. 3 shows one example adhesive tape platform 330 that includes a set of adhesive tape platform segments 332 each of which has a respective set of embedded wireless transducing circuit components 334, and a backing sheet 336 with a release coating that prevents the segments 332 from adhering strongly to the backing sheet 336. Adhesive tape platform 330 may represent adhesive tape-agent platform 112 if FIG. 1. Each segment 332 includes an adhesive side facing the backing sheet 336, and an opposing non-adhesive side 340. In this example, a particular segment 332 of the adhesive tape platform 330 has been removed from the backing sheet 336 and affixed to an envelope 344. Each segment 332 of the adhesive tape platform 330 can be removed from the backing sheet 336 in the same way that adhesive labels can be removed from a conventional sheet of adhesive labels (e.g., by manually peeling a segment 332 from the backing sheet 336). In general, the non-adhesive side 340 of the segment 332 may include any type of writing, markings, decorative designs, or other ornamentation. In the illustrated example, the non-adhesive side 340 of the segment 332 includes writing or other markings that correspond to a destination address for the envelope 344. The envelope 44 also includes a return address 346 and, optionally, a postage stamp or mark 348.

In some examples, segments of the adhesive tape platform 330 are deployed by a human operator. The human operator may be equipped with a mobile phone or other device that allows the operator to authenticate and initialize the adhesive tape platform 330. In addition, the operator can take a picture of a parcel including the adhesive tape platform and any barcodes associated with the parcel and, thereby, create a persistent record that links the adhesive tape platform 330 to the parcel. In addition, the human operator typically will send the picture to a network service and/or transmit the picture to the adhesive tape platform 330 for storage in a memory component of the adhesive tape platform 330.

In some examples, the wireless transducing circuit components 334 that are embedded in a segment 332 of the adhesive tape platform 330 are activated when the segment 332 is removed from the backing sheet 336. In some of these examples, each segment 332 includes an embedded capacitive sensing system that can sense a change in capacitance when the segment 332 is removed from the backing sheet 336. As explained in detail below, a segment 332 of the adhesive tape platform 330 includes one or more embedded energy sources (e.g., thin film batteries, common disk-shaped cell batteries, or rechargeable batteries or other energy storage devices, such as a super capacitor or charge pump) that can be configured to supply power to the wireless transducing circuit components 334 in the segment 332 in response to the detection of a change in capacitance between the segment 332 and the backing sheet 336 as a result of removing the segment 332 from the backing sheet 336.

Figure 4:
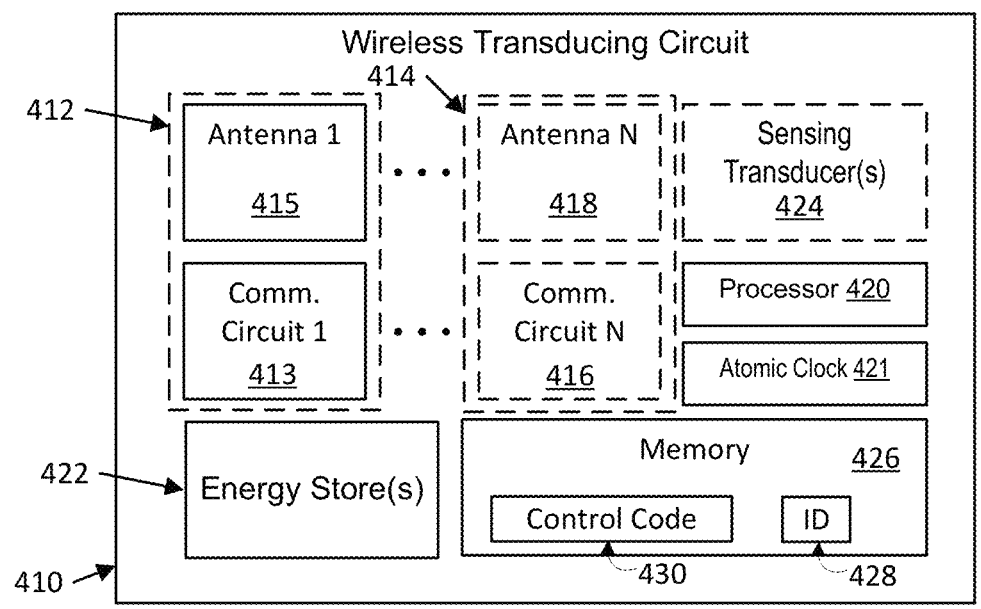
FIG. 4 is a block diagram of the components of an example wireless transducing circuit that includes one or more wireless communication modules, in embodiments.

FIG. 4 is a block diagram of the components of an example wireless transducing circuit 410 (e.g., an agent) that includes one or more wireless communication modules 412, 414. Each wireless communication module 412, 414 includes a wireless communication circuit 413, 416, and an antenna 415, 418, respectively. Each wireless communication circuit 413, 416 may represent a receiver or transceiver integrated circuit that implements one or more of GSM/ GPRS, Wi-Fi, LoRa, Bluetooth, Bluetooth Low Energy, Z-wave, and ZigBee. The wireless transducing circuit 410 also includes a processor 420 (e.g., a microcontroller or microprocessor), a solid-state atomic clock 421, at least one energy store 422 (e.g., non-rechargeable or rechargeable printed flexible battery, conventional single or multiple cell battery, and/or a super capacitor or charge pump), one or more sensing transducers 424 (e.g., sensors and/or actuators, and, optionally, one or more energy harvesting transducers). In some examples, the conventional single or multiple cell battery may be a watch style disk or button cell battery that is in an associated electrical connection apparatus (e.g., a metal clip) that electrically connects the electrodes of the battery to contact pads on the wireless transducing circuit 410.

Sensing transducers 424 may represent one or more of a capacitive sensor, an altimeter, a gyroscope, an accelerometer, a temperature sensor, a strain sensor, a pressure sensor, a piezoelectric sensor, a weight sensor, an optical or light sensor (e.g., a photodiode or a camera), an acoustic or sound sensor (e.g., a microphone), a smoke detector, a radioactivity sensor, a chemical sensor (e.g., an explosives detector), a biosensor (e.g., a blood glucose biosensor, odor detectors, antibody based pathogen, food, and water contaminant and toxin detectors, DNA detectors, microbial detectors, pregnancy detectors, and ozone detectors), a magnetic sensor, an electromagnetic field sensor, a humidity sensor, a light emitting units (e.g., light emitting diodes and displays), electro-acoustic transducers (e.g., audio speakers), electric motors, and thermal radiators (e.g., an electrical resistor or a thermoelectric cooler).

Wireless transducing circuit 410 includes a memory 426 for storing data, such as profile data, state data, event data, sensor data, localization data, security data, and/or at least one unique identifier (ID) 428 associated with the wireless transducing circuit 410, such as one or more of a product ID, a type ID, and a media access control (MAC) ID. Memory 426 may also store control code 430 that includes machine-readable instructions that, when executed by the processor 420, cause processor 420 to perform one or more autonomous agent tasks. In certain embodiments, the memory 426 is incorporated into one or more of the processor 420 or the sensing transducers 424. In other embodiments, memory 426 is integrated in the wireless transducing circuit 410 as shown in FIG. 4. The control code 430 may implement programmatic functions or program modules that control operation of the wireless transducing circuit 410, including implementation of an agent communication manager that manages the manner and timing of tape agent communications, a node-power manager that manages power consumption, and a tape agent connection manager that controls whether connections with other nodes are secure connections (e.g., connections secured by public key cryptography) or unsecure connections, and an agent storage manager that securely manages the local data storage on the wireless transducing circuit 410. In certain embodiments, a node connection manager ensures the level of security required by the end application and supports various encryption mechanisms. In some examples, a tape agent power manager and communication manager work together to optimize the battery consumption for data communication. In some examples, execution of the control code by the different types of nodes described herein may result in the performance of similar or different functions.

Figure 5:
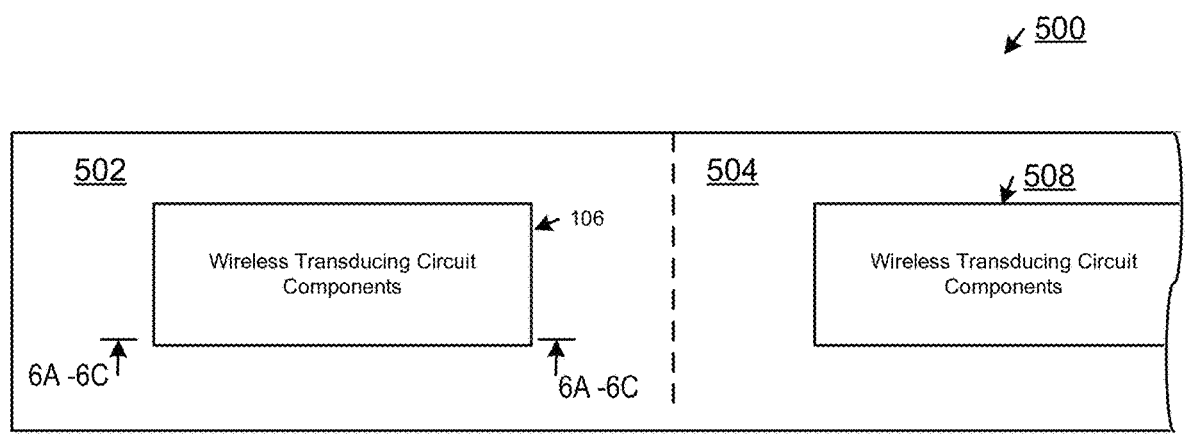
FIG. 5 is a top view of a portion of an example flexible adhesive tape platform that shows a first segment and a portion of a second segment, in embodiments.

FIG. 5 is a top view of a portion of an example flexible adhesive tape platform 500 that shows a first segment 502 and a portion of a second segment 504. Each segment 502, 504 of the flexible adhesive tape platform 500 includes a respective set of components 506, 508 of the wireless transducing circuit 470 of FIG. 4. The segments 502, 504 and their respective sets of components 506, 508 typically are identical and configured in the same way. In some other embodiments, however, the segments 502, 504 and/or their respective sets of components 506, 508 are different and/or configured in different ways. For example, in some examples, different sets of the segments of the flexible adhesive tape platform 500 have different sets or configurations of tracking and/or transducing components that are designed and/or optimized for different applications, or different sets of segments of the flexible adhesive tape platform may have different ornamentations (e.g., markings on the exterior surface of the platform) and/or different (e.g., alternating) lengths.

Figure 6A:
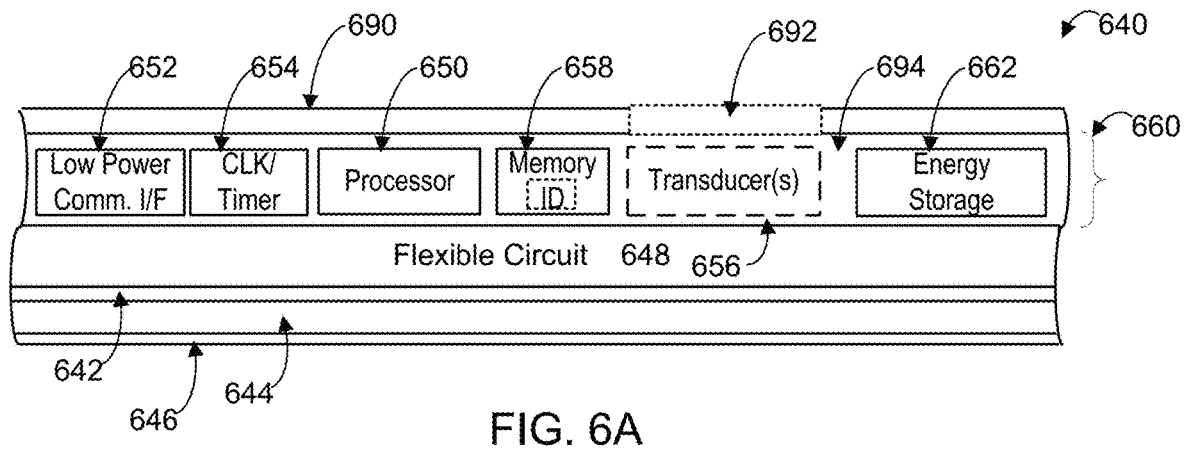
FIGS. 6A-6C show cross-sectional side views of three different types of flexible adhesive tape-agent platform segments, in embodiments.
Figure 6B:
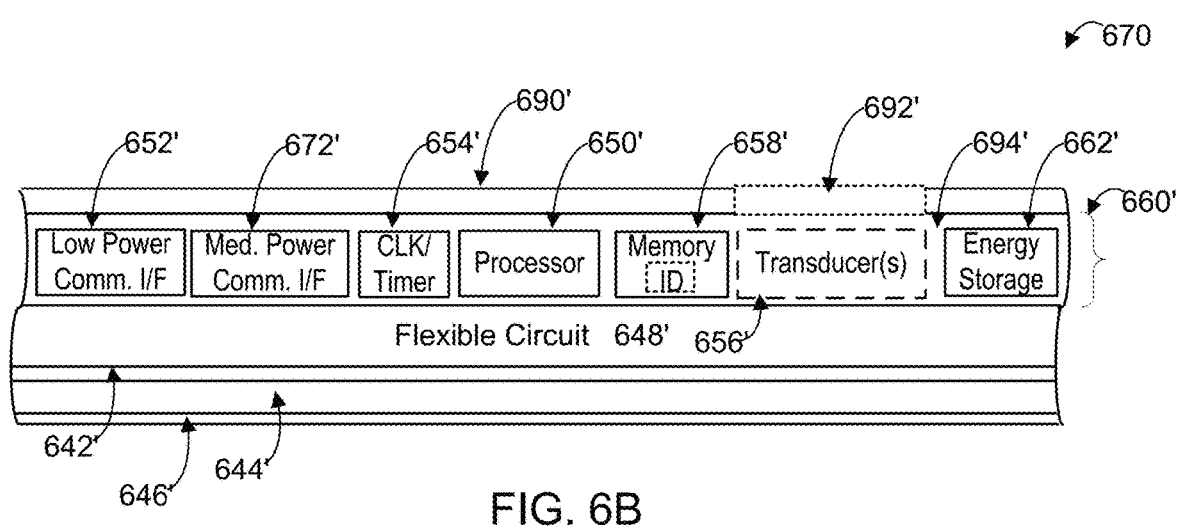
Figure 6C:
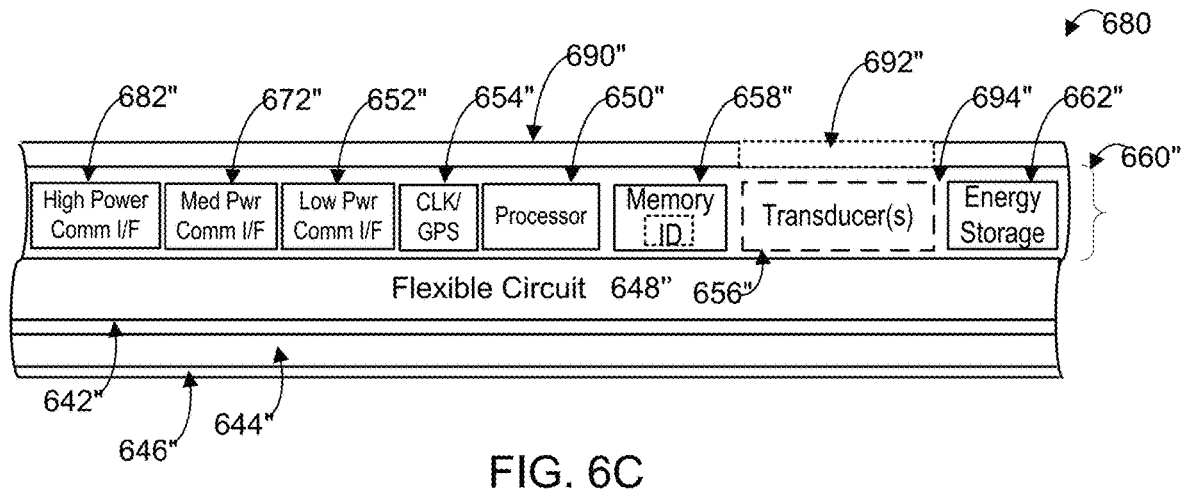
Figure 7A:
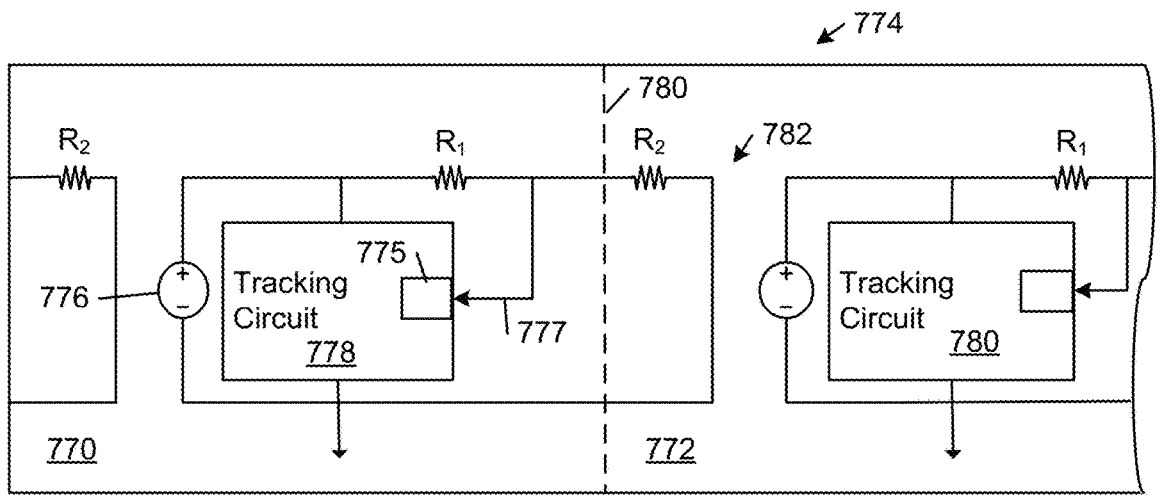
FIGS. 7A and 7B show example circuits of the tracking adhesive product for delivering power from an energy source to a tracking circuit, in embodiments.
Figure 7B:
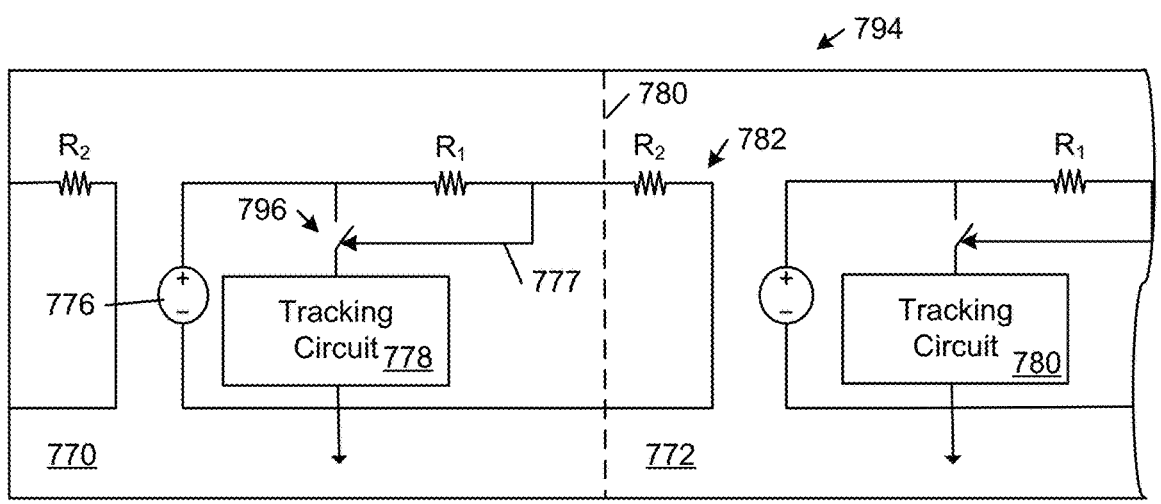
Figure 7C:
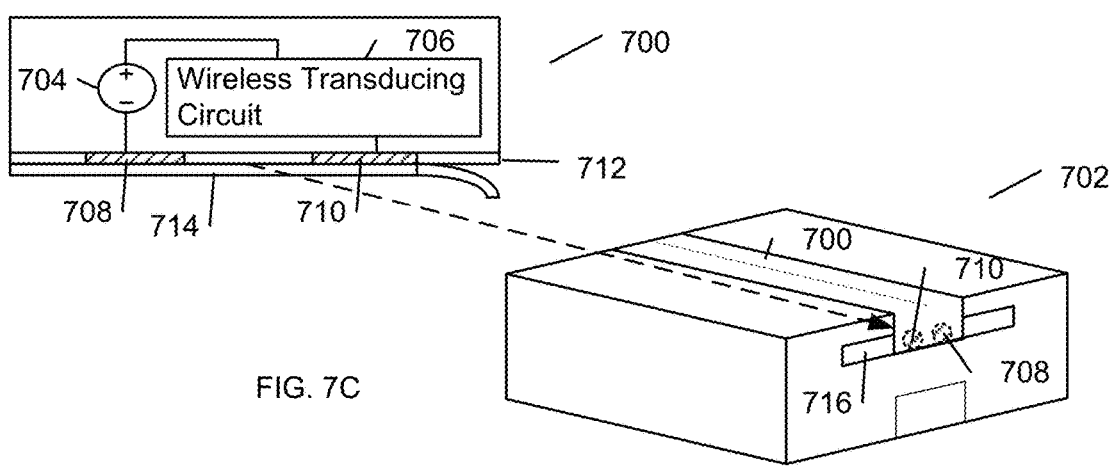
FIG. 7C shows a diagrammatic cross-sectional front view of an example adhesive tape platform and a perspective view of an example asset sealed by the adhesive tape platform, in embodiments.

An example method of fabricating the flexible adhesive tape platform 500 according to a roll-to-roll fabrication process is described in connection with FIGS. 6A-6C and as shown in FIGS. 7A and 7C of U.S. patent application Ser. No. 15/842,861, filed Dec. 14, 2017, the entirety of which is incorporated herein by reference.

The instant specification describes an example system of adhesive tape platforms (also referred to herein as "tape nodes") that can be used to implement a low-cost wireless network infrastructure for performing monitoring, tracking, and other asset management functions relating to, for example, parcels, persons, tools, equipment and other physical assets and objects. The example system includes a set of three different types of tape nodes that have different respective functionalities and different respective cover markings that visually distinguish the different tape node types from one another. In one non-limiting example, the covers of the different tape node types are marked with different colors (e.g., white, green, and black). In the illustrated examples, the different tape node types are distinguishable from one another by their respective wireless communications capabilities and their respective sensing capabilities.

FIGS. 6A-6C show cross-sectional side views, as indicated in FIG. 5, of three different types of flexible adhesive tape-agent platform segments. FIG. 6A shows a cross-sectional side view of a portion of an example segment 640 of a flexible adhesive tape-agent platform (e.g., platform 532 of FIG. 5) that includes a respective set of the components of the wireless transducing circuit 510 corresponding to the first tape-agent type (e.g., white). The segment 640 includes an adhesive layer 642, an optional flexible substrate 644, and an optional adhesive layer 646 on the bottom surface of the flexible substrate 644. When the bottom adhesive layer 646 is present, a release liner (not shown) may be (weakly) adhered to the bottom surface of the adhesive layer 646. In certain embodiments where adhesive layer 646 is included, the adhesive layer 646 is an adhesive (e.g., an acrylic foam adhesive) with a high-bond strength that is sufficient to prevent removal of the segment 640 from a surface on which the adhesive layer 646 is adhered to without destroying the physical or mechanical integrity of the segment 640 and/or one or more of its constituent components.

In certain embodiments including the optional flexible substrate 644, the optional flexible substrate 644 is a prefabricated adhesive tape that includes the adhesive layers 642 and 646 and the optional release liner. In other embodiments including the optional flexible substrate 644, the adhesive layers 642, 646 are applied to the top and bottom surfaces of the flexible substrate 644 during the fabrication of the adhesive tape platform. The adhesive layer 642 may bond the flexible substrate 644 to a bottom surface of a flexible circuit 648, that includes one or more wiring layers (not shown) that connect the processor 650, a low-power wireless-communication interface 652 (e.g., a Zigbee, Bluetooth® Low Energy (BLE) interface, or other low power communication interface), a clock and/or a timer circuit 654, transducing and/or transducer(s) 656 (if present), the memory 658, and other components in a device layer 660 to each other and to the energy storage device 662 and, thereby, enable the transducing, tracking and other functionalities of the segment 640. The low-power wireless-communication interface 652 typically includes one or more of the antennas 415, 418 and one or more of the wireless communication circuits 413, 416 of FIG. 4. The segment 640 may further include a flexible cover 690, an interfacial region 692, and a flexible polymer layer 694.

FIG. 6B shows a cross-sectional side-view of a portion of an example segment 670 of a flexible adhesive tape-agent platform (e.g., platform 532 of FIG. 5) that includes a respective set of the components of the wireless transducing circuit 410 corresponding to a second tape-agent type (e.g., green). The segment 670 is similar to the segment 640 shown in FIG. 6A but further includes a medium-power wireless-communication interface 672' (e.g., a LoRa interface) in addition to the low-power wireless-communication interface 652. The medium-power wireless-communication interface 672' has a longer communication range than the low-power wireless-communication interface 652'. In certain embodiments, one or more other components of the segment 670 differ from the segment 640 in functionality or capacity (e.g., larger energy source). The segment 670 may include further components, as discussed above and below with reference to FIGS. 6A, and 6C.

FIG. 6C shows a cross-sectional side view of a portion of an example segment 680 of the flexible adhesive tape-agent platform that includes a respective set of the components of the wireless transducing circuit 410 corresponding to the third tape-node type (e.g., black). The segment 680 is similar to the segment 670 of FIG. 6B, but further includes a high-power wireless-communication interface 682" (e.g., a cellular interface; e.g., GSM/GPRS) in addition to a low-power wireless-communication interface 652", and may include a medium-power wireless-communication interface 672". The high-power wireless-communication interface 682" has a range that provides global coverage to available infrastructure (e.g. the cellular network). In certain embodiments, one or more other components of the segment 680 differ from the segment 670 in functionality or capacity (e.g., larger energy source).

FIGS. 6A-6C show embodiments in which the flexible covers 690, 690', 690" of the respective segments 640, 670, and 680 include one or more interfacial regions 692, 692', 692" positioned over one or more of the transducers 656, 656', 656". In certain embodiments, one or more of the interfacial regions 692, 692', 692" have features, properties, compositions, dimensions, and/or characteristics that are designed to improve the operating performance of the platform for specific applications. In certain embodiments, the flexible adhesive tape platform includes multiple interfacial regions 692, 692', 692" over respective transducers 656, 656', 656", which may be the same or different depending on the target applications. Interfacial regions may represent one or more of an opening, an optically transparent window, and/or a membrane located in the interfacial regions 692, 692', 692" of the flexible covers 690, 690', 690" that is positioned over the one or more transducers and/or transducers 656, 656', 656". Additional details regarding the structure and operation of example interfacial regions 692, 692', 692" are described in U.S. Provisional Patent Application No. 62/680,716, filed Jun. 5, 2018, and U.S. Provisional Patent Application No. 62/670,712, filed May 11, 2018.

In certain embodiments, a planarizing polymer 694, 694', 694" encapsulates the respective device layers 660, 660', 660" and thereby reduces the risk of damage that may result from the intrusion of contaminants and/or liquids (e.g., water) into the device layer 660, 660', 660". The flexible polymer layers 694, 694', 694" may also planarize the device layers 660, 660', 660". This facilitates optional stacking of additional layers on the device layers 660, 660', 660" and also distributes forces generated in, on, or across the segments 640, 670, 680 so as to reduce potentially damaging asymmetric stresses that might be caused by the application of bending, torqueing, pressing, or other forces that may be applied to the segments 640, 670, 680 during use. In the illustrated example, a flexible cover 690, 690', 690" is bonded to the planarizing polymer 694, 694', 694" by an adhesive layer (not shown).

The flexible cover 690, 690', 690" and the flexible substrate 644, 644', 644" may have the same or different compositions depending on the intended application. In some examples, one or both of the flexible cover 690, 690', 690" and the flexible substrate 644, 644', 644" include flexible film layers and/or paper substrates, where the film layers may have reflective surfaces or reflective surface coatings. Compositions for the flexible film layers may represent one or more of polymer films, such as polyester, polyimide, polyethylene terephthalate (PET), and other plastics. The optional adhesive layer on the bottom surface of the flexible cover 690, 690', 690" and the adhesive layers 642, 642', 642", 646, 646', 646" on the top and bottom surfaces of the flexible substrate 644, 644', 644" typically include a pressure-sensitive adhesive (e.g., a silicon-based adhesive). In some examples, the adhesive layers are applied to the flexible cover 690, 690', 690" and the flexible substrate 644, 644', 644" during manufacture of the adhesive tape-agent platform (e.g., during a roll-to-roll or sheet-to-sheet fabrication process). In other examples, the flexible cover 690, 690', 690" may be implemented by a prefabricated single-sided pressure-sensitive adhesive tape and the flexible substrate 644, 644', 644" may be implemented by a prefabricated double-sided pressure-sensitive adhesive tape; both kinds of tape may be readily incorporated into a roll-to-roll or sheet-to-sheet fabrication process. In some examples, the flexible substrate 644, 644', 644" is composed of a flexible epoxy (e.g., silicone).

In certain embodiments, the energy storage device 662, 662', 662" is a flexible battery that includes a printed electrochemical cell, which includes a planar arrangement of an anode and a cathode and battery contact pads. In some examples, the flexible battery may include lithium-ion cells or nickel-cadmium electro-chemical cells. The flexible battery typically is formed by a process that includes printing or laminating the electro-chemical cells on a flexible substrate (e.g., a polymer film layer). In some examples, other components may be integrated on the same substrate as the flexible battery. For example, the low-power wireless-communication interface 652, 652', 652" and/or the processor(s) 650, 650', 650" may be integrated on the flexible battery substrate. In some examples, one or more of such components also (e.g., the flexible antennas and the flexible interconnect circuits) may be printed on the flexible battery substrate.

In examples of manufacture, the flexible circuit 648, 648', 648" is formed on a flexible substrate by one or more of printing, etching, or laminating circuit patterns on the flexible substrate. In certain embodiments, the flexible circuit 648, 648', 648" is implemented by one or more of a single-sided flex circuit, a double access or back-bared flex circuit, a sculpted flex circuit, a double-sided flex circuit, a multi-layer flex circuit, a rigid flex circuit, and a polymer-thick film flex circuit. A single-sided flexible circuit has a single conductor layer made of, for example, a metal or conductive (e.g., metal filled) polymer on a flexible dielectric film. A double access or back bared flexible circuit has a single conductor layer but is processed so as to allow access to selected features of the conductor pattern from both sides. A sculpted flex circuit is formed using a multi-step etching process that produces a flex circuit that has finished copper conductors that vary in thickness along their respective lengths. A multilayer flex circuit has three of more layers of conductors, where the layers typically are interconnected using plated through holes. Rigid flex circuits are a hybrid construction of flex circuit consisting of rigid and flexible substrates that are laminated together into a single structure, where the layers typically are electrically interconnected via plated through holes. In polymer thick film (PTF) flex circuits, the circuit conductors are printed onto a polymer base film, where there may be a single conductor layer or multiple conductor layers that are insulated from one another by respective printed insulating layers.

In the example segments 640, 670, 680 shown in FIGS. 6A-6C, the flexible circuit 648, 648', 648" represents a single-access flex-circuit that interconnects the components of the adhesive tape platform on a single side of the flexible circuit 648, 648', 648". However, in other embodiments, the flexible circuit 648, 648', 648" represents a double access flex circuit that includes a front-side conductive pattern that interconnects the low-power wireless-communication interface 652, 652', 652", the timer circuit 654, 654', 654", the processor 650, 650', 650", the one or more sensor transducers 656, 656', 656" (if present), and the memory 658, 658', 658", and allows through-hole access (not shown) to a back-side conductive pattern that is connected to the flexible battery (not shown). In these embodiments, the front-side conductive pattern of the flexible circuit 648, 648', 648" connects the communications circuits 652, 652', 652", 672', 672", 682" (e.g., receivers, transmitters, and transceivers) to their respective antennas and to the processor 650, 650', 650" and also connects the processor 650, 650', 650" to the one or more sensors and the memory 658, 658', and 658". The backside conductive pattern connects the active electronics (e.g., the processor 650, 650', 650", the communications circuits 652, 652', 652", 672', 672", 682" and the transducers) on the front-side of the flexible circuit 648, 648', 648" to the electrodes of the energy storage device 662, 662', 662" via one or more through holes in the substrate of the flexible circuit 648, 648', 648".

The various units of the segments 640, 670, 680 shown in FIGS. 6A-6C may be arranged to accommodate different objects or structures (e.g., trash bins, fire extinguishers, etc.) and sensors may be added to, or subtracted from, the segments 640, 670, and 680, according to a particular task.

FIGS. 7A and 7B show example circuits of the tracking adhesive product for delivering power from an energy source to a tracking circuit. Referring to FIG. 7A, in some examples, each of one or more of the segments 770, 772 of a tracking adhesive product 774 includes a respective circuit 775 that delivers power from the respective energy source 776 to the respective tracking circuit 778 (e.g., a processor and one or more wireless communications circuits) in response to an event. In some of these examples, the wake circuit 775 is configured to transition from an off-state to an on-state when the voltage on the wake node 777 exceeds a threshold level, at which point the wake circuit transitions to an on-state to power-on the segment 770. In the illustrated example, this occurs when the user separates the segment from the tracking adhesive product 774, for example, by cutting across the tracking adhesive product 774 at a designated location (e.g., along a designated cut-line 780). In particular, in its initial, un-cut state, a minimal amount of current flows through the resistors R1 and R2. As a result, the voltage on the wake node 777 remains below the threshold turn-on level. After the user cuts across the tracking adhesive product 774 along the designated cut-line 780, the user creates an open circuit in the loop 782, which pulls the voltage of the wake node above the threshold level and turns on the wake circuit 775. As a result, the voltage across the energy source 776 will appear across the tracking circuit 778 and, thereby, turn on the segment 770. In particular embodiments, the resistance value of resistor R1 is greater than the resistance value of R2. In some examples, the resistance values of resistors R1 and R2 are selected based on the overall design of the adhesive product system (e.g., the target wake voltage level and a target leakage current).

In some examples, each of one or more of the segments of a tracking adhesive product includes a respective sensor and a respective wake circuit that delivers power from the respective energy source to the respective one or more components of the respective tracking circuit 778 in response to an output of the sensor. In some examples, the respective sensor is a strain sensor that produces a wake signal based on a change in strain in the respective segment. In some of these examples, the strain sensor is affixed to a tracking adhesive product and configured to detect the stretching of the tracking adhesive product segment as the segment is being peeled off a roll or a sheet of the tracking adhesive product. In some examples, the respective sensor is a capacitive sensor that produces a wake signal based on a change in capacitance in the respective segment. In some of these examples, the capacitive sensor is affixed to a tracking adhesive product and configured to detect the separation of the tracking adhesive product segment from a roll or a sheet of the tracking adhesive product. In some examples, the respective sensor is a flex sensor that produces a wake signal based on a change in curvature in the respective segment. In some of these examples, the flex sensor is affixed to a tracking adhesive product and configured to detect bending of the tracking adhesive product segment as the segment is being peeled off a roll or a sheet of the tracking adhesive product. In some examples, the respective sensor is a near field communications sensor that produces a wake signal based on a change in inductance in the respective segment.

FIG. 7B shows another example of a tracking adhesive product 794 that delivers power from the respective energy source 776 to the respective tracking circuit 778 (e.g., a processor and one or more wireless communications circuits) in response to an event. This example is similar in structure and operation as the tracking adhesive product 794 shown in FIG. 7A, except that the wake circuit 775 is replaced by a switch 796 that is configured to transition from an open state to a closed state when the voltage on the wake node 777 exceeds a threshold level. In the initial state of the tracking adhesive product 794, the voltage on the switch node is below the threshold level as a result of the low current level flowing through the resistors R1 and R2. After the user cuts across the tracking adhesive product 794 along the designated cut-line 780, the user creates an open circuit in the loop 782, which pulls up the voltage on the switch node above the threshold level to close the switch 796 and turn on the tracking circuit 778.

A wireless sensing system includes a plurality of wireless nodes configured to detect tampering in assets. Tampering may include, but is not limited to, opening assets such as boxes, containers, storage, or doors, moving the asset without authorization, moving the asset to an unintended location, moving the asset in an unintended way, damaging the asset, shaking the asset in an unintended way, orienting an asset in a way that it is not meant to be oriented. In many cases, these actions may compromise the integrity or safety of assets. Wireless nodes associated with the asset are configured to detect a tampering event. In an embodiment, a tampering event is associated with an action, a time, and a location. In an embodiment, the wireless nodes communicate the tampering event to the wireless sensing system. The wireless sensing system is configured to provide a notification or alert to a user of the wireless sensing system. In some embodiments, a wireless node may directly transmit the notification or alert to the user. In other embodiments, a wireless node may include a display that indicates whether or not a tampering event has occurred (e.g., the display may be an indicator light or LED).

Alerts may be transmitted to server/cloud, other wireless nodes, a client device, or some combination thereof. For example, in an embodiment, a wireless node of the wireless sensing system captures sensor data, detects a tampering event, and transmits an alarm to a user of the wireless sensing system (e.g., without communicating with a server or cloud of the wireless sensing system). In another embodiment, a wireless node of the wireless sensing system captures sensor data and transmits the sensor data to a gateway, parent node (e.g., black tape), or client device. The gateway, parent node, or client device detects a tampering event based on the received sensor data and transmits an alarm to a user of the wireless sensing system. In another embodiment, the wireless node of the wireless sensing system captures sensor data, detects a tampering event, and transmits information describing the tampering event to a server or cloud of the wireless sensing system. The server or cloud of the wireless sensing system transmits an alarm to a user of the wireless sensing system.

FIG. 7C shows a diagrammatic cross-sectional front view of an example adhesive tape platform 700 and a perspective view of an example asset 702 sealed by the adhesive tape platform. Instead of activating the adhesive tape platform in response to separating a segment of the adhesive tape platform from a roll or a sheet of the adhesive tape platform, this example is configured to supply power from the energy source 702 to turn on the wireless transducing circuit 706 in response to establishing an electrical connection between two power terminals 708, 710 that are integrated into the adhesive tape platform. In particular, each segment of the adhesive tape platform 700 includes a respective set of embedded tracking components, an adhesive layer 712, and an optional backing sheet 714 with a release coating that prevents the segments from adhering strongly to the backing sheet 714. In some examples, the power terminals 708, 710 are composed of an electrically conductive material (e.g., a metal, such as copper) that may be printed or otherwise patterned and/or deposited on the backside of the adhesive tape platform 700. In operation, the adhesive tape platform can be activated by removing the backing sheet 714 and applying the exposed adhesive layer 712 to a surface that includes an electrically conductive region 716. In the illustrated embodiment, the electrically conductive region 716 is disposed on a portion of the asset 702. When the adhesive backside of the adhesive tape platform 700 is adhered to the asset with the exposed terminals 708, 710 aligned and in contact with the electrically conductive region 716 on the asset 702, an electrical connection is created through the electrically conductive region 716 between the exposed terminals 708, 710 that completes the circuit and turns on the wireless transducing circuit 706. In particular embodiments, the power terminals 708, 710 are electrically connected to any respective nodes of the wireless transducing circuit 706 that would result in the activation of the tracking circuit 706 in response to the creation of an electrical connection between the power terminals 708, 710.

In some examples, after a tape node is turned on, it will communicate with the network service to confirm that the user/operator who is associated with the tape node is an authorized user who has authenticated himself or herself to the network service. In these examples, if the tape node cannot confirm that the user/operator is an authorized user, the tape node will turn itself off.

Figure 8:
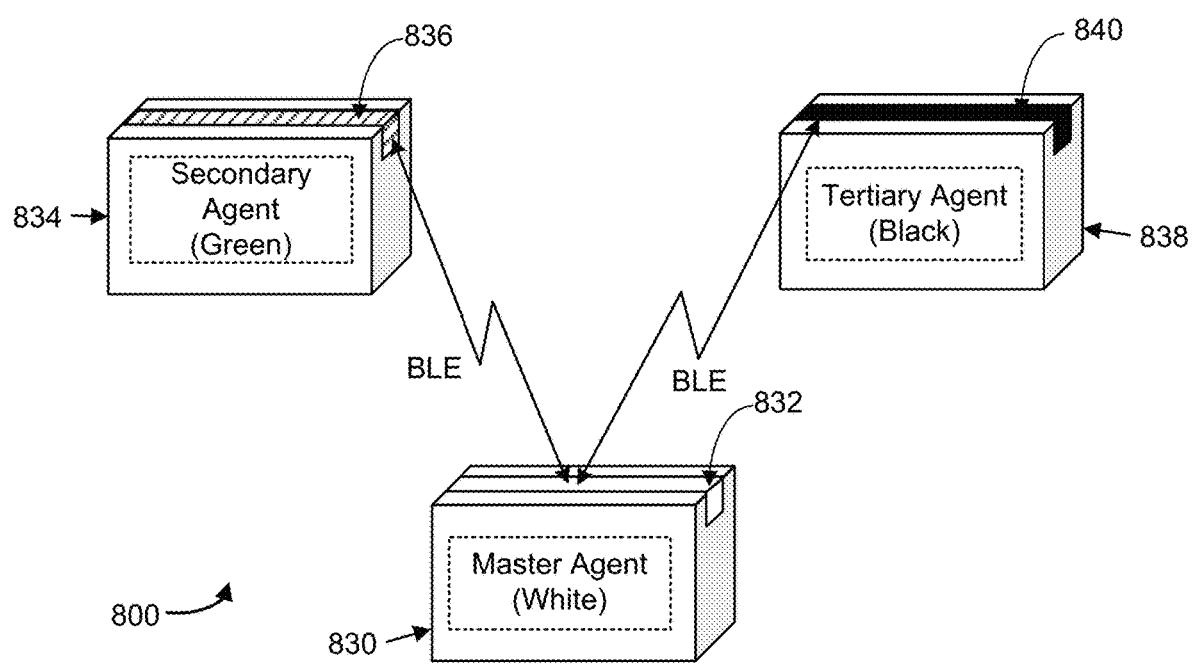
FIG. 8 shows a network communication environment (also referred to herein as an IoT system) including a master agent, a secondary agent, and a tertiary agent, attached to three packages, in embodiments.

FIG. 8 shows a network communication environment 800 (also referred to herein as IOT system 800) including three agents, a master agent 832, a secondary agent 836, and a tertiary agent 840, attached to three packages 830, 834, and 838 (also referred to herein as parcels, boxes, containers, etc.), respectively, where each of the packages 830, 834, and 838 are associated with respective tape agents 832, 836, 840. FIG. 8 is not meant to be limited to agents attached to packages but may rather be agents attached to infrastructure (e.g., walls, pillars, buildings, etc.) or vehicles (e.g., automobiles, planes, ships, trains, drones, etc.) or any other object the agent is capable of being attached to. For example, the master agent 832 may be attached to a package (e.g., the first package 830) and the secondary and tertiary agents 836, 840 are attached to infrastructure, such as a wall or a building.

A master agent (master node) may include a low-power wireless-communication interface configured to communicate with secondary and tertiary agents (intelligent nodes) within a proximity (e.g., wireless range) of the low-power wireless-communication interface. A secondary agent (node) may be configured to execute instructions received from the master agent (master node) and the secondary agent may include one or both of a low-power wireless-communication interface and a medium-power wireless-communication interface. That is, the secondary agent may provide a slave service to the master agent. The medium-power wireless-communication interface may have a longer range of communication than the low-power wireless-communication interface, as discussed above. A tertiary agent (tertiary node) may be configured to execute instructions received from the master agent (master node) and the tertiary node may include one or more of a low-power wireless-communication interface, a medium-power wireless-communication interface, and a high-power wireless-communication interface. The high-power wireless-communication interface may have a longer range of communication than the low-power wireless-communication and medium-power wireless-communication interfaces and may be configured to wirelessly communicate with a server associated with the network. In some embodiments, the tape agent may be a master agent with a low-power wireless-communication interface configured to communicate with secondary and tertiary agents (e.g., client device, server, an agent or intelligent node attached to a structure, such as a wall or shipping container, or a ship, train, vehicle, or other mode of transportation, etc.). The master agent may transmit instructions to the secondary or tertiary agent to perform tasks, such as monitoring an asset, communicating with, and transmitting a notification to, a server or client device, or any task that the tape agent may perform, as discussed herein. For example, the master agent may transmit instructions to the secondary or tertiary agent to collect sensor data from the other tape agents. In some embodiments, the master agent may determine which secondary and/or tertiary agents are capable of performing tasks based on their computing modules (e.g., processing units, sensor transducer, etc.), and then assign a particular secondary or tertiary agent to perform a task. The secondary or tertiary agent selected to perform the task may then execute the computer-readable instructions, received from the master agent, to perform the task.

Continuing with the embodiment in FIG. 8, the master agent 832 child-node (as discussed in table 2729, with reference to FIG. 27) is attached to the first package 830, has a low-power wireless-communications interface (e.g., Bluetooth LE), and is optionally marked with a white-colorant. The secondary agent 836 intermediate-node (as discussed in table 2729) is attached to the second package 834, has a low-power wireless-communications interface (e.g., Bluetooth LE) and a medium-power communications-interface (e.g., LoRa), and is optionally marked with a green-colorant. The tertiary agent 840 parent node (as discussed in table 2729) is attached to a third package 838, has three low-power wireless-communication interfaces (e.g., Bluetooth LE, NFC, and RFID), a medium power communications interface (e.g., LoRa), and a high-power communications interface (e.g., cellular), and is optionally marked with a black colorant. The communications interfaces of the secondary agent 836 and the tertiary agent 840 are backward compatible with the communications interface (e.g., Bluetooth LE) of the master agent 832.

Figure 9:
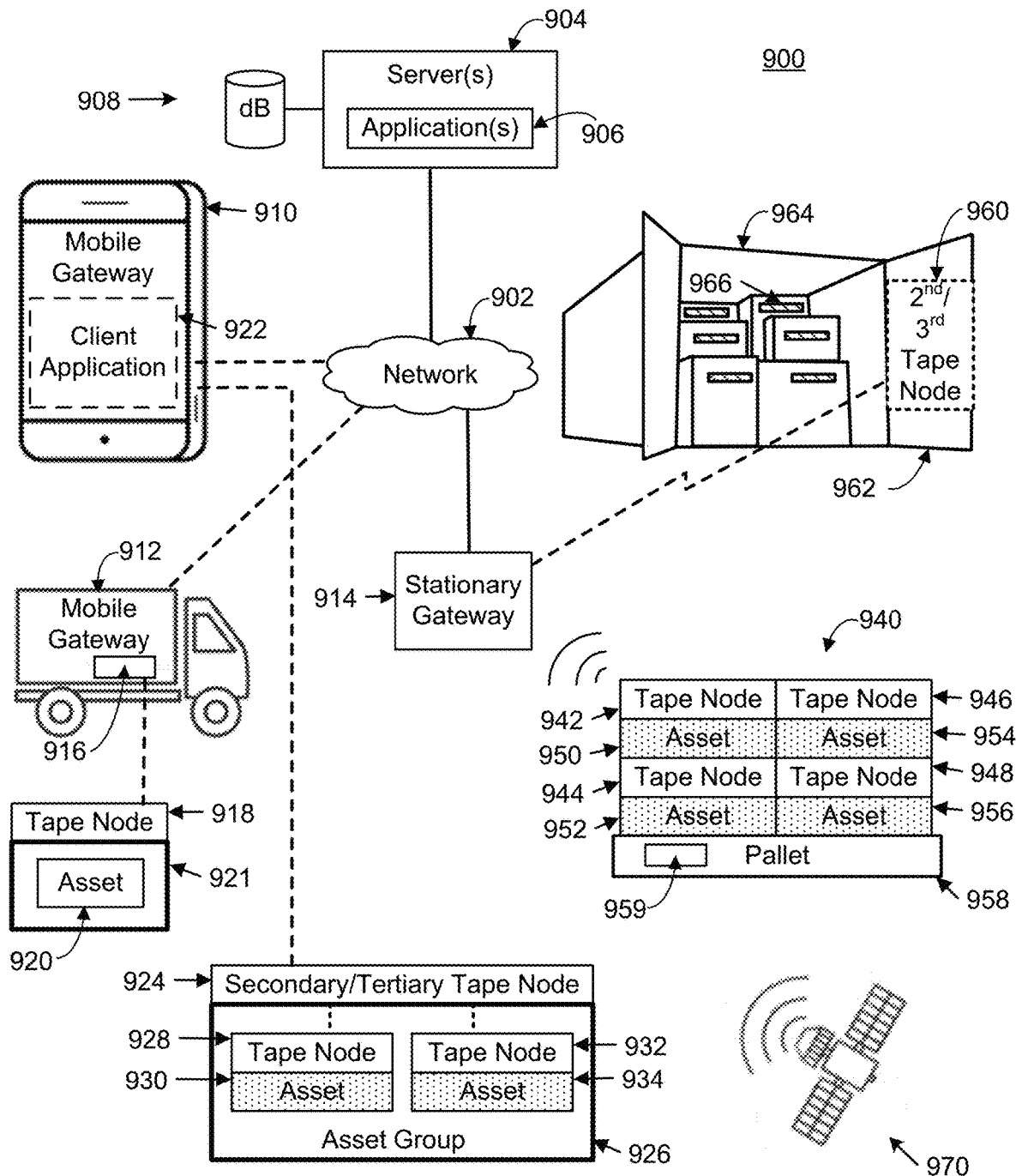
FIG. 9 shows an example network communications environment that includes a network supporting communications between servers, mobile gateways, a stationary gateway, and various types of tape nodes associated with various assets, in embodiments.

In addition to packaging applications, the master, secondary, and tertiary agents 832, 836, and 840 may be deployed on or within physical premises, such as buildings, warehouses, and other infrastructure. For example, in some embodiments, the secondary and tertiary agents 836, 840 may be deployed on physical premises infrastructure (e.g., walls, doors, and conveyor systems), vehicles (e.g., fork lifts, trucks, and carts), and objects (e.g., boxes, packages, documents, coffee mugs) as shown in FIG. 9.

In prior art network-connectivity, nodes are arranged hierarchically with higher-power parent nodes designated as master nodes that are conceptually located at higher levels in a typical node-hierarchy and have unilateral control over the low-power child nodes, which are conceptually located at the bottom level of the hierarchy. In the prior art network-connectivity, the master nodes (e.g., the secondary and tertiary agents of the present disclosure) are configured to periodically scan for transmissions from the child nodes (e.g., the master agent of the present disclosure). As a result, a high demand is placed on the resources of the master nodes (e.g., the secondary and tertiary agents of the present disclosure). This demand is particularly high when there are numerous child nodes (e.g., the master agent of the present disclosure), which tends to rapidly decrease the battery levels of the master nodes (e.g., the secondary and tertiary agents of the present disclosure) and increase network congestion between the high-power master nodes and the numerous child nodes.

In contrast to the prior art network-connectivity, for the network-connectivity of network communication environment 800, the roles of the parent-child relationship in the prior art network-connectivity have switched: the low-power child-node is the master node (e.g., master agent 832), which has unilateral control over the parent nodes (e.g., the secondary agent 836 and the tertiary agent 840). As a result, many of the tasks previously performed by the secondary and tertiary agents are unnecessary. For example, in the networks of FIGS. 8, 9, and 10, there is no need for the higher-level parent-nodes to scan for transmissions from the child nodes; instead, the master agent 832 (child node) drives the communications flow from the master agent 832 to the secondary agents 836 and the tertiary agents 840. The master agent 832 transmits service requests to the secondary agent 836 or the tertiary agent 840, or both. In this way, there is no need for the secondary agent 836 and the tertiary agent 840 to continuously scan for packet transmissions from the child nodes; the master agent 832 may initiate a scan to transmit packets to the secondary and tertiary agents 836, 840. In addition, the child nodes operate autonomously, and thereby substantially avoid network congestion by sending requests for service to the secondary and tertiary agents 836, 840 only when needed.

In some embodiments, one or more of the master agent 832, the secondary agent 836, and the tertiary agent 840 receive data that includes descriptions of the resources that are available from the master agents 832 over the network communication environment 800. Examples of such resources are sensors, such as a temperature sensor, a moisture sensor, and an acceleration sensor; communication interfaces, such as Bluetooth communications interfaces, LoRa communications interfaces, and cellular communications interfaces; power sources, such as mains power and battery power; and memory resources. In one operational example, when the master agent (child node) detects that it has insufficient resources to complete a task, the master agent (child node) broadcasts, to other agents within wireless range, a request asking whether the insufficiency (e.g., a sensor required to collect data of a certain type, such as a vibration sensor to collect vibration data, and accelerometer to detect movement, etc.) may be remedied by at least one of the other agents sharing one or more resources (e.g., sensors, such as a vibration sensor or an accelerometer). In this example, the master agent (child node) broadcasts, using low-power wireless-communication interface 652 of FIG. 6A, a message requesting the type of resource required and a deadline for completing the task. If at least one other agent in the environment of the master agent that receives the message is able to satisfy the request, the other agent sends a reply message to the master agent (child node). Where multiple agents respond, the master agent (child node) may select one of the multiple agents to provide the resource based on one or more criteria (e.g., the first agent to reply to the request). Accordingly, the master agent (child node) may receive a confirmation message from the other agent indicating that the requested task either was completed or was not completed. Depending on the type of task to be performed by the selected agent, the master agent (child node) may or may not receive a data payload in the confirmation message.

FIG. 9 shows an example network communications environment 900 that includes a network 902 that supports communications between one or more servers 904 executing one or more applications of a network service 908, mobile gateways 910 (a smart device mobile gateway), 912 (a vehicle mobile gateway), a stationary gateway 914, and various types of tape nodes that are associated with various assets (e.g., parcels, equipment, tools, persons, and other things). Hereinafter "tape nodes" may be used interchangeably with the "agents," as described above, with reference to FIGS. 1-8; the "agents" are in the form of a "tape node" attached to different objects, e.g., an asset, storage container, vehicle, equipment, etc.; the master agent may be referred to as a master tape node, a secondary agent may be referred to as a secondary tape node; and a tertiary agent may be referred to as a tertiary tape node. The network communication environment 900 with its servers, mobile gateways, stationary gateways, and various tape nodes may also be referred to herein as a tracking system (e.g., see tracking system 1000 of FIG. 10).

In some examples, the network 902 (e.g., a wireless network) includes one or more network communication systems and technologies, including any one or more of wide area networks, local area networks, public networks (e.g., the internet), private networks (e.g., intranets and extranets), wired networks, and wireless networks. For example, the network 902 includes communications infrastructure equipment, such as a geolocation satellite system 970 (e.g., GPS, GLONASS, and NAVSTAR), cellular communication systems (e.g., GSM/GPRS), Wi-Fi communication systems, RF communication systems (e.g., LoRa), Bluetooth communication systems (e.g., a Bluetooth Low Energy system), Z-wave communication systems, and Zig-Bee communication systems.

In some examples, the one or more network service applications leverage the above-mentioned communications technologies to create a hierarchical wireless network of tape nodes improves asset management operations by reducing costs and improving efficiency in a wide range of processes, from asset packaging, asset transporting, asset tracking, asset condition monitoring, asset inventorying, and asset security verification. Communication across the network is secured by a variety of different security mechanisms. In the case of existing infrastructure, a communication link uses the infrastructure security mechanisms. In the case of communications among tapes nodes, the communication is secured through a custom security mechanism. In certain cases, tape nodes may also be configured to support block chain to protect the transmitted and stored data.

A network of tape nodes may be configured by the network service to create hierarchical communications network. The hierarchy may be defined in terms of one or more factors, including functionality (e.g., wireless transmission range or power), role (e.g., master-tape node vs. peripheral-tape node), or cost (e.g., a tape node equipped with a cellular transceiver vs. a peripheral tape node equipped with a Bluetooth LE transceiver). As described above with reference to the agents, tape nodes may be assigned to different levels of a hierarchical network according to one or more of the above-mentioned factors. For example, the hierarchy may be defined in terms of communication range or power, where tape nodes with higher-power or longer-communication range transceivers are arranged at a higher level of the hierarchy than tape nodes with lower-power or lower-range power or lower range transceivers. In another example, the hierarchy is defined in terms of role, where, e.g., a master tape node is programmed to bridge communications between a designated group of peripheral tape nodes and a gateway node or server node. The problem of finding an optimal hierarchical structure may be formulated as an optimization problem with battery capacity of nodes, power consumption in various modes of operation, desired latency, external environment, etc. and may be solved using modern optimization methods e.g. neural networks, artificial intelligence, and other machine learning computing systems that take expected and historical data to create an optimal solution and may create algorithms for modifying the system's behavior adaptively in the field.

The tape nodes may be deployed by automated equipment or manually. In this process, a tape node typically is separated from a roll or sheet and adhered to a parcel (e.g., asset 920) or other stationary (e.g., stationary gateway 914) or mobile object (e.g., a, such as a delivery truck, such as mobile gateway 912) or stationary object (e.g., a structural element of a building) This process activates the tape node (e.g., the tape node 918) and causes the tape node 918 to communicate with the one or more servers 904 of the network service 908. In this process, the tape node 418 may communicate through one or more other tape nodes (e.g., the tape nodes 942, 944, 946, 948) in the communication hierarchy. In this process, the one or more servers 904 executes the network service application 906 to programmatically configure tape nodes 918, 924, 928, 932, 942, 944, 946, 948, that are deployed in the network communications environment 900. In some examples, there are multiple classes or types of tape nodes (e.g., the master agent 832, secondary agent 836, or tertiary agent 840 shown in FIG. 8), where each tape node class has a different respective set of functionalities and/or capacities, as described above with respect to the "agents" in FIGS. 1-8. For example, the master agents 832 (with reference to FIG. 8) have a lower-power wireless communication interface (e.g., the low-power wireless-communication interface 652, with reference to FIG. 6A), in comparison to the secondary and tertiary agents 836, 840 (with reference to FIG. 8).

In some examples, the one or more servers 904 communicate over the network 902 with one or more gateways 910, 912, 914 that are configured to send, transmit, forward, or relay messages to the network 902 in response to transmissions from the tape nodes 918, 924, 928, 932, 942, 944, 946, 948 that are associated with respective assets and within communication range. Example gateways include mobile gateways 910, 912 and a stationary gateway 914. In some examples, the mobile gateways 910, 912, and the stationary gateway 914 are able to communicate with the network 902 and with designated sets or groups of tape nodes.

In some examples, the mobile gateway 912 is a vehicle (e.g., a delivery truck or other mobile hub) that includes a wireless communications unit 916 that is configured by the network service 908 to communicate with a designated network of tape nodes, including tape node 918 (e.g., a master tape node) in the form of a label that is adhered to a parcel 921 (e.g., an envelope) that contains an asset 920, and is further configured to communicate with the network service 908 over the network 902. In some examples, the tape node 918 includes a lower-power wireless-communications interface of the type used in, e.g., segment 640 (shown in FIG. 6A), and the wireless communications unit 916 may implemented by a secondary or tertiary tape node (e.g., one of segment 670 or segment 680, respectively shown in FIGS. 6B and 6C) that includes a lower-power communications interfaces for communicating with tape nodes within range of the mobile gateway 912 and a high-power communications interface for communicating with the network 902. In this way, the tape node 918 and wireless communications unit 916 create a hierarchical wireless network of tape nodes for transmitting, forwarding, bridging, relaying, or otherwise communicating wireless messages to, between, or on behalf of the tape node 918 in a power-efficient and cost-effective way.

In some examples, a mobile gateway 910 is a mobile phone that is operated by a human operator and executes a client application 922 that is configured by a network service to communicate with a designated set of tape nodes, including a secondary or tertiary tape node 924 that is adhered to a parcel 926 (e.g., a box), and is further configured to communicate with a server 904 over the network 902. In the illustrated example, the parcel 926 contains a first parcel labeled or sealed by a master tape node 928 and containing a first asset 930, and a second parcel labeled or sealed by a master tape node 932 and containing a second asset 934. The secondary or tertiary tape node 924 communicates with each of the master tape nodes 928, 932 and also communicates with the mobile gateway 910. In some examples, each of the master tape nodes 928, 932 includes a lower-power wireless-communications interface of the type used in, e.g., segment 640 (shown in FIG. 6A), and the secondary/tertiary tape node 924 is implemented by a tape node (e.g., segment 670 or segment 680, shown in FIGS. 6B and 6C) that includes a low-power wireless-communication interface for communicating with the master tape nodes 928, 932 contained within the parcel 926, and a higher-power communications interface for communicating with the mobile gateway 910. The secondary or tertiary tape node 924 is operable to relay wireless communications between the master tape nodes 928, 932 contained within the parcel 926 and the mobile gateway 910, and the mobile gateway 910 is operable to relay wireless communications between the secondary or tertiary tape node 924 and the server 904 over the network 902. In this way, the master tape nodes 928 and 932 and the secondary or tertiary tape node 924 create a wireless network of nodes for transmitting, forwarding, relaying, or otherwise communicating wireless messages to, between, or on behalf of the master tape nodes 928, 932, the secondary or tertiary tape node 924, and the network service (not shown) in a power-efficient and cost-effective way.

In some examples, the stationary gateway 914 is implemented by a server 904 executing a network service application 906 that is configured by the network service 908 to communicate with a designated set 940 of master tape nodes 942, 944, 946, 948 that are adhered to respective parcels containing respective assets 950, 952, 954, 956 on a pallet 958. In other examples, the stationary gateway 914 is implemented by a secondary or tertiary tape node 960 (e.g., segments 670 or 680, respectively shown in FIGS. 6B and 6C) that is adhered to, for example, a wall, column or other infrastructure component of the physical premises of the network communications environment 900, and includes a low-power wireless-communication interface for communicating with nodes within range of the stationary gateway 914 and a higher-power communications interface for communicating with the network 902.

In one embodiment, each of the master tape nodes 942-948 is a master tape node and is configured by the network service 908 to communicate individually with the stationary gateway 914, which relays communications from the master tape nodes 942-948 to the network service 908 through the stationary gateway 914 and over the network 902. In another embodiment, one of the master tape nodes 942-948 at a time is configured to transmit, forward, relay, or otherwise communicate wireless messages to, between, or on behalf of the other master nodes on the pallet 958. In this embodiment, the master tape node may be determined by the master tape nodes 942-948 or designated by the network service 908. In some examples, the master tape nodes 942-948 with the longest range or highest remaining power level is determined to be the master tape node. In some examples, when the power level of the current master tape node drops below a certain level (e.g., a fixed power threshold level or a threshold level relative to the power levels of one or more of the other master tape nodes), another one of the master tape nodes assumes the role of the master tape node. In some examples, a master tape node 959 is adhered to the pallet 958 and is configured to perform the role of a master node for the other master tape nodes 942-948. In these ways, the master tape nodes 942-948, 959 are configurable to create different wireless networks of nodes for transmitting, forwarding, relaying, bridging, or otherwise communicating wireless messages with the network service 408 through the stationary gateway 914 and over the network 902 in a power-efficient and cost-effective way.

In the illustrated example, the stationary gateway 914 also is configured by the network service 908 to communicate with a designated network of tape nodes, including the secondary or tertiary tape node 960 that is adhered to the inside of a door 962 of a shipping container 964, and is further configured to communicate with the network service 908 over the network 902. In the illustrated example, the shipping container 964 contains a number of parcels labeled or sealed by respective master tape nodes 966 and containing respective assets. The secondary or tertiary tape node 960 communicates with each of the master tape nodes 966 within the shipping container 964 and communicates with the stationary gateway 914. In some examples, each of the master tape nodes 966 includes a low-power wireless communications-interface (e.g., the low-power wireless-communication interface 652, with reference to FIG. 6A), and the secondary or tertiary tape node 960 includes a low-power wireless-communications interface (low-power wireless-communication interfaces 652', 652", with reference to FIGS. 6B-6C) for communicating with the master tape nodes 966 contained within the shipping container 964, and a higher-power wireless-communications interface (e.g., medium-power wireless-communication interface 672', medium-power wireless-communication interface 672", high-power wireless-communication interface 682", with reference to FIGS. 6B-6C) for communicating with the stationary gateway 914. In some examples, either a secondary or tertiary tape node, or both, may be used, depending on whether a high-power wireless-communication interface is necessary for sufficient communication.

In some examples, when the doors of the shipping container 964 are closed, the secondary or tertiary tape node 960 is operable to communicate wirelessly with the master tape nodes 966 contained within the shipping container 964. In some embodiments, both a secondary and a tertiary node are attached to the shipping container 964. Whether a secondary and a tertiary node are used may depend on the range requirements of the wireless-communications interface. For example, if out at sea a node will be required to transmit and receive signals from a server located outside the range of a medium-power wireless-communications interface, a tertiary node will be used because the tertiary node includes a high-power wireless-communications interface.

In an example, the secondary or tertiary tape node 960 is configured to collect sensor data from master tape nodes 966 and, in some embodiments, process the collected data to generate, for example, statistics from the collected data. When the doors of the shipping container 964 are open, the secondary or tertiary tape node 960 is programmed to detect the door opening (e.g., using a photodetector or an accelerometer component of the secondary or tertiary tape node 960) and, in addition to reporting the door opening event to the network service 908, the secondary or tertiary tape node 960 is further programmed to transmit the collected data and/or the processed data in one or more wireless messages to the stationary gateway 914. The stationary gateway 914, in turn, is operable to transmit the wireless messages received from the secondary or tertiary tape node 960 to the network service 908 over the network 902. Alternatively, in some examples, the stationary gateway 914 also is operable to perform operations on the data received from the secondary or tertiary tape node 960 with the same type of data produced by the secondary or tertiary tape node 960 based on sensor data collected from the master tape nodes 942-948. In this way, the secondary or tertiary tape node 960 and master tape node 966 create a wireless network of nodes for transmitting, forwarding, relaying, or otherwise communicating wireless messages to, between, or on behalf of the master tape node 966, the secondary or tertiary tape nodes 960, and the network service 908 in a power-efficient and cost-effective way.

In an example of the embodiment shown in FIG. 9, there are three types of backward compatible tape nodes: a short-range master tape node (e.g., segment 640), a medium-range secondary tape node (e.g., segment 670), and a long-range tertiary tape node (e.g. segment 680), as respectively shown in FIGS. 6A-6C (here, "tape node" is used interchangeably with "agent", as described with reference to FIGS. 1-8). The short-range master tape nodes typically are adhered directly to parcels containing assets. In the illustrated example, the master tape nodes 918, 928, 932, 942-948, 966 are short-range tape nodes. The short-range tape nodes typically communicate with a low-power wireless-communication protocol (e.g., Bluetooth LE, Zigbee, or Z-wave). The segment 670 are typically adhered to objects (e.g., a parcel 926 and a shipping container 964) that are associated with multiple parcels that are separated from the medium-range tape nodes by a barrier or a long distance. In the illustrated example, the secondary and/or tertiary tape nodes 924 and 960 are medium-range tape nodes. The medium-range tape nodes typically communicate with low and medium-power wireless-communication protocols (e.g., Bluetooth, LoRa, or Wi-Fi). The segments 680 typically are adhered to mobile or stationary infrastructure of the network communications environment 900.

In the illustrated example, the mobile gateway 912 and the stationary gateway 914 are implemented by, e.g., segment 680. The segments 680 typically communicate with other nodes using a high-power wireless-communication protocol (e.g., a cellular data communication protocol). In some examples, the wireless communications unit 416 (a secondary or tertiary tape node) is adhered to a mobile gateway 912 (e.g., a truck). In these examples, the wireless communications unit 916 may be moved to different locations in the network communications environment 900 to assist in connecting other tape nodes to the wireless communications unit 916. In some examples, the stationary gateway 914 is a tape node that may be attached to a stationary structure (e.g., a wall) in the network communications environment 900 with a known geographic location (e.g., GPS coordinates). In these examples, other tape nodes in the environment may determine their geographic location by querying the stationary gateway 914.

In some examples, in order to conserve power, the tape nodes typically communicate according to a schedule promulgated by the network service 908. The schedule usually dictates all aspects of the communication, including the times when particular tape nodes should communicate, the mode of communication, and the contents of the communication. In one example, the server (not shown) transmits programmatic Global Scheduling Description Language (GSDL) code to the master tape node and each of the secondary and tertiary tape nodes in the designated set. In this example, execution of the GSDL code causes each of the tape nodes in the designated set to connect to the master tape node at a different respective time that is specified in the GSDL code, and to communicate a respective set of one or more data packets of one or more specified types of information over the respective connection. In some examples, the master tape node simply forwards the data packets to the server 904, either directly or indirectly through a gateway tape node (e.g., the long-range tape node, such as wireless communications unit 916, adhered to the mobile gateway 912, or a long-range tape node, such as stationary gateway 914, that is adhered to an infrastructure component of the network communications environment 900). In other examples, the master tape node processes the information contained in the received data packets and transmits the processed information to the server 904.

Distributed Intelligent Software/Liquid Operating System

In conventional systems, computations and analysis of data collected by IOT devices in the field is typically performed at a server or at edge computers that are remotely located from the IOT devices. Such an approach requires these field located IOT devices to communicate large amounts of data to server and/or the edge nodes to allow the server and/or the edge nodes to generate insights and/or make decisions based on the collected data.

The present embodiments provide an alternative approach whereby the IOT devices in the field are each their own master, and each include distributed intelligent software (also referred to as liquid operating system (OS)) and follow an assigned mission. Advantageously, the distributed intelligent software allows the IOT devices to operate as masters and follow their assigned missions in the field, which may include analyzing collected data, making intelligent decisions, supporting other tape nodes, solving problems and handling events without any need to contact edge nodes or servers of the tracking system.

Figure 10A:
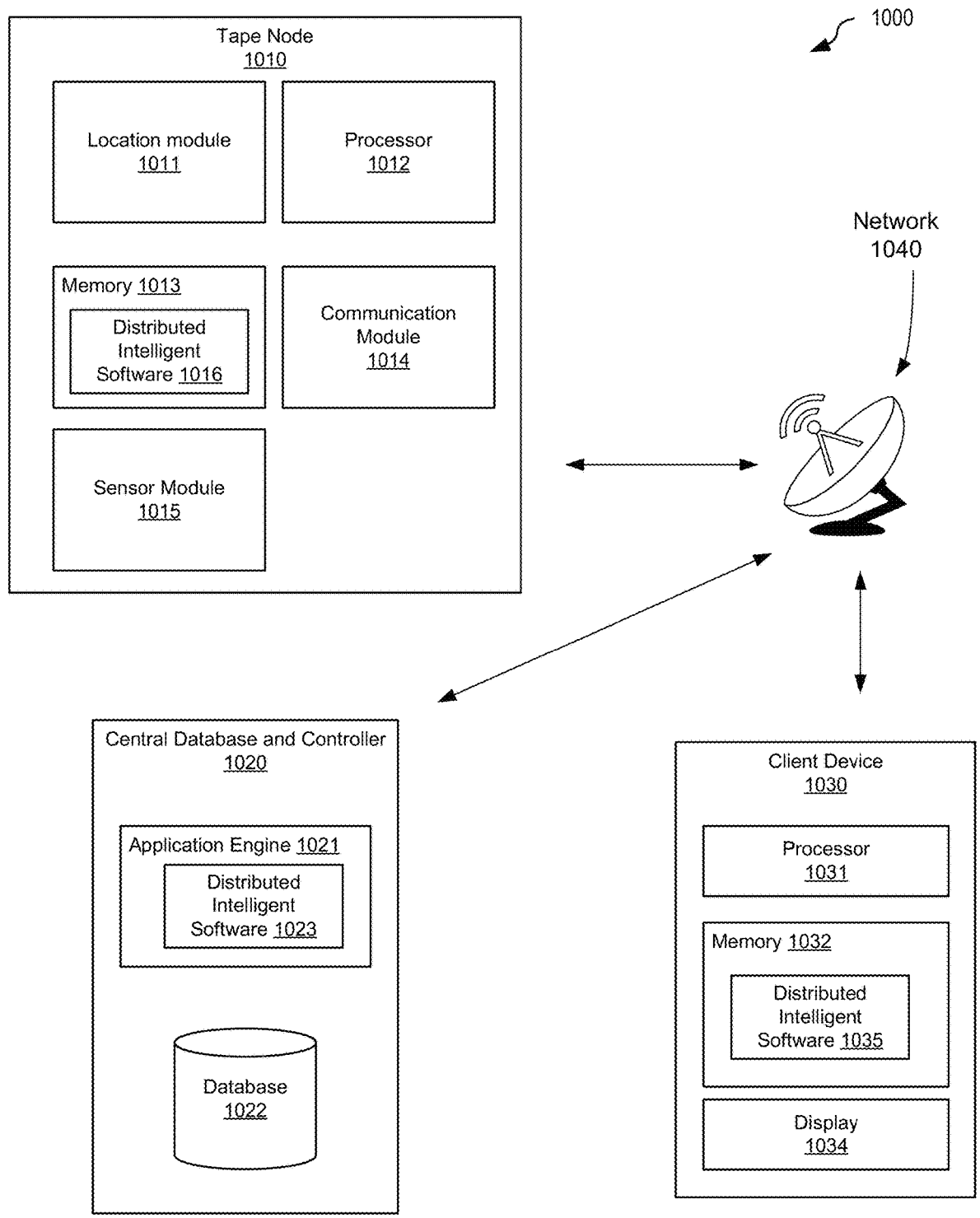
FIG. 10A is a diagram showing an example tracking system implemented by the adhesive tape platform of FIG. 1 and FIG. 3 and described with reference to the network communication environment of FIG. 9, in embodiments.

FIG. 10A is a diagram showing one example tracking system 1000 (also referred to herein as an IOT system) implemented by an adhesive tape platform described above (e.g., adhesive tape-agent platform 112 of FIG. 1, adhesive tape platform 330 of FIG. 3, and so on) and as described with reference to the network communications environment 900 of FIG. 9. The tracking system 1000 includes one or more tape nodes 1010, a central database and controller 1020, one or more client devices 1030, and a network 1040.

Embodiments of the tape node 1010 are also described above with respect to FIGS. 1-9. Each tape node 1010 may include a location module 1011, a processor 1012, memory 1013, a communication module 1014, and a sensor module 1015, according to some embodiments. The location module 1011 collects data relevant to the location of the corresponding section of the tape node 1010. The location data collected by the location module may be stored in the memory 1013. The memory 1013 may also store distributed intelligent software 1016 (also known as liquid operating system (OS)), described in detail below. The location data may also have computations performed on it by the processor 1012 and may be transmitted by the communication module 1014 to the central database and controller 1020 and/or one or more of the client devices 1030 via the network 1040. The client devices 1030 are used by an authorized user of the tracking system 1000 and may represent one or more of a delivery employee, a customer, a final recipient, an administrator of the tracking system 1000, and so on. The location data may include geographic locations ascertained from systems including GPS, cellular network systems (e.g., GSM), wireless local area networks (e.g., a system of Wi-Fi access points), a dead-reckoning system, some other location system, or some combination thereof.

The tracking system 1000 may also include tracking devices and components deployed in the field other than devices with the flexible adhesive tape form factor. For example, an embodiment of the tape node 1010 may include a non-flexible tracking device that may be used to track assets, interact with other tape nodes 1010, communicate with the central database and controller 1020 and client devices 1030, perform other functions, or some combination thereof. Examples of the tape node 1010 may also include gateway devices (e.g., mobile gateway devices, such as mobile gateway 910, 912, and/or stationary gateway devices, such as stationary gateway device 914) or other communication devices that perform functions in conjunction with the adhesive tape platform and the tracking system 1000. In some embodiments, multiple tape nodes 1010 may have multiple different functionalities, such as performing different types of communication (e.g., long-range, such as high-power wireless communication interface 682", medium-range, such as medium-power wireless-communication interface 672', 672", short range, such as low-power wireless communication interface 652, 652', 652"), and may be deployed and operate together in the tracking system 1000.

The location module 1011 may include the one or more antennas and one or more wireless communication interface circuits (e.g., communication interface 652, 672', and 682" of FIGS. 6A-6C), according to some embodiments. The location module 1011 may further include, for example, a GPS system that includes a GPS receiver circuit (e.g., a receiver integrated circuit) and a GPS antenna. In some embodiments, the location module 1011 also includes one or more wireless communication systems each of which includes a respective transceiver circuit (e.g., a transceiver integrated circuit) and a respective antenna. Example wireless communication systems include a cellular communication system (e.g., GSM/GPRS), a Wi-Fi communication system, an RF communication system (e.g., LoRa), a Bluetooth communication system (e.g., a Bluetooth Low Energy system), a Z-wave communication system, and a ZigBee communication system.

The processor 1012 may be a microcontroller or microprocessor, according to some embodiments. The processor 1012 may be an embodiment of the processor 420 of FIG. 4 and processors 650, 650', and 650" of FIGS. 6A, 6B, and 6C, respectively. In some embodiments, each section of the adhesive tape platform includes more than one processor 1012. The memory 1013 stores tracking data and other data necessary for the functioning of the tape node 1010. The memory 1013 may be incorporated into one or more of the processors 1012 or may be a separate component. The memory 1013 may be an embodiment of the memory 426 of FIG. 4, and/or of the memory 658, 658', and 658" of FIGS. 6A, 6B, and 6C, respectively.

The communication module 1014 enables communication between the tape node 1010 and the central database and controller 1020 via the network 1040. The communication module 1014 may include embodiments of the wireless communication modules 412, 414 of FIG. 4 and/or one or more of the low-power wireless-communication interface 652 of FIG. 6A, the medium-power wireless-communication interface 672' of FIG. 6B, and the high-power wireless-communication interface 682" of FIG. 6C. The communication module 1014 also enables communication between the tape node 1010 and one or more of the client devices 1030. In some embodiments, the communication module 1014 enables a segment of the tape node 1010 to communicate with another segment of the tape node 1010. The communication module includes one or more wireless communication systems each of which includes a respective transceiver circuit (e.g., a transceiver integrated circuit) and a respective antenna. Example wireless communication systems include a cellular communication system (e.g., GSM/GPRS), a Wi-Fi communication system, an RF communication system (e.g., LoRa), a Bluetooth communication system (e.g., a Bluetooth Low Energy system), a Z-wave communication system, and a ZigBee communication system. The one or more wireless communication systems in the communication module 1014 may be shared with the location module 1011.

The sensor module 1015 includes one or more sensors and/or sensor devices. The one or more sensors may include the examples of sensing transducers 656, 656', and/or 656" described above with respect to FIG. 6. The sensor module 1015 collects sensor data which may be stored in the memory 1013, have computations performed on it by the processor 1012, and be transmitted to one or more of the central database and controller 1020 and the one or more client devices 1030, or some combination thereof. The sensor data may include acceleration data, velocity data, vibration data, capacitive sensing data, humidity data, audio recording data, optical sensor data, infrared sensor data, temperature data, other sensor data, or some combination thereof. The sensor data may include examples of data collected by sensors not described herein.

The distributed intelligent software 1016 may define how one or more devices of the tracking system 1000 process and operate in response to tracking data collected by the tape node 1010. The tracking data is a generic term for the data transmitted from the tape node to other nodes of the tracking system 1000 and includes the location data collected by the location module 1011, the sensor data collected by the sensor module 1015, data received by the communication module 1014 from the central database and controller 1020 and/or the one or more client devices 1030, or some combination thereof. Based on the tracking data, the distributed intelligent software controls how the tape node 1010 alters state. Altering the state of the tape node 1010 alters the actions, functions, and behavior of the location module 1011, processor 1012, communication module 1014, and the sensor module 1015 of the tape node 1010. In some embodiments, altering the state of the tape node 1010 alters other aspects of the adhesive tape platform not described herein. The processor 1012 of the tape node 1010 executes computations and functions based on instructions (e.g., software instructions) of the distributed intelligent software 1016 to alter the state of the tape node 1010. Examples of various states are discussed below, with respect to FIG. 15. Instructions to alter the state of the tape node 1010 may be in the form of executable programmatic code, according to some embodiments.

In some embodiments, logic and instructions relevant to the distributed intelligent software 1016 are stored in the memory 1013 of the tape node 1010. In this case, the tape node 1010 may execute functions and/or programs relevant to the distributed intelligent software 1016 without directly communicating with the central database and controller 1020. As described with reference to FIG. 10B, the tape node 1010 has a defined mission and is its own master. The tape node 1010 may also execute the functions and/or programs without communicating with other tape nodes 1010 or client devices 1030. The processor 1012 may execute the instructions to alter the state of the tape node 1010 based on the tracking data. In other embodiments, the communication module 1014 receives the instructions from one or both of the central database and controller 1020 and the client devices 1030. In other embodiments, the logic is distributed between the tape node 1010, other tape nodes in wireless communication to the tape node 1010, the central database and controller 1020, and the client devices 1030.

The central database and controller 1020 is a system for storing data (including tracking data), running applications, transmitting data to the tape node 1010 and the one or more client devices 1030, and communicating with the tape node 1010 and the one or more client devices 1030. According to some embodiments, the central database and controller 1020 is hosted on one or more servers. The central database and controller 1020 includes an application engine 1021 and a database 1022, according to some embodiments. The application engine 1021 may also store distributed intelligent software 1023, described in detail below. The central database and controller 1020 may include additional or different components than are shown in FIG. 10.

The application engine 1021 executes applications associated with the tracking system 1000. For example, the application engine 1021 may receive communications and data from the tape node 1010 and update the database 1022 based on the data received from the tape node 1010. In another example, the application engine 1021 may provide data from the database 1022 to one or more of the client devices 1030 and communicate instructions to display the data on a display 1034 of the client device.

In some embodiments, the application engine 1021 performs tasks according to the distributed intelligent software 1023. For example, the application engine 1021 detects that an event has occurred based on tracking data received from the tape node 1010, and in response to the detected event, the application engine 1021 generates instructions for the distributed intelligent software 1023 to alter the state of the tape node 1010 and transmits the instructions to the tape node 1010. In some embodiments, the application engine 1021 also generates instructions for the central database and controller 1020 and executes the instructions, in response to the detected event. The application engine 1021 may also generate instructions for the client device 1030, in response to the detected event, according to some embodiments.

The database 1022 stores data and logs of events relevant to the tape node 1010. The database 1022 stores tracking data that it receives from the tape node 1010 via the network 1040. The tracking data may include location data (e.g., GPS coordinates, geographic coordinates, etc.), sensor data, or other data relevant to tracking an item with the tape node 1010. The database 1022 may also store data received from one or more client devices 1030. For example, a client device 1030 may scan a barcode on the tape node 1010 or on an asset being tracked by the tape node 1010. The client device 1030 then transmits a notification regarding the scanning of the barcode to the central database and controller 1020 which the application engine 1021 logs on the database 1022, creating a comprehensive log of data relevant to the tracking of the asset.

The application engine 1021 may perform calculations and processing on the tracking data stored on the database 1022. In some embodiments, the application engine 1021 uses a trained machine learning model to perform computations relevant to the tape node 1010. A trained machine learning model may be used to detect events in the stored tracking data and determine rules that are part of the distributed intelligent software 1023, according to some embodiments. For example, the application engine 1021 may input tracking data from the tape node 1010 to a trained machine learning model which outputs instructions for altering the state of the tape node 1010 in response. The use of a machine learning model to generate instructions according to the distributed intelligent software is described in further detail below, with respect to FIGS. 17 and 18.

The one or more client devices 1030 includes computing devices used by users, human operators, and/or administrators of the tracking system 1000. Examples of the client devices 1030 include personal computers, smartphones, barcode scanning devices, and other computational devices. A client device 1030 may be a dedicated computing device for interacting with the tape node 1010 and the central database and controller 1020. Each client device 1030 includes a processor 1031, memory 1032, and optionally the display 1034, according to some embodiments. A client device 1030 may also include a camera, a sensor, a barcode scanning apparatus, other components, or some combination thereof. Each client device may execute one or more applications for interacting with the tape node 1010 and the central database and controller 1020. For example, a client device may run an application that receives tracking data collected by the adhesive tape platform and provided from the central database and controller 1020, store the tracking data in the memory 1032, and display the tracking data on the display 1034. The memory 1032 may also store distributed intelligent software 1035, described in detail below.

In some examples, a human operator uses a client device 1030 to interact directly with the adhesive tape platform. The human operator may be equipped with a mobile phone or other device that allows the operator to authenticate and initialize the tape node 1010. In addition, the operator can take a picture of an asset including the tape node 1010 and any barcodes associated with the asset and, thereby, create a persistent record (e.g., stored in memory 1032 or database 1022) that links the tape node 1010 to the asset. In addition, the human operator typically sends the picture to a network service and/or transmit the picture to the tape node 1010 for storage in the memory 1013 and/or to the central database and controller 1020 for storage in the database 1022. The display 1034 may display tracking data, notifications, instructions, a user interface, or some combination thereof.

In some embodiments, the client device 1030 performs tasks based on the distributed intelligent software 1035. The term distributed intelligent software as used hereafter refers the collective intelligence of distributed intelligent software 1016, 1023, and 1035 that is distributed throughout the tracking system 1000. An application running on the processor 1031 detects that an event has occurred based on tracking data received from the tape node 1010 or from the central database and controller 1020. Alternatively, the processor 1031 may receive an indication from the tape node 1010 or the central database and controller 1020 indicating that such event has occurred, without requiring the processor 1031 to process the tracking data and expressly detect an event therein. In response to the detected event, the processor 1031 generates instructions to alter the state of the tape node 1010 using the distributed intelligent software (part of which may be stored on the memory 1032) and transmits the instructions to the tape node 1010. In some embodiments, the processor 1031 also generates instructions for the central database and controller 1020 and the client device 1030 transmits the instructions to the central database and controller 1020, in response to the detected event. The processor 1031 may also generate instructions for the client device 1030 and execute them, in response to the detected event, according to some embodiments.

The tape node 1010, the central database and controller 1020, and the client devices 1030 are configured to communicate via the network 1040, which may comprise any combination of local area networks, wide area networks, public network (e.g., the internet), private networks (e.g., intranets and extranets), using wired and/or wireless communication system. In one embodiment, the network 1040 uses standard communications technologies and/or protocols. For example, the network 1040 includes communication links using technologies such as Ethernet, 802.11, worldwide interoperability for microwave access (WiMAX), 3G, 4G, code division multiple access (CDMA), digital subscriber line (DSL), geolocation satellite systems (e.g., GPS, GLONASS, and NAVSTAR), cellular communication systems (e.g., GSM/GPRS), Wi-Fi communication systems, RF communication systems (e.g., LoRa), Bluetooth communication systems (e.g., a Bluetooth Low Energy system), Z-wave communication systems, ZigBee communication systems, etc. Examples of networking protocols used for communicating via the network 1040 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 1040 may be represented using any suitable format, such as hypertext markup language (HTML) or extensible markup language (XML). In some embodiments, all or some of the communication links of the network 1040 may be encrypted using any suitable technique or techniques.

The distributed intelligent software includes logic for managing each of the tape nodes 1010, the central database and controller 1020, and the client devices 1030. In some embodiments, computation related to the distributed intelligent software is distributed among the tape nodes 1010, the central database and controller 1020, and the client devices 1030. For example, logic relevant to the behavior of the tape nodes 1010 may be stored locally on the memory 1013 of each of the tape nodes 1010. The processor 1012 of the tape node 1010 may then access the stored logic and execute the logic based on tracking data that the location module 1011, the transducers/energy harvesting module 1015, and the communication module 1014 has collected, altering the state of the tape node 1010 without receiving any instructions from the central database and controller 1020 and/or a client device 1030.

In other embodiments, the logic relevant to the behavior of the tape nodes 1010 may be stored and executed on the central database and controller 1020. For example, the application engine 1021 may execute the logic in response to receiving tracking data from one of the tape nodes 1010 and transmit instructions to the tape node 1010 to alter its state. In further embodiments, the processor 1012 of the tape nodes 1010 does not execute any of the distributed intelligent software logic and only alters the state of the tape node 1010 in response to instructions received from the central database and controller 1020 or the client devices 1030.

In some embodiments, the logic relevant to the behavior of the tape nodes 1010 may be stored on the memory 1032 of the client device 1030 and executed by the processor 1031. For example, the processor 1031 may execute the logic in response to receiving tracking data from one of the tape nodes 1010, resulting in the client device 1030 transmitting at least one instruction to the tape node 1010 to alter its state.

Figure 10B:
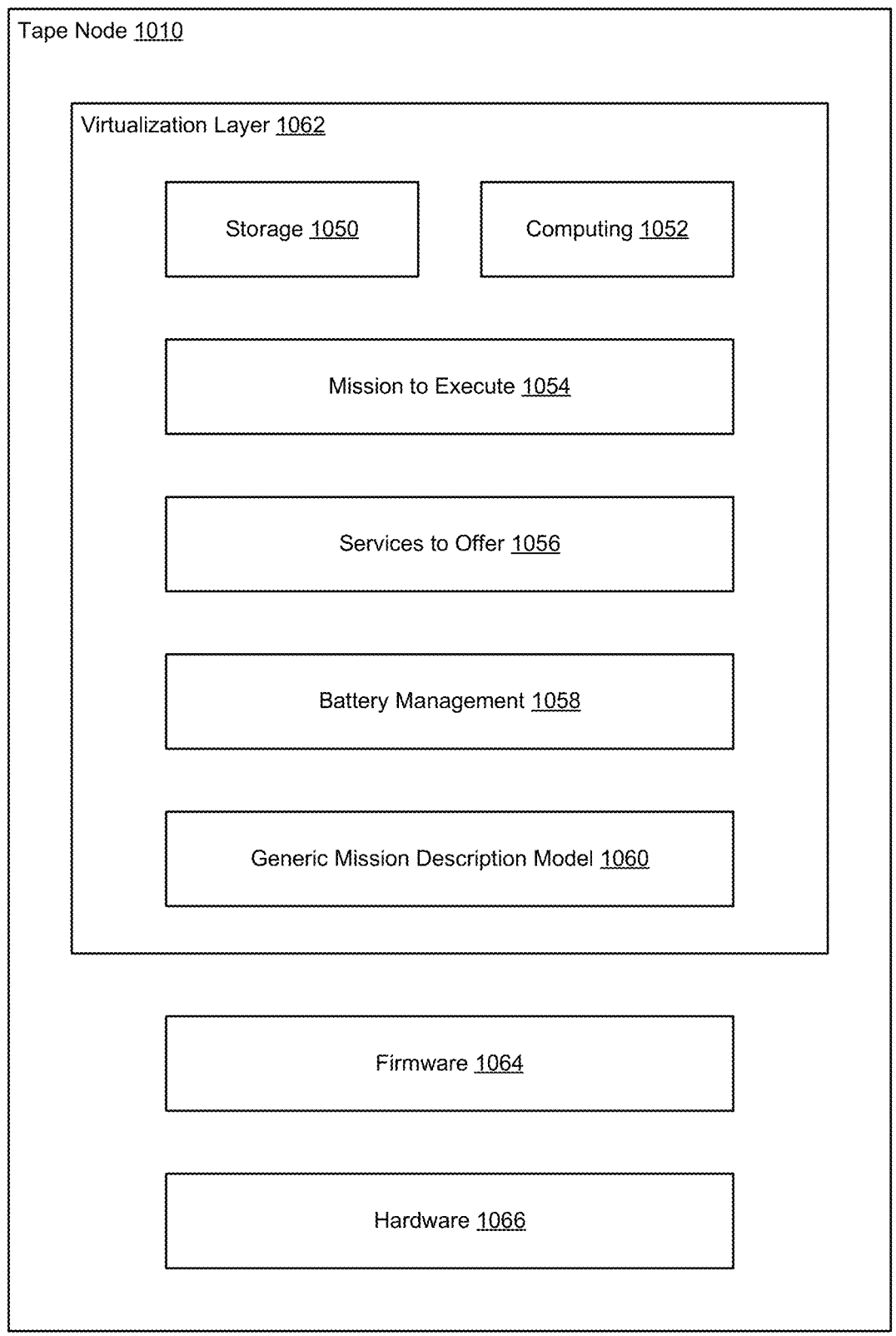
FIG. 10B is a schematic showing an alternative view of the functionality of the tape node of FIG. 10A, in embodiments.

FIG. 10B is a schematic showing an alternative view of the functionality of the tape node 1010 of FIG. 10A. The tape node 1010 includes storage functionality 1050 (e.g., non-volatile memory) and computing functionality 1052. The tape node 1010 includes a mission to execute 1054, which defines the roles and goals of that tape node 1010. Other tape nodes may have different missions to execute 1054, and have different resources (e.g., hardware, capabilities, and battery resources, for example). The tape node 1010 also has services to offer 1056, which defines services and functions that the tape node 1010 may offer to other nodes of the tracking system 1000. The tape node 1010 may also include battery management 1058 that manages use of battery power by the tape node 1010. For example, the battery management 1058 allows the tape node 1010 to maximize its life by adjusting functionality and use of resources to conserve battery power when necessary such that the tape node 1010 completes its mission to execute 1054. The tape node 1010 also includes a generic description model 1060 that defines operation of the tape node 1010 to meet its mission to execute 1054. These functions are implemented by a virtualization layer 1062 that abstracts the functions from the specific hardware 1066 of the tape node. For example, the virtualization layer 1062 may implement a virtual machine that is common to all nodes of the tracking system 1000, thereby allowing the function to be implemented by any of the nodes. The tape node 1010 may also include firmware that is specific to the hardware 1066 and that implements the virtualization layer 1062.

In conventional computing architectures (see FIG. 19), intelligence only occurs within a server or within edge nodes, and the end nodes typically collect and send sensor data to the server or edge nodes for processing and decision making. However, in the tracking system 1000, each tape node 1010 includes distributed intelligent software (e.g., liquid OS) that causes the tape node 1010 to operate as a master, following its mission to execute 1054, and delegating tasks and actions as needed.

In one example of operation, tape node 1010 is attached to an asset (e.g., a package) being shipped to a customer location. The tape node 1010 includes a manifest defining its intended journey, and its mission to execute 1054 is to monitor handling of the asset and to ensure it reaches its destination on schedule. In this example, as the asset is being moved through a warehouse, it inadvertently falls from a conveyer belt when moving towards a transport vehicle. The tape node 1010, following its mission to execute 1054, detects the fall of the asset and that it has stopped moving. The tape node 1010 may then determine that, because it is not moving and that it is not on the transport vehicle, it has a problem. Accordingly, the tape node 1010 communicates with a nearby client device 1030 (e.g., of a supervisor) at the warehouse to indicate the problem. The supervisor may then use the client device 1030 to locate the errant asset and ensure that it gets loaded onto the transport vehicle. In this scenario, the central database and controller 1020 was not involved in detecting or resolving the problem, but may receive status reports indicating the events. Specifically, the mission to execute 1054 causes the tape node 1010, acting as the master, to resolve its uses locally, thereby getting faster results and saving battery power (through using a low-power wireless-communication interface 652).

Figure 11:
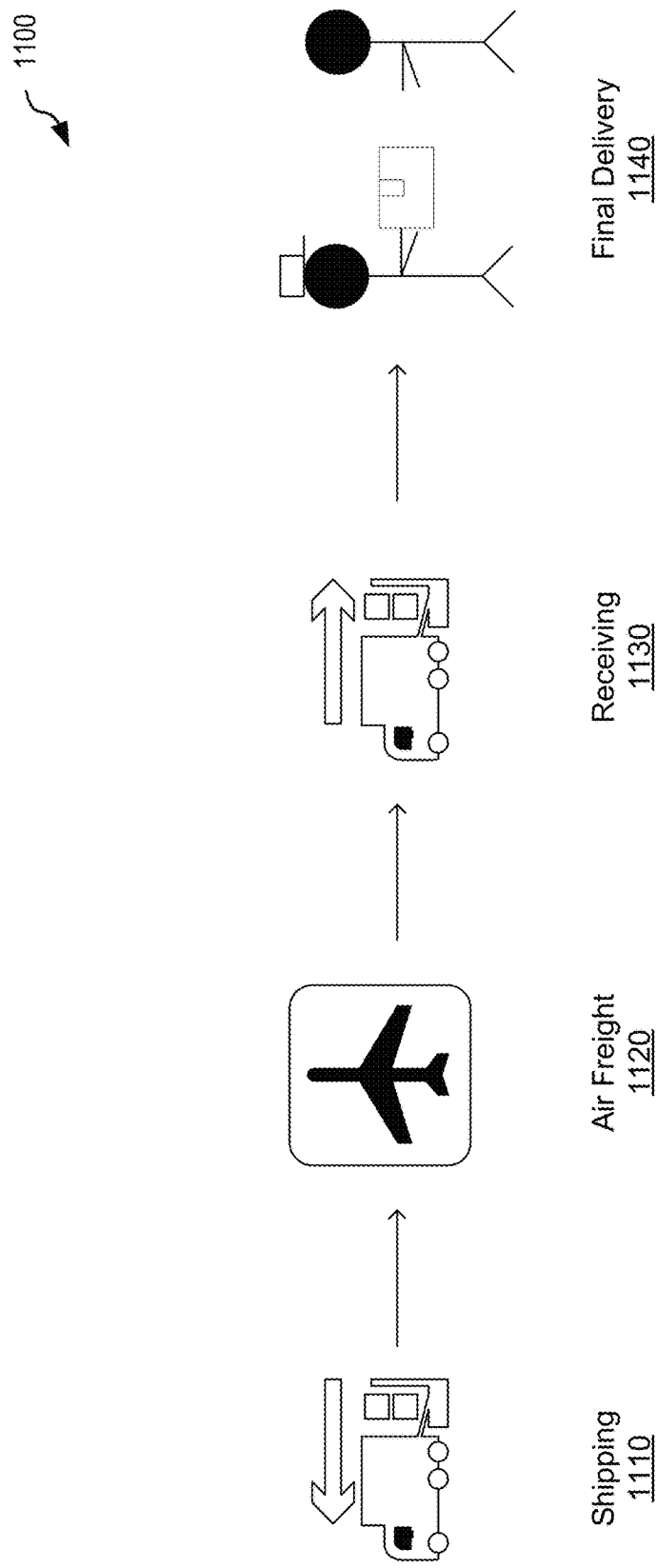
FIG. 11 is a diagram showing example freight phases for assets tracked using the tracking system of FIG. 10, in embodiments.

FIG. 11 is a diagram showing example freight phases 1100 for assets tracked using the tracking system 1000 of FIG. 10, where each asset has a corresponding tape node that may include one or more segments of the adhesive tape platform (e.g., adhesive tape-agent platform 112 of FIG. 1, adhesive tape platform 330 of FIG. 3, and so on). The freight phases 1100 include a shipping phase 1110 from an origin location, an air freight phase 1120, a receiving phase 1130 at an intermediary location, and a final delivery phase 1140 to a customer at a destination. The freight phases 1100 may include different phases than shown in FIG. 11, including a different number and/or order of phases. Distributed intelligent software 1016, 1023, 1035 is implemented across components of the tracking system 1000 and includes rules and expectations relevant to the asset and the corresponding tape node during and between each of the freight phases 1100, according to some embodiments. For example, the distributed intelligent software may include rules that require the tape node to limit its wireless communication during the air freight phase 1120 to comply with air safety regulations, as described further with reference to FIG. 15. As another example, the distributed intelligent software (e.g., distributed intelligent software 1016, 1023, and 1035) may include rules that require the tape node to limit its wireless communication during the air freight phase 1120 to conform to FAA requirements and to preserve battery power. In another example, the distributed intelligent software may include rules that instruct the tape node to increase the fidelity of its tracking data during a final leg of the shipment. This final leg of shipment may occur, for example, between the air freight phase 1120 and the receiving phase 1130 or between the receiving phase 1130 and the final delivery phase 1140.

The shipping phase 1110 includes the beginning of the shipment up to the arrival at an intermediary location. In some embodiments, a tape node is installed on the asset approximately at the time of the shipping phase 1110 at the origin location. In other embodiments, the tape node is installed on the asset at an earlier time (e.g., at a time of manufacturing or packaging). The shipping phase 1110 may include ground shipment of the asset from the origin location to a number of intermediary locations. The shipping phase 1110 may include times where the asset is handled by delivery employees, stored in a shipping center, traveling aboard a vehicle, and arrives at an intermediary location. In other embodiments, the freight phases 1100 only include the shipping phase 1110 and the final delivery phase 1140. For example, this may be the case when the asset is only being shipped a short distance. At the shipping phase 1110 the two-dimensional bar code on the tape node may be scanned by a client device (e.g., client device 1030), in some embodiments. In further embodiments, the client device may communicate with the central database and controller (e.g., central database and controller 1020), in response to scanning the two-dimensional bar code. For example, the client device may notify the central database and controller that shipment of the asset has been initiated, and the central database and controller may log the event in its database and take actions according to the logic of the distributed intelligent software. In some embodiments, a client device may communicate directly with the tape node (e.g., using Bluetooth, Wi-Fi, wireless radio, near-field communication (NFC), or some other communication method) during the shipping phase 1110, instead of or in addition to scanning the two-dimensional bar code. In further embodiments, the client device may receive tracking data from the tape node in response and proceed to transmit that data to the central database and controller. The freight phases 1100 may include more than one shipping phase 1110 where the asset is ground shipped from one intermediary location to a subsequent intermediary location.

The air freight phase 1120 includes the delivery of the asset to a departure airport or air freight center up to the arrival of the asset at an arrival airport or air freight center. During the air freight phase 1120, the two-dimensional bar code on the tape node may be scanned by a client device one or more times. For example, the two-dimensional bar code on the tape node may be scanned by a client device by an airport employee upon receiving the asset at the departure airport. The two-dimensional bar code may later be scanned by a client device upon loading the asset onto an airplane at the departure airport, unloading the asset from the airplane at the arrival airport, handling the asset at the arrival airport, and transferring the asset to ground shipping after landing at the arrival airport. Each time one of the client devices scans the two-dimensional bar code, the respective client device may communicate with the central database and controller 1020. For example, the client device may notify the central database and controller 1020 that air freight of the asset has been initiated, and the central database and controller 1020 may log the event in its database 1022 and take actions according to the logic of the distributed intelligent software 1023. In some embodiments, a client device may communicate directly with the tape node (e.g., using Bluetooth, Wi-Fi, wireless radio, near-field communication (NFC), or some other communication method) during the air freight phase 1120, instead of or in addition to scanning the two-dimensional bar code. In further embodiments, the client device 1030 may receive tracking data from the tape node 1010 and, in response, transmits that data to the central database and controller 1020. In other embodiments, the freight phases 1100 may include more than one air freight phase 1120 where the asset is carried on multiple airplane trips.

The receiving phase 1130 at an intermediary location includes the arrival of the asset at an intermediary location. The receiving phase 1130 may include times where the asset is handled by delivery employees, stored in a receiving center, and transferred to a vehicle or a person for final delivery to the final destination or customer. For example, the intermediary location may include a receiving center in a building which contains the final destination. In some embodiments, the freight phases 1100 only include the shipping phase 1110, the receiving phase 1130 and the final delivery phase 1140. For example, this may be the case when the asset is only delivered via ground shipping. At the receiving phase 1130 the two-dimensional bar code on the tape node may be scanned by a client device as described above in the shipping phase 1110, in some embodiments. In further embodiments, the client device 1030 may communicate with the central database and controller 1020, in response to scanning the two-dimensional bar code. For example, the client device 1030 may notify the central database and controller 1020 that the asset has arrived at the intermediary location, and the central database and controller 1020 may log the event in its database 1022 and take actions according to the logic of the distributed intelligent software 1023. In some embodiments, a client device may communicate directly with the tape node 1010 (e.g., using Bluetooth, Wi-Fi, wireless radio, near-field communication (NFC), or some other communication method) during the receiving phase 1130, instead of or in addition to scanning the two-dimensional bar code. In further embodiments, the client device 1030 may receive tracking data directly from the tape node 1010 in response and proceed to transmit that data to the central database and controller 1020. The freight phases 1100 may include more than one receiving phase 1130 when the asset is ground shipped from one intermediary location to a subsequent intermediary location.

The final delivery phase 1140 includes the asset arriving at the destination. In some embodiments, the final delivery phase 1140 includes the final recipient (e.g., the customer) of the asset accepting and/or confirming the delivery of the asset. At the final delivery phase 1140, the two-dimensional bar code on the tape node 1010 may be scanned by a client device 1030 as described above with respect to the shipping phase 1110 and receiving phase 1130, in some embodiments. For example, the final delivery phase 1140 may include the final recipient signing for the asset and scanning the two-dimensional barcode on the tape node 1010 with a client device 1030 to confirm the arrival of the asset. In another example, a delivery employee may leave the asset at a final location (e.g., the front door of a house) and scan the two-dimensional barcode on the tape node 1010 with a client device 1030 to indicate that the asset has been left at the final location. In further embodiments, the client device 1030 may communicate with the central database and controller 1020, in response to scanning the two-dimensional bar code. For example, the client device 1030 may notify the central database and controller 1020 that the asset has been delivered, and the central database and controller 1020 may log the event in its database 1022 and take actions according to the logic of the distributed intelligent software 1023. In some embodiments, a client device 1030 may communicate directly with the tape node 1010 (e.g., using Bluetooth, Wi-Fi, wireless radio, near-field communication (NFC), or some other communication method) during the final delivery phase 1140, instead of or in addition to scanning the two-dimensional bar code. In further embodiments, the client device 1030 may receive tracking data from the tape node 1010 in response and proceed to transmit that data to the central database and controller 1020.

The distributed intelligent software includes rules and instructions for the tape nodes 1010, the central database and controller 1020, and the client devices for each of the freight phases 1100 and times in between the freight phases 1100, according to some embodiments. The distributed intelligent software instructs the tape node 1010 to enter different tape node states based on the rules and based on the tracking data collected by the tape node 1010. The tape node states may include any combination of one or more of, but are not limited to, the following examples: a low-power mode where the tape node 1010 operates with minimal power consumption; a low-communication mode where the tape node 1010 limits the amount and/or frequency of transmitting and receiving data; a high-communication mode where the tape node 1010 increases the amount and/or frequency of transmitting and receiving data; an airplane mode where some of the wireless communication is deactivated based on air travel regulation; a high-fidelity location mode which increases the resolution and accuracy of location data that is collected and transmitted to the central database and controller (in some embodiments, this includes one or more of increasing the sampling frequency of location data and/or the frequency of transmitting the location data, activating a GPS module on the tape node and collecting GPS-based location data); a low-fidelity location mode which reduces the resolution and accuracy of location data that is collected and transmitted to the central database and controller 1020 (in some embodiments, this includes decreasing the sampling frequency of location data and/or the frequency of transmitting the location data; in some embodiments, this includes deactivating a GPS module on the tape node 1010 and omitting GPS data in the tracking data); a sensing mode in which sensors included in the tape nodes 1020 collect data and transmit the sensor data to other components of the tracking system 1000; a high sensing mode which increases the amount of sensor data collected and transmitted (in some embodiments, this includes increasing the sampling frequency of the sensors and frequency of transmitting the sensor data); a search mode where the tape node 1010 searches to communicate with a client device 1030 in proximity of the tape node 1010; a heartbeat mode where the tape node 1010 intermittently transmits a signal to the central database and controller 1020 to indicate normal functionality of the tape node 1010; an alert mode where the tape node 1010 transmits an alert to one or more of the central database and controller 1020, a client device 1030 of a delivery employee (handler), a client device 1030 of a customer, a client device 1030 of a final recipient, and a client device 1030 of an administrator; a data processing mode where the tape node calculates values (e.g., RMS values, peak values, spectral information, or other calculated values) based on collected tracking data and only transmits the calculated values; and full data mode where the tape node transmits all the tracking data that it collects.

The tape node states may include one or more additional states not listed above. The tape node may be in multiple tape node states simultaneously, according to some embodiments. For example, the tape node may be in both a high-fidelity of location mode and a high communication mode, as described above.

In applications other than shipping and freight, the distributed intelligent software still applies and may include rules based on expectations surrounding the specific application the adhesive tape platform is being used for. In this case, the distributed intelligent software may instruct the tape node to enter any of the above tape node states based on those rules and tracking data collected by the tape node. For example, if the tape node is used to track the location of a light vehicle (e.g., a bicycle) that's being shared by a number of users, the distributed intelligent software may instruct the tape node to enter the low communication mode whenever the light vehicle is within a threshold distance from a central location. Distributed intelligent software rules and parameters may be set by a human operator or administrator of the tracking system 1000. For example, the threshold distance in the above example may be determined by a human operator and input to the tracking system 1000 using a client device 1030. In some embodiments, a human operator interacts with a user interface for editing distributed intelligent software parameters and settings of the tracking system 1000. For example, the human operator may input a threshold distance from a target location to the tracking system 1000 that is used by the distributed intelligent software to detect when a tape node should enter a "final leg mode" state.

Figure 12:
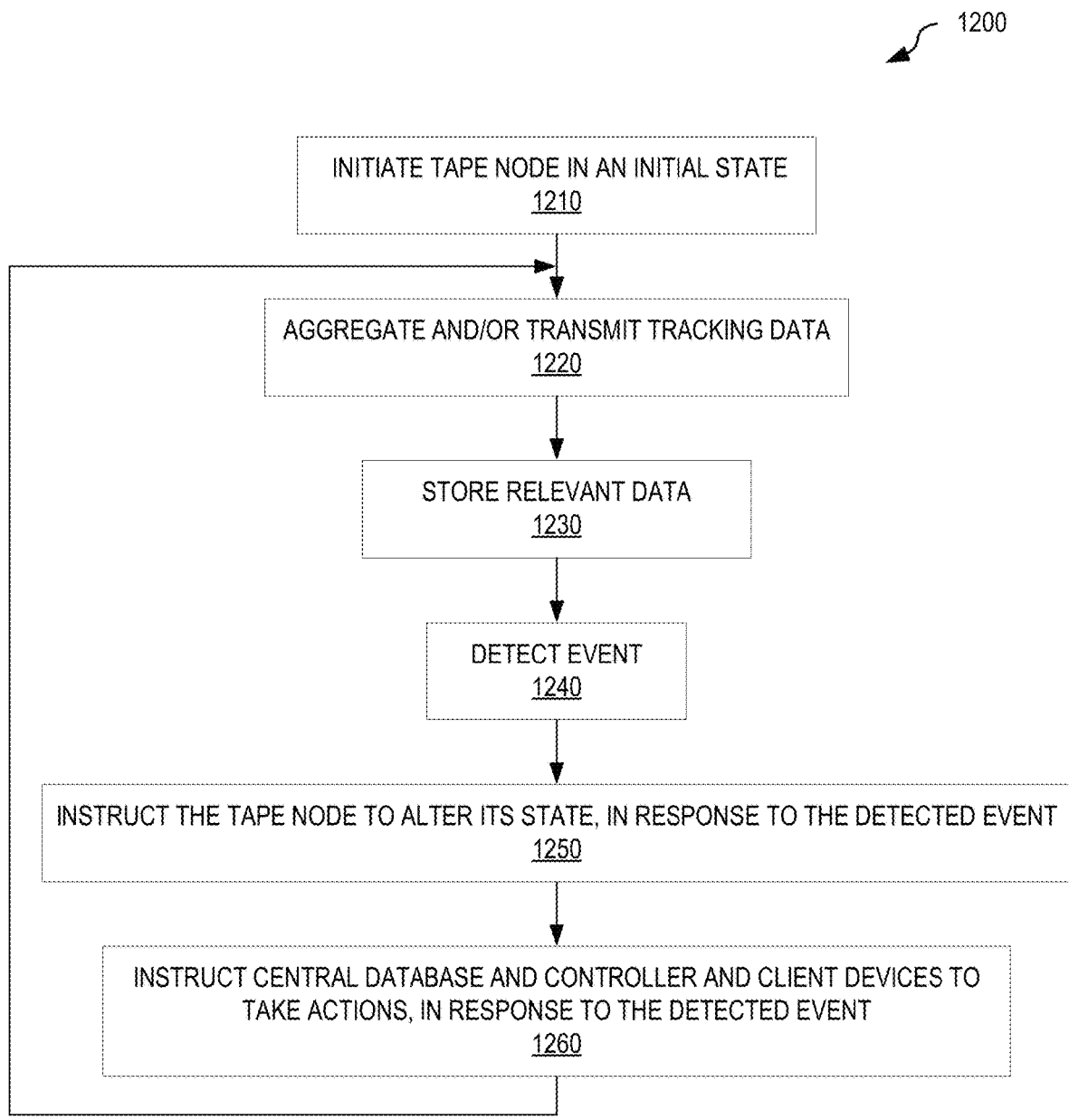
FIG. 12 is a flowchart illustrating one example method implemented by the distributed intelligent software of the tracking system of FIG. 10, in embodiments.

FIG. 12 is a flowchart illustrating one example method 1200 implemented by the distributed intelligent software 1016, 1023, 1035 of the tracking system 1000 of FIG. 10, according to some embodiments. The method 1200, in block 1210, initiates the tape node 1010 in an initial state. The initial state may be any of the tape node states described above or it may be another state. For example, the tape node 1010 may initiate in the low communication state. In block 1220, method 1200 aggregates and/or transmits tracking data. For example, the tape node 1010 aggregates and/or transmits tracking data according to the protocols of the initial state. The tape node 1010 may transmit some or all of the tracking data to the central database and controller 1020 and/or client devices 1030. Relevant data aggregated by the tape node 1010 during the aggregation and/or transmitting of block 1220 are then stored by method 1200 in block 1230. In one example of block 1230, the tape node 1010 may store the tracking data in its own memory, according to some embodiments. In another example of block 1230, the central database and or control system 1020 may store the relevant data in its database 1022 when aggregated data is transmitted from the tape node 1010, according to some embodiments. In another example of block 1230, a client device 1030 may store the aggregated data in its memory 1032 when aggregated data was received from the tape node 1010 and/or from the central database and controller 1030.

Based on the relevant data, method 1200, in block 1240, detects an event. In one example of block 1240, the tape node 1010 detects an event, where the event indicates that the relevant data satisfies one or more of the distributed intelligent software rules and/or conditions. For example, when the relevant data includes location data indicating that an asset tracked with the tape node 1010 is currently within a threshold distance from the destination, the tape node 1010 may detect a "final leg" event. The detected events may include, but are not limited to the following examples: two-dimensional bar code (e.g., identifier 122 of FIGS. 1 and 2) is scanned for shipping; two-dimensional bar code is scanned for air travel; two-dimensional bar code is scanned by a machine or human operator; two-dimensional bar code is scanned for delivery (capture final conditions of the box); two-dimensional bar code is scanned; location of the tape node is within a threshold proximity (e.g., a mile, 5 miles, 300 feet, etc.) of a target location; specific duration of time has elapsed since a preceding event (e.g., 5 days have passed since the two-dimensional bar code was scanned for shipping); estimated velocity of the asset has exceeded a threshold value (e.g., 100 mph, etc.) or is below a threshold value (e.g., 20 mph); sensor detects that acceleration of the asset has exceeded a threshold value or is below a threshold value; a sensor has detected a measurement that exceeds a threshold value or is below a threshold value; and stored energy on an energy storage device on the tape node is below a threshold value or above a threshold value.

In response to detecting the event, the method 1200, in block 1250, instructs the tape node to alter its state. In one example of block 1250, the distributed intelligent software instructs the tape node 1010 to alter its state based upon the detected event. As discussed above, the instructions may be generated by one or more of the tape nodes 1010, the central database and controller 1020, the one or more client devices 1030, or some combination thereof. The distributed intelligent software controls the tape node to enter a particular tape node state based on the instruction generated in block 1250. For example, the distributed intelligent software may control the tape node 1010 to enter a high-fidelity of location mode, as described above. In some embodiments, the distributed intelligent software may control the tape node to exit the initial state based on the instruction generated in block 1250.

In block 1260, method 1200 instructs the central database and controller and the one or more client devices to take corresponding actions, in response to the event detected in block 1240. In one example of block 1260, the distributed intelligent software instructs the central database and controller 1020 and the one or more client devices 1030 to take one or more actions based on the event detected in block 1240. In some embodiments, the distributed intelligent software, at block 1260, instructs the central database and controller 1020 to take one or more of the following actions, based on the detected event: transmit a notification to a client device, for example an alert; transmit further instructions to the tape node (e.g., instructions to alter the state of the tape node); store a log of the detected event; store a log indicating that the tape node has altered its state; store data received from the tape node and/or client devices; transmit data to a client device; and transmit instructions to a client device (e.g., instructions to update a display on the client device).

The instructions for the central database and controller 1020 may include one or more actions not listed above. The distributed intelligent software may issue multiple instructions simultaneously or sequentially. For example, the central database and controller 1020 may receive instructions to both store a log of the detected event and transmit a notification to one or more client devices 1030.

In some embodiments, at block 1260, the distributed intelligent software instructs the client device 1030 to take one or more of the following actions, based on the detected event: display a notification on the display of the client device 1030 (e.g., an alert); transmit further instructions to the tape node 1010 (e.g., instructions to alter the state of the tape node); store a log of the detected event in the client device's memory; store a log indicating that the tape node 1010 has altered its state in the client device's memory 1032; store data received from the tape node 1010 and/or the central database and controller 1020 in the client device's memory 1032; transmit data to the central database and controller 1020; and transmit instructions to the central database and controller 1020.

The instructions for client devices 1030 may include one or more actions not listed above. The distributed intelligent software may issue multiple instructions simultaneously or sequentially. For example, the client device 1030 may receive instructions to both store a log of the detected event and display a notification on the display of the client device 1030.

Examples

Figure 13:
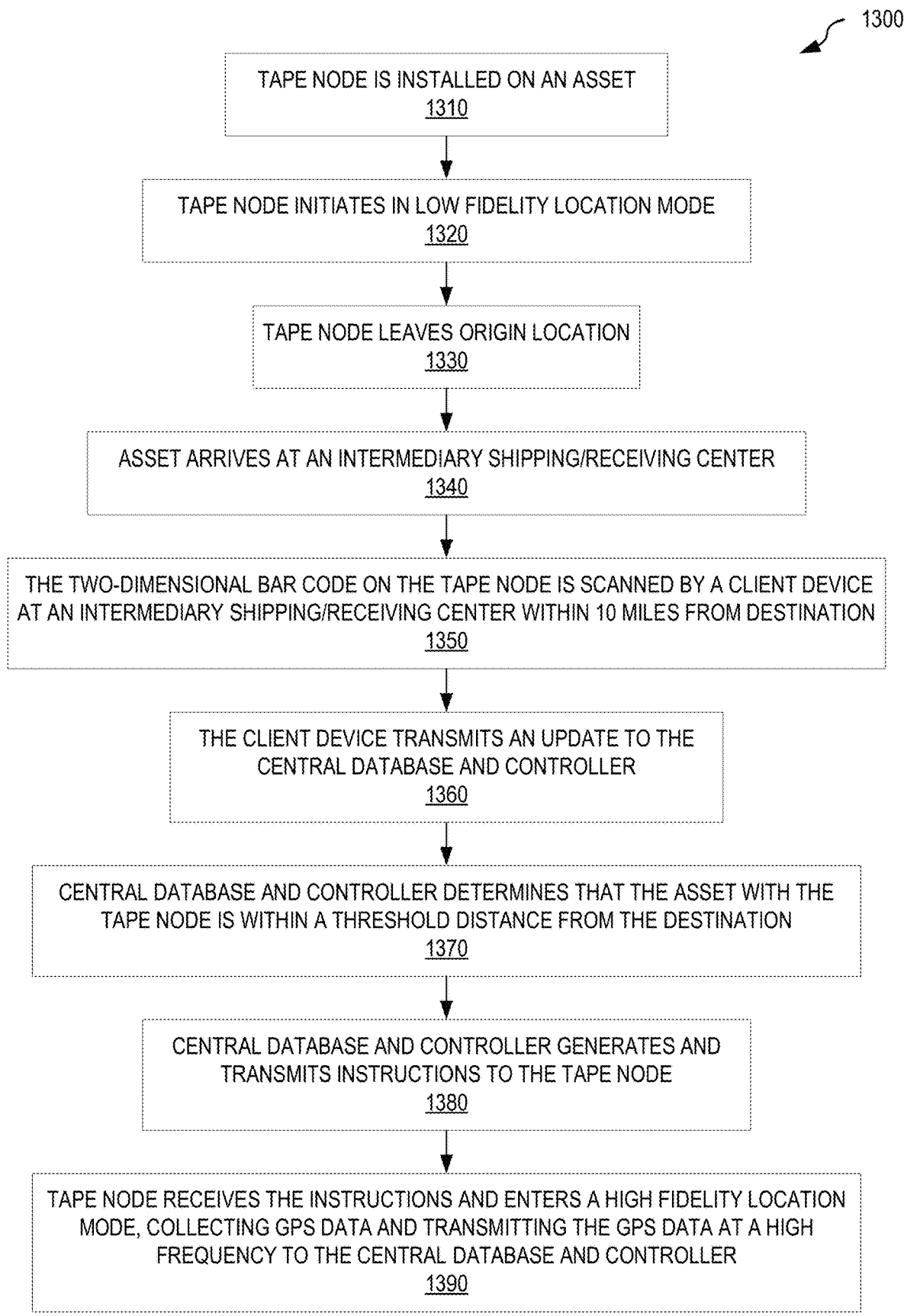
FIGS. 13 through 16 are flowcharts illustrating example methods, implemented in part by the distributed intelligent software of the tracking system of FIG. 10, for tracking an asset being shipped from an origin location to a destination location, in embodiments.

FIG. 13 is a flowchart illustrating one example method 1300, implemented in part by the distributed intelligent software 1016, 1023, 1035 of the tracking system 1000 of FIG. 10, for tracking (e.g., using tape node 1010) an asset being shipped from an origin location to a destination location. In block 1310, the tape node is installed on the asset to be tracked. In one example of block 1310, tape node 1010 is installed on the asset being tracked by the tracking system 1000. In block 1320, method 1300 initiates the tape node into a low-fidelity location mode. In one example of block 1320, distributed intelligent software initiates tape node 1010 in a low-fidelity location mode when the adhesive tape node segment is cut from the adhesive tape platform (e.g., segment 113 of adhesive tape platform 112 of FIG. 1), the tape node segment is adhered to the asset, the two-dimensional barcode on the tape node segment is scanned with a client device, some other initialization method, or some combination thereof. The distributed intelligent software may include instructions that, when the tape node is initialized, controls the tape node to automatically enter a low-fidelity location mode. In this example of the low-fidelity location mode, the tape node deactivates its GPS module and does not include GPS data in the tracking data that is transmitted to the central database and controller. In some embodiments, the tape node transitions to the low-fidelity mode tape node state to reduce power consumption in situations where high resolution of location data is unnecessary.

In block 1330, the asset and the tape node leave the origin location (e.g., via ground shipping, air shipping, ocean freight, or some other method of freight). In block 1340, the asset and the tape node arrive at an intermediary shipping/receiving center. In this example, the intermediary location is within 10 miles of the destination of the tracked asset. At the intermediary shipping/receiving center, in block 1350, the two-dimensional bar code (e.g., identifier 122 of FIGS.

1 and 2) on the tape node is scanned by a client device. The client device may be handled by a human operator or may be an automated device that scans the two-dimensional bar code without a human operator.

In block 1360, in response to scanning the two-dimensional bar code, the client device 1030 transmits an update, indicating that the asset has been received at the intermediary location, to the central database and controller 1020. In one example of block 1360, in response to scanning the identifier 122 (see FIGS. 1 and 2) of tape node 1010 to read a unique identifier of the asset, client device 1030 sends the unique identifier 122 to the central database and controller 1020. In block 1370, the central database and controller determines that the asset with the tape node is within a threshold distance from the destination. In one example of block 1370, in response to receiving the unique identifier, the distributed intelligent software 1016 determines an event has occurred because the scanning of the two-dimensional bar code indicates that the tracked asset with the tape node is within a threshold distance (e.g., 15 miles) from the destination (i.e., in a final leg of the shipment of the tracked asset). In block 1380, the central database and controller 1020 generates and transmits instructions to the tape node 1010. In one example of block 1380, the distributed intelligent software causes the central database and controller 1020 to generate and transmit instructions to the tape node 1010 to alter its state in response to the detected event. In block 1390, the tape node enters a high-fidelity location mode in response to the received instructions. In this example of the high-fidelity location mode, the tape node 1010 activates its GPS module and begins collecting GPS data, transmitting the GPS data frequently to the central database and controller 1020. In this example, the tape node 1010 remains in the high-fidelity location mode for the remainder of the time it is used to track the asset.

The GPS data transmitted from the tape node 1010 in the high-fidelity location mode is used by the central database and controller 1020 to determine, during a final leg of the shipment, an accurate estimated time of arrival (ETA) of the tracked asset at the destination location, according to some embodiments. The determined ETA may be transmitted to a client device 1030 for display to a user, administrator of the tracking system 1000, or human operator handling the asset. In some embodiments, the distributed intelligent software may cause the tape node 1010 to enter additional and/or different states in the final leg of the shipment. For example, the distributed intelligent software instructs the tape node 1010 to enter a sensing mode where the tape node 1010 collects sensor data on the condition of the tracked asset and transmits the sensor data to the central database and controller 1020. The distributed intelligent software may then instruct the central database and controller 1020 to store the sensor data in its database and transmit the sensor data to one or more client devices 1030 for display to a user, human operator, or administrator.

While in the example of FIG. 13 the central database and controller 1020 generates (in block 1380) the instructions to alter the state of the tape node, in other examples the tape node 1010 itself, another tape node, a gateway device, a client device, the central database and controller, or some combination thereof may generate the instructions according to the distributed intelligent software. That is, the distributed intelligent software operates in each of these devices to make intelligent decisions about the operation of the tracking system 1000. In some embodiments where the tape node 1010 itself generates (e.g., block 1380) the instructions, the tape node has the destination location stored in its memory 1013. For example, the destination location may be received from a client device 1030 during initialization. In other examples, the destination location may be received from another tape node, a client device, a gateway device, the central database and controller 1020, or some combination thereof. The tape node 1010 may detect that the asset is in the final leg of shipment based on proximity of the tape node's location (determined, for example, by cellular communications, by low power communication with a gateway associated with a delivery vehicle, based on a period of time that has elapsed since a preceding event, some other method of determining the tape node's location, or some combination thereof) to the destination. In another example, the tape node may detect that the asset is in the final leg of the shipment by directly communicating (e.g., via Bluetooth communication) with a client device 1030 operated by a human operator handling the tracked asset. In this example, the distributed intelligent software operating within the tape node 1010 then generates and executes the instructions without communicating with the central database or control system 1020. By implementing and generating instructions at the tape node 1010, the distributed intelligent software provides the advantage that fewer communication transmissions are necessary. This reduces battery drain on the tape node 1010 because it is not transmitting data to, and receiving data from, the central database and controller 1020. Furthermore, this increases the scalability of many tape nodes 1010 because it reduces bandwidth used by the central database and controller 1030.

In some embodiments, the tape node 1010 includes a configuration file that is used to determine some or all of the functionality of the tape node 1010. For example, the configuration file may include settings and data on which sensors and/or components that the tape node 1010 uses to collect tracking information. In some embodiments, the configuration file includes programs that the processor of the tape node 1010 executes, where the program includes algorithms and programmatic code for altering the state of the tape node. In some embodiments, the configuration file includes parts of the distributed intelligent software and data used by the distributed intelligent software. For example, the configuration file may include geographic coordinates corresponding to the destination. The configuration file may also include the conditions and/or rules that correspond to events relevant to the asset, such as the threshold distance from the destination associated with the final leg of the shipment. The configuration file may be received from another tape node, a gateway device, a client device, the central database and controller, or some combination thereof, according to some embodiments. The configuration file may comprise multiple configuration files. In some embodiments, the configuration file may be updated based on new information relating to the shipping route, such as weather causing a delay from a shipping freight reaching a destination at a determined time of arrival.

Figure 14:
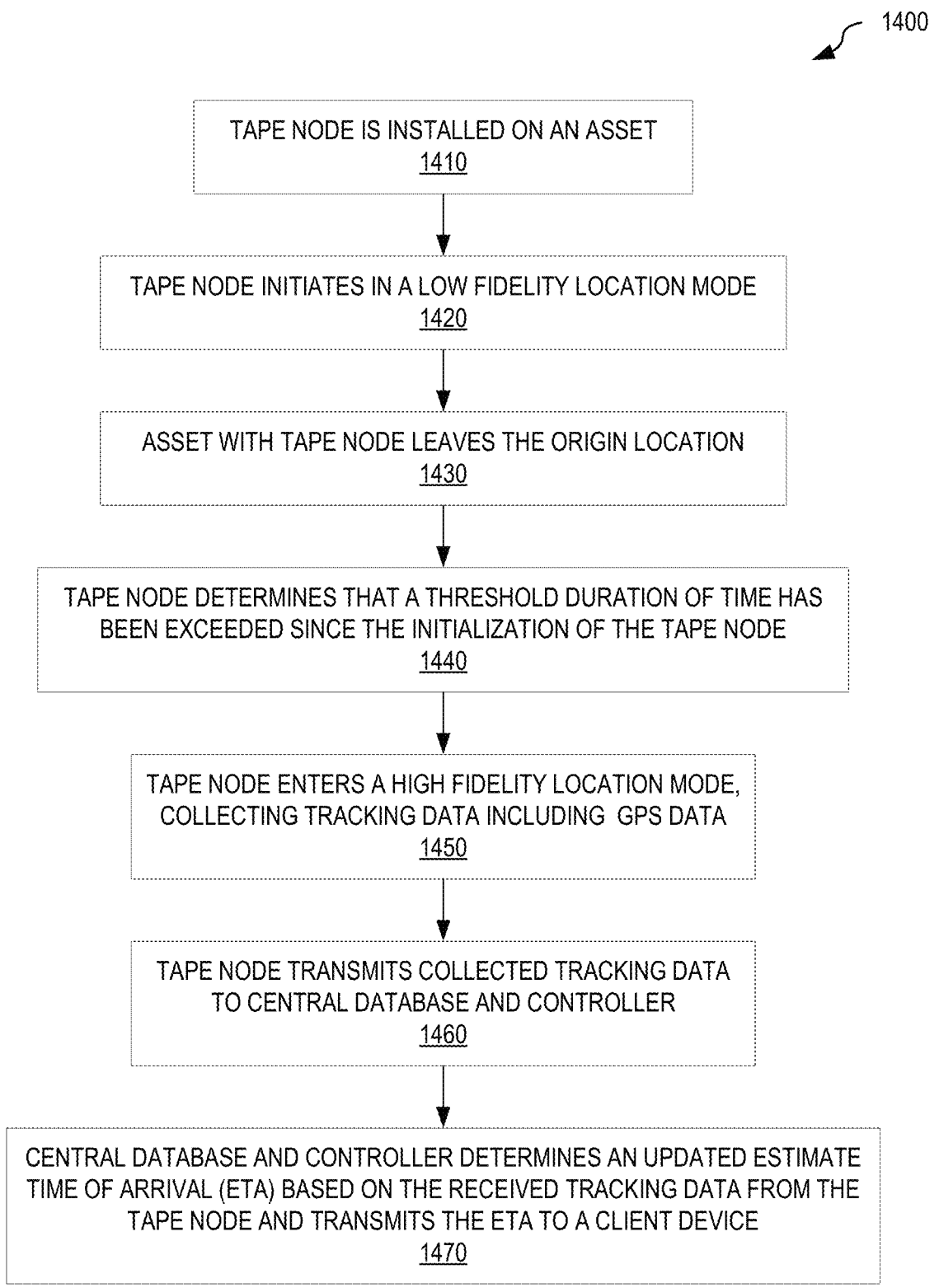

FIG. 14 is a flowchart illustrating one example method 1400, implemented in part by the distributed intelligent software 1016, 1023, 1035 of the tracking system 1000 of FIG. 10, for tracking (e.g., using tape node 1010) an asset being shipped from an origin location to a destination location. In the example of FIG. 14, a tape node (e.g., tape node 1010) is used to track an asset that is being shipped from an origin location to a destination location. Similar to the example of FIG. 13, in block 1410, the tape node 1010 is installed on the asset that is being tracked by the tracking system 1000, and in block 1420 the tape node 1010 initiates in a low-fidelity location mode. In the low-fidelity location mode, the tape node 1010 deactivates its GPS module and does not include GPS data in the tracking data that is transmitted to the central database and controller 1020. In some embodiments, the tape node enters the low-fidelity mode to reduce power consumption in situations where high resolution of location data is unnecessary.

In block 1430, the tape node leaves the origin location (e.g., via ground shipping, air shipping, ocean freight, or some other method of freight). In block 1440, the tape node 1010 determines that a threshold duration of time has been exceeded since the tape node was initialized. In one example of block 1440, the tape node 1010 uses its clock/timer (e.g., the clock/timer circuit 654, 654', 654" of FIGS. 6A-6C) to measure time. In another example, the tape node 1010 uses timing data received over wireless communication (e.g., low-power wireless-communication interface 652 of FIG. 6A) to determine the elapsed time. However, the tape node 1010 may use other timing methods and/or combinations thereof.

In block 1450, in response to determining that the threshold duration of time has been exceeded, the tape node 1010 enters a high-fidelity location mode, collecting tracking data including GPS data. In one example of block 1450, the distributed intelligent software within the tape node 1010 generates instructions to alter the state of the tape node 1010. In block 1460, the tape node 1010 transmits collected tracking data to the central database and controller 1020. In one example of block 1460, the tape node 1010 executes the instructions generated in block 1450, enters a high-fidelity location mode, activates its GPS module, and begins frequently collecting and transmitting the GPS data to the central database and controller 1020. The tape node 1010 may remain in the high-fidelity location mode for the remainder of the time it is tracking the asset. In certain embodiments, the distributed intelligent software controls the tape node 1010 to enter additional states. For example, the distributed intelligent software controls the tape node to also collect and transmit velocity data, acceleration data, sensor data, other data, or some combination thereof.

In block 1470, the central database and controller 1020 determines an accurate estimated time of arrival (ETA) for the asset based on the tracking data, received from the tape node 1010 in the high-fidelity location mode, and transmits the determined ETA to a client device 1030 for display to a user, administrator of the tracking system, human operator handling the asset, or some combination thereof.

The threshold duration of time may be based upon an expected delivery time and/or date of the tracked asset. For example, when a customer is provided an estimated delivery date that is 3 days after the asset is shipped, the threshold duration of time may be 3 days after the initialization of the tape node. In this example, the distributed intelligent software controls the tape node 1010 to enter the high-fidelity location mode when delivery of the asset is late, allowing the central database and controller 1020 to determine and send an updated ETA to the client device to indicate when to expect the asset to be delivered.

While, in the example of FIG. 14, the distributed intelligent software running within the tape node 1010 generates the instructions to alter the state of the tape node 1010, in other examples the distributed intelligent software running in one or more of another tape node 1010, the client device 1030, the central database and controller 1020, the tape node itself, or some combination thereof may generate the instructions to alter the state of the tape node. Advantageously, by implementing the distributed intelligent software in the tape node 1010, fewer communication transmissions are necessary by the tape node 1010, which reduces its battery drain because it is not transmitting data to, and receiving data from, the central database and controller 1020. Furthermore, the distributed intelligent software increases the scalability of many tape nodes because it reduces bandwidth required by the central database and controller 1020.

In some embodiments, the tape node includes a configuration file that is used to determine some or all of the functionality of the tape node. For example, the configuration file may include settings and data on which sensors and/or components that the tape node will use to collect tracking information. In some embodiments, the configuration file includes programs that the processor of the tape node executes. In some embodiments, the configuration file includes parts of the distributed intelligent software, including algorithms and programmatic code for altering the state of the tape node. For example, the configuration file may include timestamps corresponding to an original projected ETA for the arrival of the asset. The configuration file may also include the conditions or rules that correspond to events relevant to the asset, such as the threshold duration of time from the initialization of the tape node used in block 1440. The configuration file may be received from another tape node, a gateway device, a client device, the central database and controller, or some combination thereof, according to some embodiments. The configuration file may comprise multiple configuration files.

Figure 15:
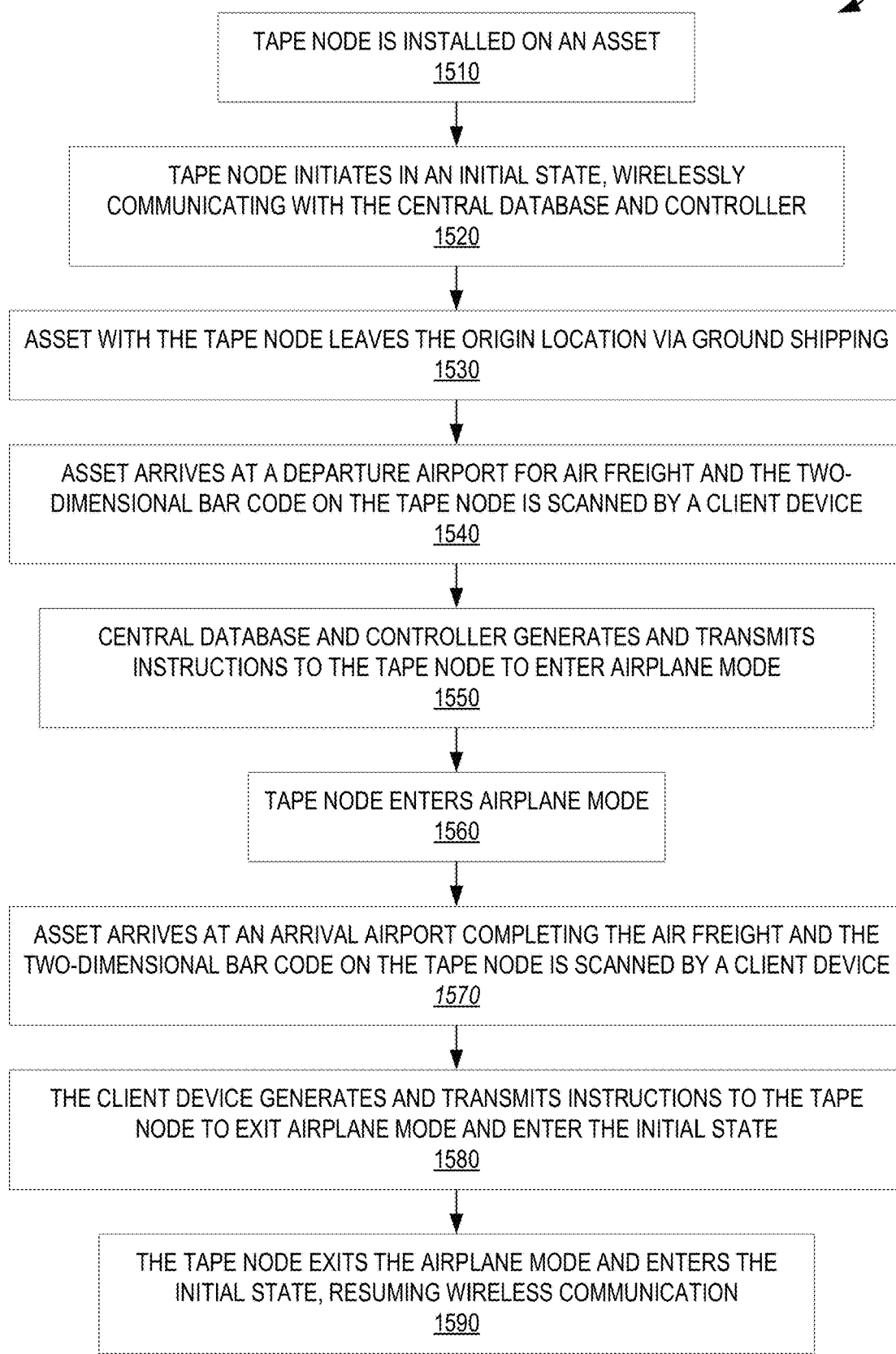

FIG. 15 is a flowchart illustrating another example method 1500, implemented in part by the distributed intelligent software 1016, 1023, 1035 of the tracking system 1000 of FIG. 10, for tracking (e.g., using tape node 1010) an asset being shipped from an origin location to a destination location. In this example, the shipping process for the asset includes air freight. Similar to the examples of FIGS. 13 and 14, in block 1510, the tape node 1010 is installed on the asset being tracked by the tracking system 1000. In block 1520, the tape node 1010 initiates to an initial state that allows wireless communication between the tape node 1010 and the central database and controller 1020. In block 1530, the asset and the tape node 1010 leave the origin location via ground shipping. In block 1540, the asset arrives at a departure airport where it is transferred to an airplane for air freight and the two-dimensional bar code (e.g., identifier 122 of FIGS. 1 and 2) on the tape node 1010 is scanned by a client device 1030. The client device 1030 transmits an update to the central database and controller 1020, according to the distributed intelligent software, notifying the central database and controller 1020 that the asset has been transferred for air freight.

The central database and controller 1020 determines that the asset will begin air freight, in response to receiving the update. In other embodiments, the central database and controller 1020 determines that the asset will begin air freight based on other data. In block 1550, the distributed intelligent software within the central database and controller 1020 generates, and transmits to the tape node 1010, instructions to cause the tape node 1010 to alter its state. In this example, the tape node 1010 enters an airplane mode to comply with air travel safety regulations. For example, the tape node 1010 may deactivate wireless communication systems (e.g., cellular communication system and/or GPS systems).

In block 1570, the tracked asset with the tape node 1010 arrives at a destination airport, completing the air freight portion of the shipment, and the two-dimensional bar code on the tape node 1010 is scanned by a client device 1030. The distributed intelligent software in the client device 1030 transmits, to the central database and controller 1020, an update indicating that air freight has ended for the asset. In block 1580, in response to scanning the two-dimensional bar code, the distributed intelligent software within the client device 1030 generates and transmits instructions that cause the tape node 1010 to alter its state. The client device 1030 and the tape node 1010 may use communication channels that are still active in the tape node 1010 in the airplane mode (e.g., Bluetooth communications or Wi-Fi). In block 1590, the distributed intelligent software running within the tape node 1010, causes the tape node 1010 to exit the airplane mode and enter the initial state, since the tape node 1010 no longer needs to operate in a manner that complies with airplane safety regulation. Accordingly, the tape node 1010 may resume wireless communications.

While in the example of FIG. 15 the central database and controller 1020 generates, in block 1550, the instructions to alter the state of the tape node 1010, in other examples these instructions may be generated by distributed intelligent software within one or more of another tape node 1010, a client device 1030, the central database and controller 1020, the tape node 1010 itself, and/or some combination thereof. In some embodiments, the tape node 1010 includes a program stored in its code that is executed when it receives a transmission confirming that the two-dimensional bar code has been scanned (e.g., in block 1340) at the airport. In other examples, the tape node determines that the asset is beginning air freight based on transmissions from another tape node, a gateway device, a client device, the central database and controller, some other method, or some combination thereof. The distributed intelligent software within the tape node 1010 generates and executes the instructions without communicating with the central database and controller 1020. Advantageously, by implementing and generating instructions at the tape node 1010, the distributed intelligent software reduces the number of communication transmissions needed, thereby reducing battery drain on the tape node 1010. Furthermore, this increases the scalability to allow use of many tape nodes because it reduces bandwidth required at the central database and controller 1020.

In some embodiments, the tape node 1010 includes a configuration file that is used to determine some, or all, of the functionality of the tape node 1010. For example, the configuration file may include settings and data on which sensors and/or components that the tape node will use to collect tracking information. In some embodiments, the configuration file includes programs that the processor of the tape node executes. In some embodiments, the configuration file includes parts of the distributed intelligent software, including algorithms and programmatic code for altering the state of the tape node. For example, the configuration file may include timestamps corresponding to an original projected ETA for the arrival of the asset. The configuration file may also include the conditions or rules that correspond to events relevant to the asset, such as the scanning of the two-dimensional bar code in block 1540. The configuration file may be received from another tape node, a gateway device, a client device, the central database and controller, or some combination thereof, according to some embodiments. The configuration file may comprise multiple configuration files.

Figure 16:
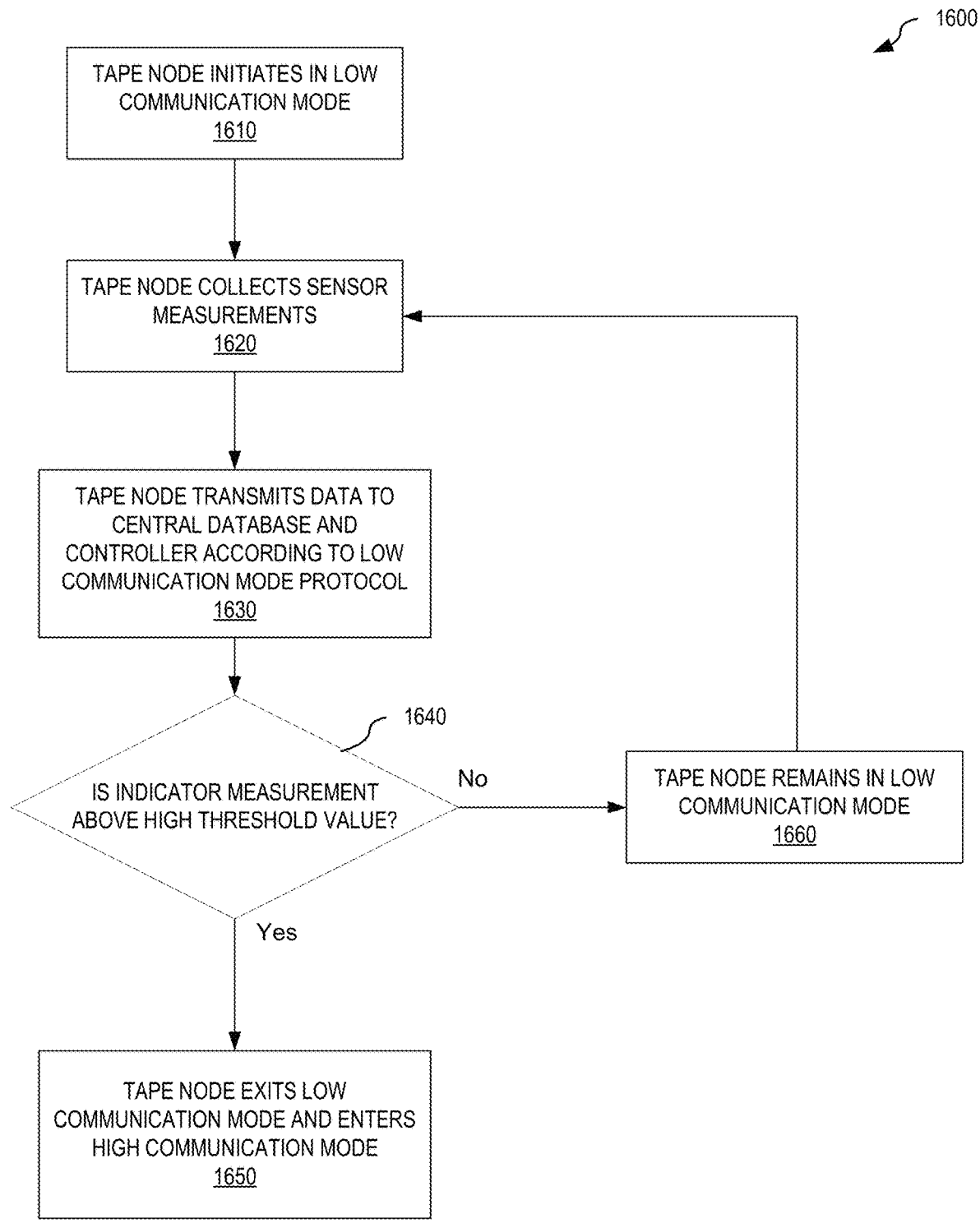

FIG. 16 is a flowchart illustrating one example method 1600, implemented in part by the distributed intelligent software 1016, 1023, 1035 of the tracking system 1000 of FIG. 10, for tracking (e.g., using tape node 1010) an asset being shipped from an origin location to a destination location. In the example of FIG. 16, a tape node that includes a sensor is used to track an item and perform sensor measurements on the item. The item may be an asset being transported, a manufacturing tool, a construction vehicle, or another piece of hardware.

In block 1610, the tape node 1010 initiates in a low communication mode, where wireless communication is limited. For example, the tape node 1010 may only engage in infrequent (e.g., transmitting and/or receiving data once every 2 hours) wireless communication with the central database and controller 1020. In block 1620, the tape node 1010 collects sensor measurements using sensors (e.g., sensing transducers 424 of FIG. 4, transducers 656, 656', 656" of FIGS. 6A, 6B, and 6C) that are associated with the tape node 1010. For example, in device layer 694 of the tape node 1010, transducers 656 may include a vibration sensor (e.g., an accelerometer), as described above with respect to FIG. 6A. In block 1630, the tape node 1010 transmits the sensor data to the central database and controller 1020 according to the low communication mode state's protocols.

Block 1640 is a decision. If, in block 1640, a measurement included in the collected sensor data is above a high threshold value, the method 1600 continues with block 1650; otherwise, the method 1600 continues with block 1660. In block 1650, the tape node 1010 exits the low communication mode and enters a high communication mode. In one example of block 1650, the distributed intelligent software 1016 in the tape node 1010 generates and executes instructions to alter the state of the tape node 1010. In another example of block 1650, the instructions to alter the state of the tape node are generated by the distributed intelligent software running on any one or more of the tape node 1010 itself, the central database and controller 1020, one or more client devices 1030, or some combination thereof. In the high communication mode, the tape node 1010 communicates with the central database and controller 1020 more frequently (e.g., transmitting and receiving data every 5 seconds) than when in the low communication mode. In some embodiments, in the high communication mode, the tape node 1010 transmits a larger volume of sensor data as compared to the volume of sensor data transmitted when in the low communication mode. For example, while only some relevant sensor data (e.g., RMS values of vibration amplitude, peak frequency of vibrations, peak amplitude of vibrations, other data, or some combination thereof) is transmitted in the low communication mode, the tape node 1010 may transmit an increased volume of data or may transmit all of the sensor data collected in the high communication mode (e.g., a fast Fourier transform of the data, data across a full spectral range, more complex data, etc.).

In some embodiments, the high communication mode and low communication mode may include additional and/or alternate behaviors and functions. In this example, the distributed intelligent software controls the tape node 1010 to enter high communication mode because an expectation of the tracked item has been defied based on the collected sensor data. For example, the high threshold value may be a threshold acceleration value that should not be exceeded by a manufacturing vehicle tracked by the tape node 1010. When the distributed intelligent software detects that the manufacturing vehicle is exceeding the threshold acceleration value, the distributed intelligent software instructs the tape node to enter the high communication mode to provide in-depth data to a user and/or administrator of the tracking system. The distributed intelligent software may then instruct a client device to display an alert for notifying a user and/or administrator and display the in-depth data.

In block 1660, since no measurement in the sensor data is above the high threshold value, the distributed intelligent software determines that the tape node 1010 remains in the low communication mode and resumes operation under the protocols of the low communication mode. Blocks 1620 through 1650 repeat until a measurement within the sensor data is above the threshold value. While the example shown in FIG. 16 includes one high threshold value, more than one high or low threshold value may be used. For example, block 1660 may be performed in response to a measurement being below a low threshold value. For example, the acceleration may satisfy the high threshold value and other sensor data (e.g., temperature data, etc.) may satisfy another high threshold. In other embodiments, the distributed intelligent software may perform additional steps that correspond to the indicator measurement being above or below additional threshold values.

Machine Learning Model

Figure 17:
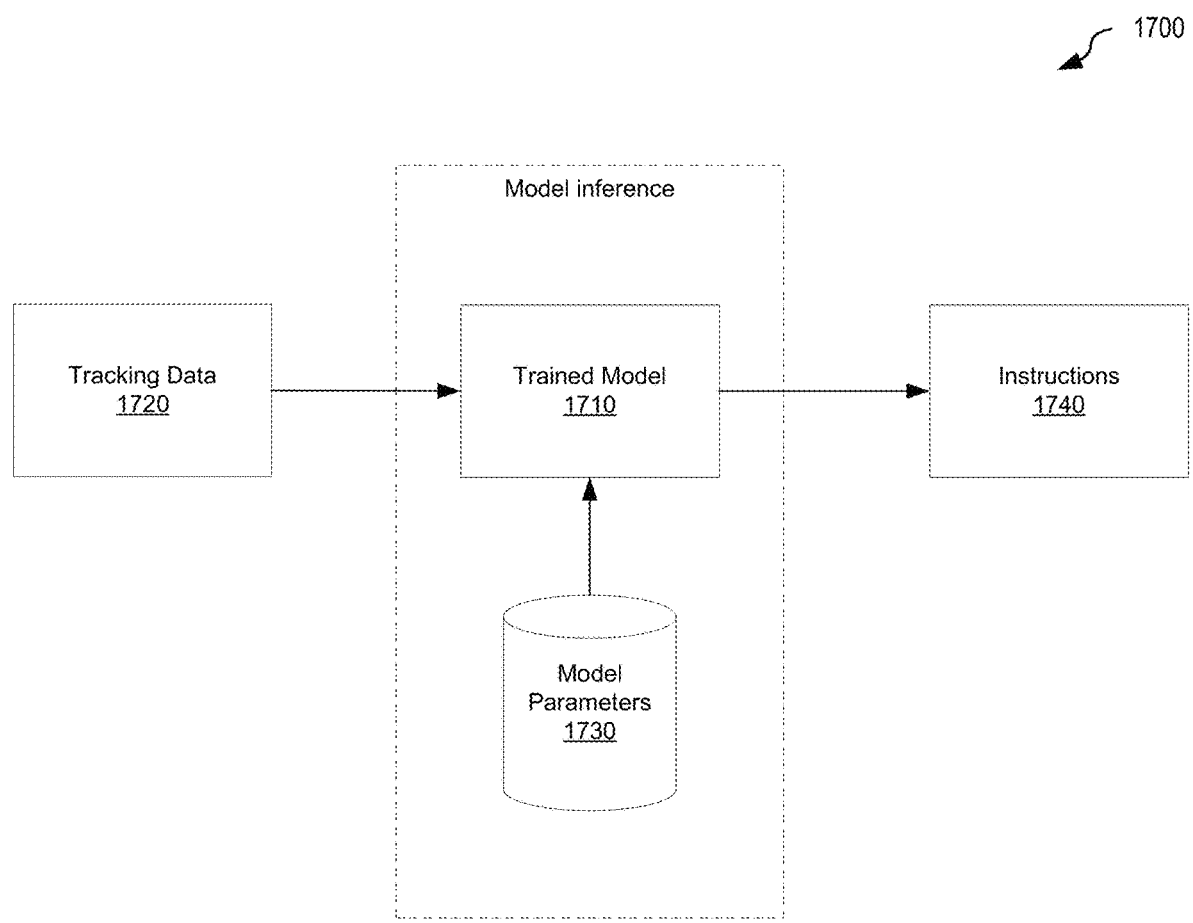
FIG. 17 is a block diagram illustrating example detail of the distributed intelligent software of the tracking system of FIG. 10 implemented as a trained machine learning model that generates distributed machine learning instructions, in embodiments.

FIG. 17 is a block diagram illustrating example detail of the distributed intelligent software 1016, 1023, 1035 of the tracking system 1000 of FIG. 10 implemented as a trained machine learning model 1700 that generates distributed machine learning instructions. In some embodiments, the model 1700 is a neural network trained using a stochastic gradient descent technique or some other type of machine learning model, as described with respect to FIG. 18. In one embodiment, referring to the example of FIG. 10, a trained model 1710 may be stored on any one or more of the central database and controller 1020, the client device 1030, the tape node 1010, and any combination thereof. In this example, the trained model 1710 receives tracking data 1720 as an input and generates distributed intelligent software instructions 1740 that control functionality of the tracking system 1000. The tracking data 1720 may be received from any one or more of the tape node 1010, the client device 1030, the central database and controller 1020, and other components of the tracking system 1000. The trained model 1710, using model parameters 1730 relevant to the distributed intelligent software, generates distributed intelligent software instructions 1740 to alter the state of one or more tape nodes 1010 based on the received tracking data 1720. In some embodiments, the trained model 1710 also generates distributed intelligent software instructions 1740 for the central database and controller 1020, one or more client devices 1030, or any combination thereof. The model parameters 1730 may include values, parameters, conditions, and logic relevant to functionality of the tracking system 1000 that is controlled by the distributed intelligent software. For example, the model parameters 1730 may include one or more threshold values corresponding to the tracking data 1720 that the trained model 1710 uses to determine when an event occurs.

Figure 18:
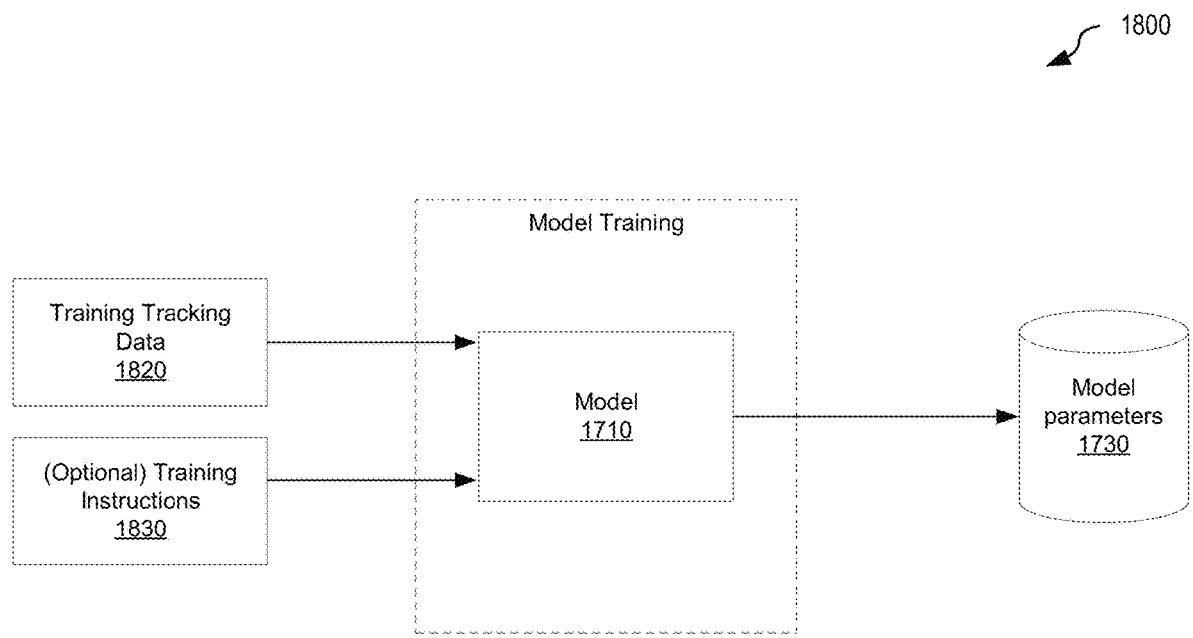
FIG. 18 is a block diagram illustrating example training of the machine learning model of FIG. 17, in embodiments.

FIG. 18 is a block diagram illustrating example training 1800 of the trained machine learning model 1700 of FIG. 17. During a training period, training tracking data 1820 is input to the model 1710. The model 1710 may also optionally receive training instructions 1830 that correspond to the training tracking data 1820. In one example, the model 1710 may receive both the training tracking data 1820 and the training instructions 1830 with a supervised training method. The training instructions 1830 may include distributed intelligent software instructions to alter the state of one or more tape nodes 1010 according to the training tracking data 1820. In the training period, the model 1710 generates the model parameters 1730 according to a best representation of the relationships between the training tracking data 1820 and the associated training instructions 1830. Once the model parameter 1730 are determined, the trained model 1710 generates distributed intelligent software instructions 1740 for controlling operation of one or more tape nodes 1010, the central database and controller 1020, one or more client devices 1030, that form the tracking system 1000.

Conventional Edge Computing Architecture

A conventional edge computing system architecture is not efficient for large IOT systems (e.g., tracking systems) where end nodes of the IOT system have limited battery life and communication capabilities. Where communication is inexpensive (e.g., free because communication resources are unlimited and fast) and computation is considered expensive (since processing of data required power), the conventional cloud computing model is justifiable. However, in the current IOT environment, advances in processing have increased processor speed and reduces power consumption, making computational costs lower than communication costs, particularly where end nodes are required to communicate wirelessly over greater distances, which is increasingly the case on modern IOT systems. Thus, the conventional cloud-based computation model is not optimal for current IOT systems.

Figure 19:
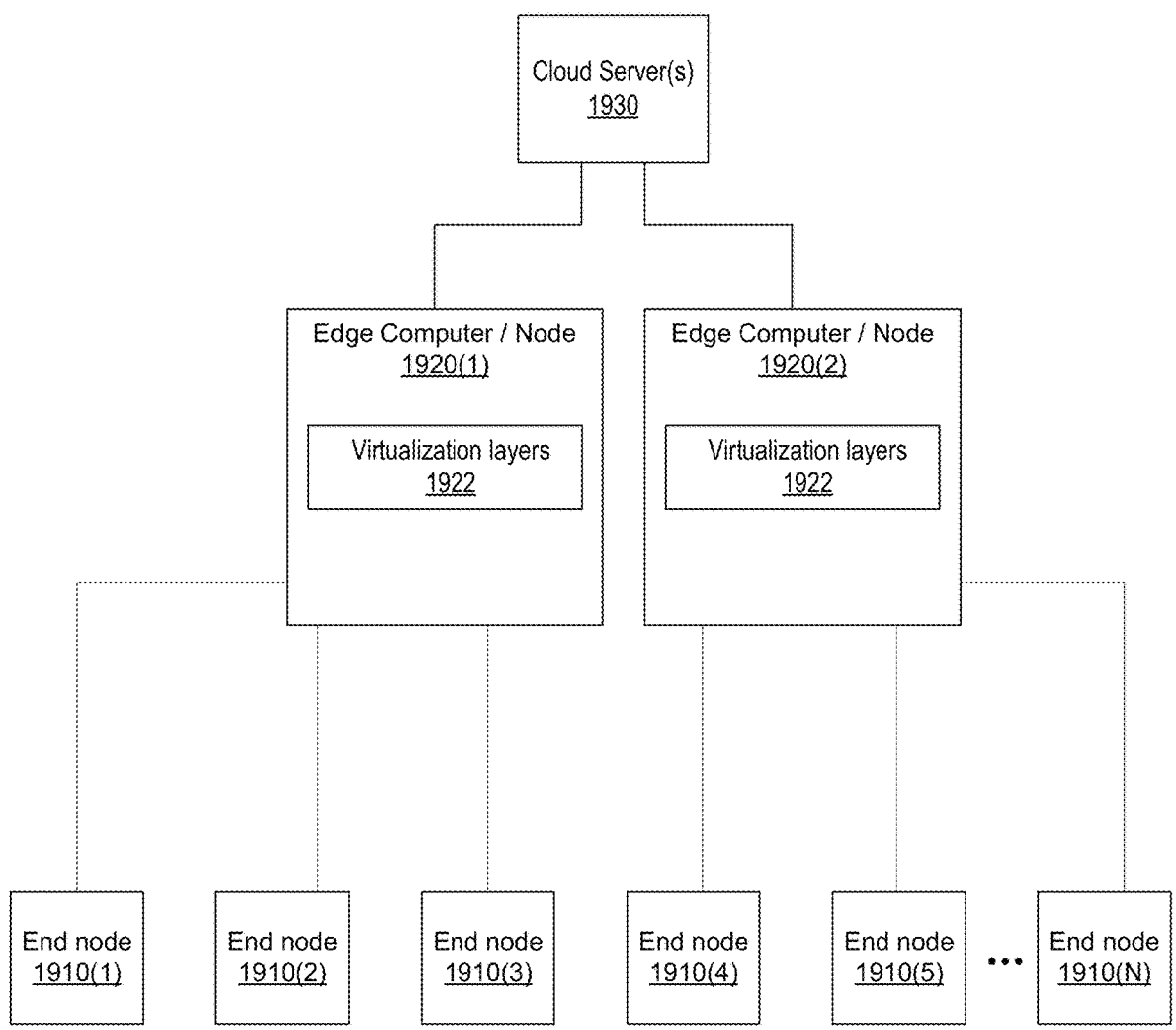
FIG. 19 is a block diagram showing an example of a conventional edge computing architecture for an IOT system.

FIG. 19 is a block diagram showing an example of a conventional edge computing architecture for an IOT system 1901, included herein for example comparison purposes. End nodes 1910 of the IOT system 1901 collect data and transmit the collected data to edge computers/nodes 1920 that perform computation on the collected data. The edge computers/nodes 1920 may have virtualization layers 1922 (e.g., virtual machines, virtual containers, and/or other virtualized system and resources) and may contribute computations for the overall operation of the IOT system 1901, transmitting relevant data upwards to the cloud server(s) 1930. The edge computers/nodes 1920 provide services to collect and process data from the end nodes 1910, and may provider certain services for the end nodes 1910 in some cases. Particularly, the amount of computation performed within the end nodes 1910 is minimal, and therefore these end nodes 1910 do not implement virtualization and cannot contribute to the overall computation of the IOT system 1901.

This architecture of the IOT system 1901 suffers from the cost of communication between the end nodes 1910 and the edge computers/nodes 1920 when the end nodes 1910 communicate wirelessly and are battery operated. Further, increasing the number of end nodes 1910 requires additional infrastructure (e.g., additional edge computers/nodes 1920 with communication links to the cloud servers 1930) to be added to avoid communication and computational bottlenecks, thus limiting scalability of the IOT system 1901.

In cases where communication is costly for the IOT system 1901 (e.g., due to limited battery life, distance for communication, airwave congestion, or some other limitations in the resources of the end nodes 1910), this architecture is not optimal and is not scalable.

Liquid Operating System and Virtualization for IOT System

One aspect of the present embodiments includes the realization that, given the shift in relative costs between computation (reduced) and communication (increased), the overall structure and distribution of computational tasks needed to change. The present embodiments solve this problem by using a liquid OS that dynamically allocates computational tasks and communication tasks between all members/nodes of an IOT system, including end nodes, based on optimizing the cost of the computational tasks and communication tasks. The liquid OS is also referred to as distributed intelligent software herein. Advantageously, the liquid OS makes the IOT system more scalable, as compared to the conventional edge computing architecture. Further, since each node of the IOT system includes the liquid OS, each node includes intelligence for operating autonomously (e.g., as its own master) to minimize communication and reduce latency. As the resources of the node and its environment change, the node automatically adapts to follow its mission and achieve a long battery life. The node may make its own decision, communicating with edge computer/nodes and the servers only as necessary. The node may delegate tasks (e.g., communication tasks, processing tasks, data collection tasks) to other nodes to operate more efficiently and to extend its longevity.

Figure 20:
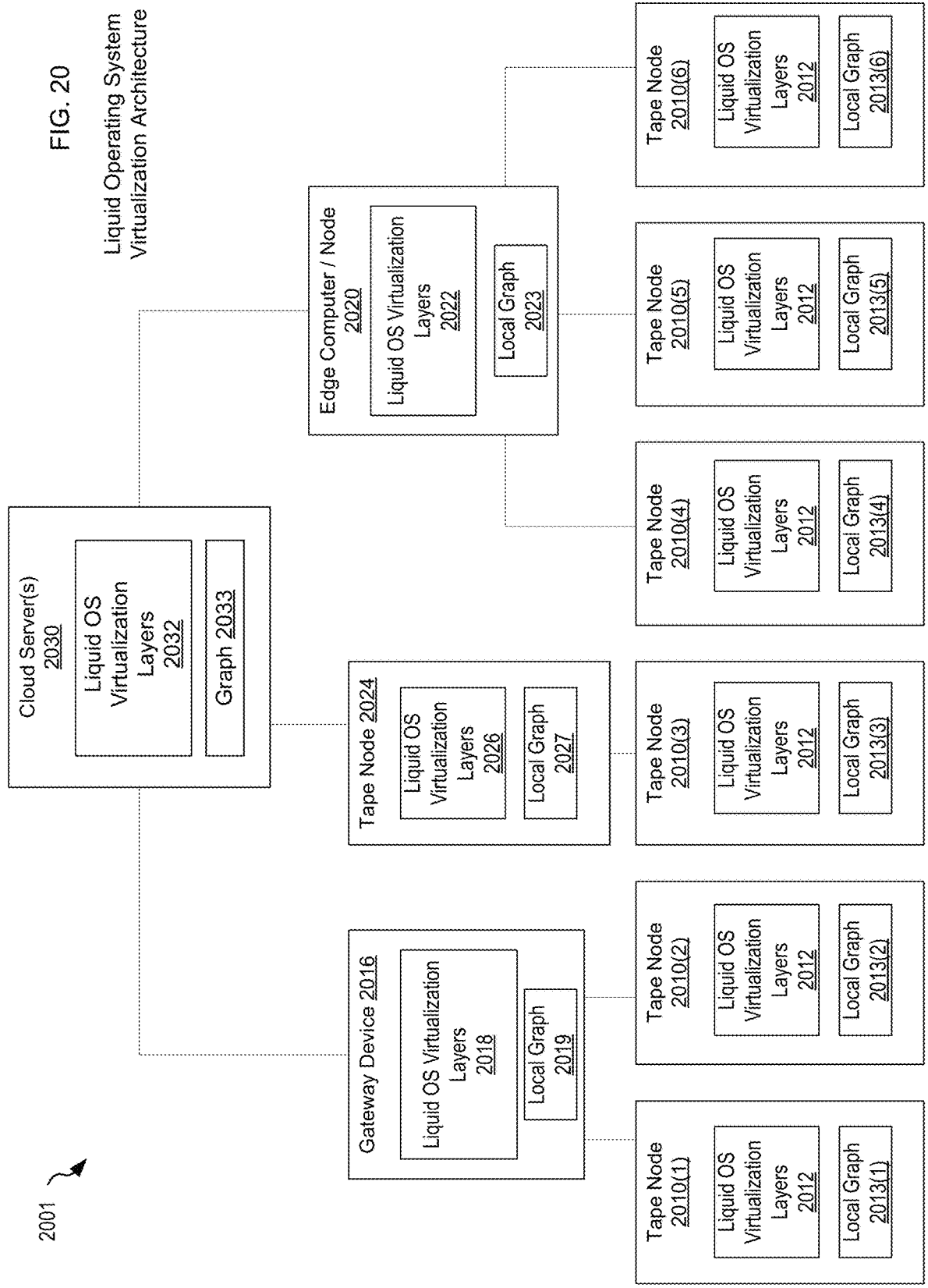
FIG. 20 is a block diagram showing one example IOT system with a liquid operating system (OS) computing architecture, in embodiments.

FIG. 20 is a block diagram showing one example IOT system 2001 (e.g., a tracking system, a sensor system, etc.) with a liquid operating system (OS) computing architecture, according to some embodiments. The IOT system 2001 may represent the IOT system 800 of FIG. 8. In the IOT system 2001, the end nodes 1910 of FIG. 19 are implemented by a plurality of tape nodes 2010, each of which includes a liquid OS virtualization layer 2012. The liquid OS virtualization layer 2012 is software that implements certain functionality of the IOT system 2001 and may be allocated to each particular tape node 2010 based on a task or need of the overall IOT system 2001 and its liquid OS. As used herein, liquid OS refers to the controlling software (e.g., distributed intelligent software) of the IOT system 2001, where each of at least a majority of nodes in the IOT system 2001 includes sufficient intelligence to contribute towards computational tasks and decision making of the IOT system 2001, and therefore the intelligence is not limited to edge computers and servers as with the conventional edge computing architecture. The liquid OS is so called because it may dynamically and flexibly redistribute the roles and tasks of the IOT system 2001 between the nodes of the IOT system 2001.

One advantage of the liquid OS is that the roles and tasks performed by the IOT system 2001 may be re-distributed dynamically to minimize wireless communications (e.g., when the cost of such communication is relatively high). For example, wireless communications availability for each node of the IOT system 2001 may be linked to available battery life of the node. The liquid OS may also re-assign/reorganize the tasks and roles of the IOT system 2001 to optimize other key performance indicators. For example, the liquid OS may re-assign/reorganize the tasks and roles of the IOT system 2001 to reduce latencies of receiving critical data at a specific location (e.g., server, client device, etc.). Reduced latency of receiving sensor data at a server, a client device or dashboard is critical when the IOT system 2001 is tracking and monitoring cold chain assets (e.g., organs for transplant, vaccines, etc.) and the sensor data is an important performance indicator. The liquid OS may also reassign parent-child hierarchical roles based on optimizing performance.

The liquid OS virtualization layers 2032, 2018, 2026, 2022, 2012 abstract the tasks from the specific hardware and resources of the target device. That is, nodes of the IOT system 2001 may have different hardware configurations and resources, and the virtualization layers allow the same task to run on different devices. Advantageously, this allows the liquid OS to delegate tasks to other devices that provide a slave service using their available resources, since the virtualization layers allow those tasks to be performed irrespective of the available hardware on the device. The liquid OS also allows each node to operate as a master agent, making decisions for its own mission, and to operate as a slave device (e.g., secondary agent, tertiary agent) that provides a slave service to other nodes operating in the master agent role.

Unlike the conventional edge computing architecture of FIG. 19, the liquid OS virtualization layers are distributed throughout all nodes of the IOT system 2001, thereby allowing computation to be dynamically distributed to minimize the more expensive communication tasks, particularly for the tape nodes 2010. For example, the liquid OS may distribute at least part of the overall computation task to each tape node 2010 (e.g., the end nodes of the IOT system 2001), such that these tape nodes 2010 contribute to the overall computation performed by the IOT system 2001 when such computation also reduces the communication costs. In certain embodiments, parent nodes of the IOT system 2001 may assign roles and tasks to children nodes of the IOT system 2001. For example, the parent nodes may receive a manifest of available computational, communication, and energy resources for each of their child nodes. Based on which key performance indicator is being optimized, the parent instructs the child nodes when and what data to wirelessly communicate to which other nodes. Additionally, the parent node may instruct its child node(s) to analyze captured data (e.g., from sensors on the child node) to communicate insights and transmit data in response to events. That is, the parent node instructs the child on how to set parameters for event-based communication and state altering (e.g., see block 1250 of FIG. 12). Each parent node reports their child nodes' abilities and configuration (e.g., how they are configured to act) up the hierarchy of the IOT system 2001 (e.g., to the grandparent of the child node). Accordingly, the grandparent nodes may reassign roles across a larger portion of the IOT system 2001 by communicating with each other and determining how tasks and roles should be re-distributed.

At the top of the hierarchy will be the server, which will have a master view of the system but with the lowest latency. In certain embodiments, at least some nodes of the IOT system 2001 have their own virtual machine. For example, certain end nodes (e.g., tape nodes 2010) may include virtual machines. In certain embodiments, the use of virtual machines may depend on available resources in the node and travel paths for the end nodes/sensor nodes. For example, nodes that are mobile do not always have gateway devices 2016, an edge computer 2020, or other nodes 2024 with high computation and/or communication resources available. Accordingly, such nodes may implement a virtual machine; however, nodes that are more static (e.g., nodes that are in a set environment like a building or a room most times) may not need their own virtual machine and may rely on virtual machines of parent nodes. Each tape node 2010 includes at least a short-range wireless-communication system (e.g., low-power wireless-communication interface 652 of FIG. 6A) and may thereby communicate with other proximate tape nodes 2010 and components of the IOT system 2001. Some of the tape nodes 2010 communicate with longer range tape nodes 2024 that have longer range wireless communication capabilities (e.g., medium-power wireless-communication interface 672', 672" and/or high-power wireless-communication interface 682" of FIGS. 6B and 6C respectively) than the tape nodes 2010 (e.g., LoRa, cellular, satellite). The longer-range tape nodes 2024 may act as gateway devices for the associated tape nodes 2010. The longer-range tape nodes 2024 include their own liquid OS virtualization layers 2026, similar to the tape nodes 2010 and the gateway devices 2016. Some of the tape nodes 2010 communicate and/or are connected with edge computers/ nodes 2020. The edge computers/nodes 2020 include their own liquid OS virtualization layers 2022, similar to the tape nodes 2010, the gateway device 2016, and the longer-range tape node 2024. Cloud server(s) 2030 communicates with nodes of the IOT system 2001. The cloud server(s) 2030 may include liquid OS virtualization layers 2032 for supporting the overall liquid OS of the IOT system 2001.

Some of the tape nodes 2010 may communicate with one or more gateway devices 2016 that operate to receive data from the tape nodes 2010, transmit data to the tape nodes 2010, perform computations, perform services for the tape nodes 2010, and communicate with other nodes of the IOT system 2001 (e.g., on behalf of the tape node 2010). The gateway devices 2016 include their own liquid OS virtualization layers 2018, similar to the tape nodes 2010 and thereby also contribute to the overall computational task being performed by the IOT system 2001. For example, each node of the IOT system 2001 may include similar software, based at least in part upon hardware components available in the node. In one example of operation, a node may identify its role in IOT system 2001, its parent-child relationship for connected nodes, computational and data collection tasks it is responsible for, with which other nodes it is to communicate with, how often/when it should communicate, and what data it should communicate. The virtualization layer forms the backbone for coordinating the event-based logic of the intelligent software in each node of the IOT system 2001.

In certain embodiments, the liquid OS generates a graph for optimizing the allocation of tasks to the liquid OS virtualization layers among the nodes of the IOT system 2001. The cloud server 2030 receives resource availability of the IOT system 2001 and generates graph 2033 based upon one or more of communication ability, communication ranges, computational ability, power (e.g., battery) resources, and so on, of nodes 2010, 2016, 2020, and 2024 that make up the IOT system 2001. Accordingly, the cloud server 2030 builds graph 2033 for all reporting components of IOT system 2001. In certain embodiments, based on the graph 2033, the liquid OS assigns roles and/or tasks to each node. The graph 2033 may define computational capability/costs and communication capability/costs for all nodes 2010, 2016, 2024, 2020, 2030 of the IOT system 2001, where the corresponding costs are based on hardware capability and resources of each node, environmental characteristics (e.g., temperature), location (e.g., distance for wireless communication, etc.), current operational mode, and so on. The liquid OS then uses the graph to determine an optimized path that dynamically allocates, using the liquid OS virtualization layers, the computational tasks and communication tasks throughout the IOT system 2001. In certain embodiments, cloud server(s) 2030 may generate graph 2033 and determine roles for each node during deployment of IOT system 2001. In certain embodiments, where IOT system 2001 is more dynamic (e.g., changing capability, requirements, node locations, costs, etc.), cloud server(s) 2030 may, at intervals, update graph 2033 and update roles for each node of the IOT system 2001 accordingly.

In certain embodiments, the cloud server(s) 2030 may update graph 2033 and determine roles for each node of the IOT system 2001 in response to certain events detected by the IOT system 2001. For example, where remaining battery power is running low for tape node 2010(5), cloud server(s) 2030 updates graph 2033 with this information and, using graph 2033, reassigns roles for tape nodes 2010(4) and 2010(5) to allow tape node 2010(5) to communicate with nearby tape node 2010(4) using short-range communication (instead of using longer-range communication with edge computer/node 2020) to reduce power consumption by tape node 2010(5). In another example, where IOT system 2001 is assigned a new task that is not possible with the current configuration, cloud server(s) 2030 updates graph 2033 and determines, based on graph 2033, updated roles for nodes of the IOT system 2001. In another example, where infrastructure (e.g., gateway device 2016, edge computer/node 2020, tape node 2024) fail, are damaged, become lost, or are moved, cloud server(s) 2030 receives updated status information (e.g., from other nodes), updates graph 2033, and based on the updated graph 2033, reassigns roles for remaining nodes of the IOT system 2001.

In certain embodiments, the cloud server(s) 2030 may distribute at least part of the graph 2033 to each node 2010(1)-(6), 2016, 2024, and 2020 of the IOT system 2001, where each node maintains a corresponding local graph 2013(1)-(6), 2019, 2027, and 2023, respectively. Further, each node 2010(1)-(6), 2016, 2024, and 2020 updates their corresponding local graph 2013(1)-(6), 2019, 2027, and 2023, respectively, as changes in local connectivity and resources are determined. The liquid OS operates within each node 2010(1)-(6), 2016, 2024, and 2020 of the IOT system 2001 to use the corresponding local graph 2013(1)-(6), 2019, 2027, and 2023, respectively, to minimize cost of performing tasks required for its mission to execute (see mission to execute 1054 of FIG. 10).

In certain embodiments, each node 2010(1)-(6), 2016, 2024, and 2020 may generate its own local graph 2013(1)-(6), 2019, 2027, and 2023, respectively, based upon detected resources of the IOT system 2001 that are readily available to the node (including its own resources). In one example, local graph 2013(1) may define resources and costs of resources provided by tape node 2010(1), nearby gateway device 2016 and tape node 2010(2). In another example, local graph 2013(5) may define resources and costs provided by tape node 2010(5) and nearby edge computer/node 2020, and tape nodes 2010(4) and 2010(6). In these examples where a node generates its own local graph 2013, the node may do so without communicating with the cloud server(s) 2030 or without communication with a parent node. The node may then determine how to delegate portions of a task to other nodes of the system that it can connect with in order complete its own mission, based at least in part on the generated local graph. For example, as part of determining how to delegate the portions of the task, a first node may determine based on the local graph 2013, a second node that the first node will communicate with, what data the first node will wirelessly communicate to the second node, and additional instructions that the first node will transmit for the second node to execute after receiving the data. According to some further embodiments, a node that has generated its own local graph 2013 may report the details of the local graph 2013 to a parent node. The parent nodes may then communicate it up the hierarchy to the cloud server(s) which update the graph 2033, at least partially based on the local graphs 2013.

Advantageously, the liquid OS may use these local graphs to dynamically allocate computational tasks across the IOT system 2001 to efficiently perform tasks and operations of the IOT system 2001 to maximize one or more key performance indicators (KPIs) (e.g., minimizing cost, reducing battery usage, reducing latency, etc.) throughout the IOT system 2001. For example, wireless communications from the tape nodes 2010 to other nodes of the IOT system 2001 may consume power at a high rate, particularly for longer range communications, and therefore communication becomes a KPI. In some examples, the liquid OS allocates computational tasks to the tape nodes 2010, such that the tape nodes may collect a large volume of data and perform computations before needing to communicate the processed data to other nodes of the IOT system 2001.

The liquid OS also dynamically allocates hierarchical roles in the IOT system 2001, based on tasks that need to be performed and available resources in the IOT system 2001. For example, sometimes, a tape node 2010 has a higher hierarchical role (e.g., a master role) than an edge computer/node 2020 (e.g., a child or slave role). And at a subsequent time, the hierarchy might dynamically shift such that the edge computer/node 2020 assumes the higher hierarchical role, while the relevant tape node 2010 assumes the lower hierarchical role.

The liquid OS dynamically allocates computational tasks, hierarchical roles, and communication based on available resources in the IOT system 2001, computational complexity of the task, a required latency or time to result, battery consumption of a task, remaining battery power, and other factors. The available resources of the IOT system 2001 include one or more of an available battery life associated with each node, a computational power associated with each node, a communication capability of each node, and available communication bandwidth in the airwaves/airspace for the IOT system 2001. The liquid OS thereby optimizes overall operation of the IOT system 2001 to optimize KPIs, which may include reducing the communication when communication and/or battery life are KPIs and critical to optimizing operation of the IOT system 2001. In another example, one tape node 2010 may have a higher priority that other tape nodes (e.g., when performing an important task) and therefore the battery power of that node may have a higher cost, thereby affecting computation and communication KPIs. In another example, communication costs may involve more than one tape node 2010. For example, in certain circumstances, it may be more cost effective for tape node 2010(4) to send data to cloud server 2030 via tape node 2010(3) and tape node 2024 rather than sending the data via edge computer/node 2020, but be more cost effective to receive data from the cloud server 2030 via edge computer/node 2020. Advantageously, the liquid OS selects the optimal path by using the graph to maximize the KIPS.

In certain circumstances, the software within one or more tape nodes 2010, 2024 may be automatically updated (e.g., over the air firmware update) to provide the tape node 2010 with the necessary capability to perform an allocated computation task. However, most functionality is already built into each tape node.

Additional Embodiments

The disclosed architecture includes virtualization where computing is liquid-like, moving from one side of the IOT system (e.g., the core of the system at the cloud/server(s)) to the other side (e.g., at the end nodes such as sensor devices) depending on battery levels at the nodes as well as computation/algorithm intensity. The moving of the computing tasks occurs adaptively based on available resources and associated costs of the IOT system and on the task being performed by the liquid OS. For example, certain costs may increase as available battery power is depleted, whereby the liquid OS dynamically reconfigures by redistribution the computation tasks and the communication tasks.

Liquid OS/Virtualization Layer

The liquid OS may partition complex algorithms across hardware layers (e.g., cloud/server(s), gateway devices, client devices, edge computing devices, wireless IOT devices, and tape nodes) of the IOT system 2001. Accordingly, the IOT system 2001 is not restricted to only edge computing, but is an example of massively parallel computing. Unlike conventional edge computing systems where computation is restricted to edge computing devices (e.g., some Linux box in the room near the end nodes), the liquid OS may distribute the computational tasks to end nodes (e.g., wireless IOT devices, tape nodes, sensor devices), whereby these end nodes have intelligence and contribute towards the liquid OS functionality. For example, the end nodes may perform computations necessary for maintaining the liquid operating system (e.g., contribute to the graph used to dynamically allocate the computation and communication tasks), and may have virtualization layers or components of the liquid OS. Accordingly, each tape node may be considered to have two tasks: to perform its own device specific tasks/functions, and to support the overall liquid OS. For example, certain ones of the tape nodes may provide communication functions and data processing of the liquid OS to other nodes of the IOT system.

For example, instead of always performing computations on the gateway/edge device, certain computations for a task relevant to the liquid OS may be performed on short range tape nodes (e.g., segment 640 of FIG. 6A, master agent 832 of FIG. 8, and master tape nodes 918, 928, 932, 942-948, 966 of FIG. 9), where the short-range tape nodes include short range communication capability (e.g., low-power wireless-communication interface 652, FIG. 6A implementing Bluetooth). The short-range tape nodes may relay the data for the liquid OS through the long-distance tape nodes and/or gateway devices to the cloud/servers and to other nodes of the IOT system.

In summary, the liquid OS/virtualization layer optimizes computation and communication across all nodes in the IOT system 2001 based on the graph 2033. The liquid OS may distribute the computations and virtualization layers based on communication happening at each node. The liquid OS may generate and maintain the graph 2033 that includes resources (e.g., power consumption, battery life, computational expense, airwave congestion, range of communication, and so on). In one example, one or more nodes of the IOT system 2001 may include, as at least part of their mission to execute 1054, a goal of measuring the integrity of communication channels and making this information available to other nodes of the IOT system 2001 such that it may be used by the liquid OS. For example, the node may include specific hardware (e.g., a spectrum analyzer and other frequency testing hardware components) and software for analyzing one or more communication channels used by the IOT system 2001. In certain embodiments, one or more of the nodes of the IOT system 2001 may include a mission goal to inform other notes, and they arrive within a particular environment, of available resources of the IOT system in that environment. Accordingly, the liquid OS (e.g., distributed intelligent software) operating within the arriving node is informed to make intelligent decisions to maximize resources.

The liquid OS distributes the computations/virtualizations based on KPIs and an optimized path in the graph 2033 that indicates where the computation and communication should occur to accomplish the task for a minimum cost to the IOT system. In one example, the optimized path through the graph 2033 corresponds to optimizing battery life of the battery powered nodes in the IOT system and optimizing overall speed/latency for performing the task.

The liquid OS distributes the computing dynamically, based on a level of communication happening at various nodes of the IOT system. For example, the liquid OS considers available the edge computing nodes (e.g., full Linux box) for virtualization/computation, the short-range tape/gateway nodes that include short-range communication capability (e.g., Bluetooth), the medium-range tape/gateway that include medium-range communication capability (e.g., LoRa), long-range tape/gateway nodes that include long-range communication capability (e.g., cellular, satellite), server/cloud nodes, and client devices connected to the network.

Each node may report on the progress of its assigned computations and tasks back to the overall system, and these reports may be transmitted to the other nodes of the IOT system. Advantageously, the liquid OS optimizes against airwave congestion, latency, and battery life and thereby reduces system architecture complexity.

Virtualization of an IOT/Cloud Infrastructure

Conventional IOT platforms operate to move data from the end nodes, up the network hierarchy, to nodes that are more computationally powerful. That is, the conventional IOT platform transmits data from the end nodes, up the hierarchy of the network, to nodes where the data is processed. Thus, the end nodes always communicate to send the data through the network for processing. On the other hand, the liquid OS provides virtualization in various configurations of the IOT system 2001 by assigning roles to implement computation across multiple layers to minimize communication. Because communication is costly in terms of battery life, in certain circumstances computation at the end node is cheaper. Accordingly, the liquid OS generalizes the interface through the hardware of the IOT system and complex algorithms are partitioned to reduce communication. This is not edge or cloud computing (e.g., edge computing that uses a local Linux box to perform the calculations). Instead, end nodes may perform calculations themselves, have intelligence of the liquid OS, and contribute to the overall computation solution provided by the IOT system. Accordingly, everything in the IOT system calculates/computes in parallel by liquidly allocating computation across nodes of the IOT system to maximize KPIs (e.g., minimize communication when communication is costly).

The liquid OS maintains the graph 2033 of where communication is occurring and other factors including information on (a) the expense of the communication (e.g., power and battery life), and (b) the computational expense at each node. The liquid OS determines an optimal path through the graph 2033 (e.g., a shortest path where edges in the graph 2033 indicate the cost, such as battery usage, time, etc., of communication and computation) taking these factors in to account to determine where the computation and communication should be performed. Particularly, the graph (and local graphs) are maintained dynamically and thereby provide an optimal path for current environmental conditions and cost of available resources, including the node's own resources. Path optimization includes battery life of individual nodes in addition to speed/latency of communication and computation.

Each node provides updates on their role/health (e.g., operational status), etc. in the IOT system. Each node has things that it does for itself, and things that it may do, when needed, for other nodes. For example, the node may support the liquid OS, provide communications, send its status (e.g., battery life) to another node in the IOT system, determine how long (e.g., the time before being set to a low-power state during plane flight) it may provide its service (e.g., one or more tasks) to the liquid OS, communicate a piece of code that needs to run to another node. Accordingly, the liquid OS optimizes computing in a way to minimize communication.

Advantageously, battery life is optimized for tape nodes, airway congestion and latency is reduced, since, in large IOT systems, the liquid OS avoids thousands of nodes always communicating their data to the cloud, and thereby avoids other, maybe more critical, data being delayed due to communication congestion. Further, the system architecture complexity is lowered since additional nodes are not required for only handling data communication when large numbers of end nodes are included.

Diagnostic Testing of Infrastructure Using Tape Node on an Asset

Infrastructure components that interact with wireless IOT devices (e.g., tape nodes) of an IOT system may benefit from a method of performing tests and/or diagnostics. Wireless IOT devices that travel throughout physical locations of a plant may be used to instruct, when in vicinity (e.g. communication range) of the infrastructure components (e.g., stationary gateway 914, FIG. 9), the infrastructure components to perform tests and diagnostics. In the following context (e.g., of FIG. 21), the term infrastructure includes the nodes (e.g., static nodes such as gateway device 2016 of FIG. 20, edge computer/node 2020, cloud server(s) 2030, and tape node 2024) that form the backbone of the IOT system 2001, and further includes aspects of an environment that do not form the IOT system but are aspects that a user may wish to test. Such infrastructure may include parts of a building or outdoor environment such as Wi-Fi routers, pieces of industrial equipment such as refrigeration or air conditioning units, security devices, and other such devices that are built in to, or are part of, an environment that the user wishes to periodically test.

In one example, one or more nodes of the IOT system 2001 may include, as at least part of their mission to execute 1054, a goal of measuring the integrity of communication channels and making this information available to other nodes of the IOT system 2001 such that it may be used by the liquid OS. For example, the node may include specific hardware (e.g., a spectrum analyzer and other frequency testing hardware components) and software for analyzing one or more communication channels used by the IOT system 2001. In certain embodiments, one or more of the nodes of the IOT system 2001 may include a mission goal to inform other notes, and they arrive within a particular environment, of available resources of the IOT system in that environment. Accordingly, the liquid OS (e.g., distributed intelligent software) operating within the arriving node is informed to make intelligent decisions to maximize resources.

Given the distributed and static nature of the infrastructure at the plant, testing of the infrastructure is often difficult and time consuming, particularly where each infrastructure component must be visited by an individual to perform the tests and record the results. The following description provides a method for performing tests and/or diagnostics on the infrastructure components at the plant that takes advantage of the transient nature of a wireless IOT device (e.g., a tape node) attached to an asset that moves through the plant. The wireless IOT device is intelligent (e.g., it is not a simple tracking tag) and may be remotely and dynamically instructed to perform diagnostics and tests on the infrastructure components at the plant when the wireless IOT device is in their vicinity (e.g. within communication range). Often, an asset (e.g., an item being manufactured) at a manufacturing plant moves throughout the plant as it is processed. Accordingly, a tape node that is attached to that asset also moves throughout the plant. Where a first type of asset doesn't visit all areas of a plant, a second type of asset may Accordingly, by using two tape nodes, each attached to a different one of the asset types, the two tape nodes collectively visit all areas of the plant. Thus, through coordination of the two tape nodes, at least one of the tape nodes visits (e.g., passes close to) each piece of infrastructure at the plant.

Figure 21:
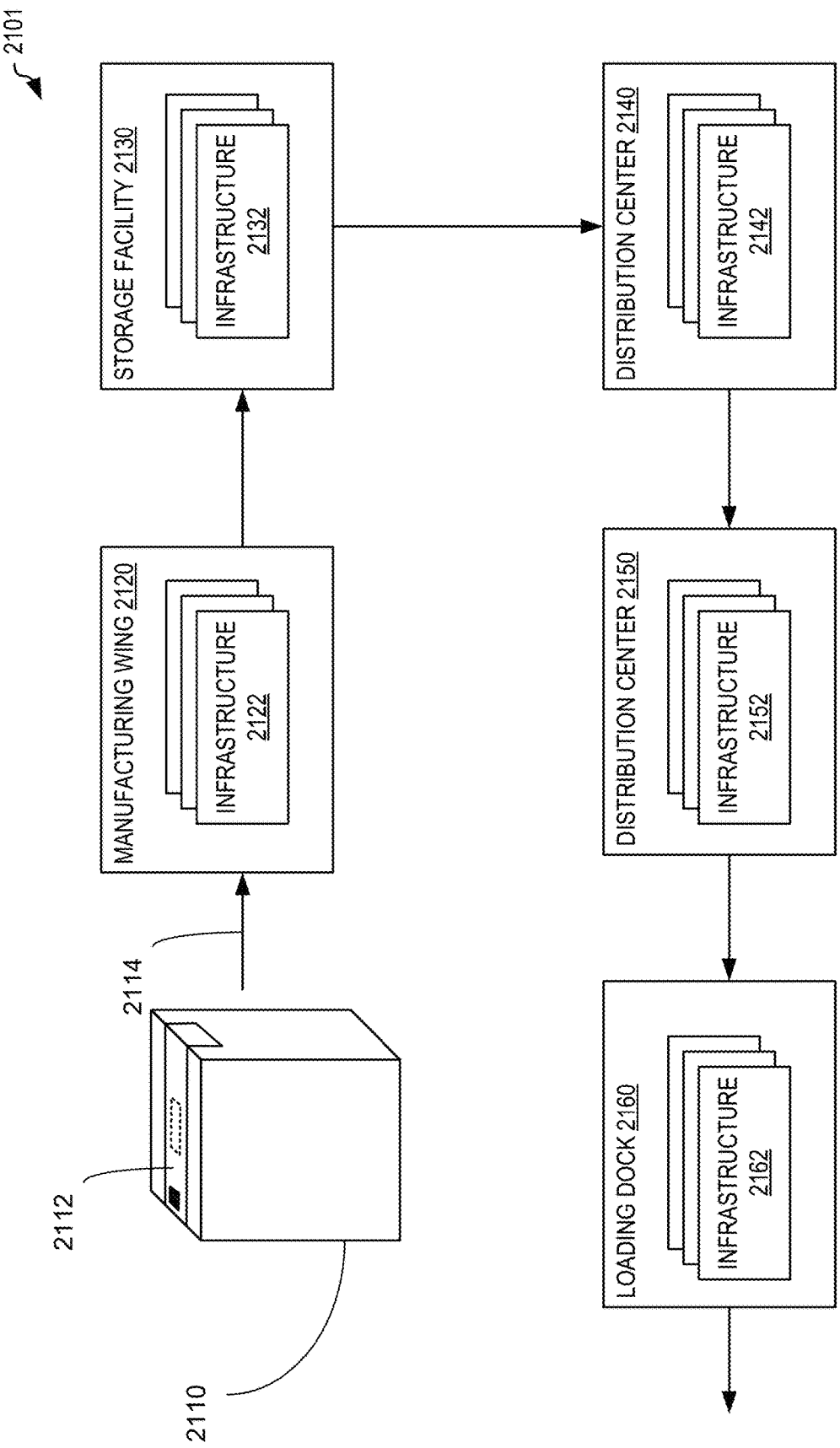
FIG. 21 is a schematic diagram showing an example path of an asset and an associated tape node through various areas of a plant.

FIG. 21 is a schematic diagram showing an example path 2114 of an asset 2110 and an associated (e.g., attached) tape node 2112 of an IOT system through various areas 2120, 2130, 2140, 2150, and 2160 (e.g., rooms) of a plant 2101 (e.g., manufacturing plant). For example, the asset may follow path 2114 during various stages of process of asset 2110 within plant 2101, where tape node 2112 is attached to asset 2110 to track its progress. The tape node 2112 may communicate with an IOT system (e.g., one or more of tracking system 1000 of FIG. 10, IOT system 1901 of FIG. 19, IOT system 2001 of FIG. 20) to track the asset 2110, as described above. The tape node 2112 may represent any one or more of the segment 113 of FIGS. 1 and 2, the segment 332 of FIG. 3, the segment 640 of FIG. 6A, the master agent 832 of FIG. 8, and the master tape nodes 918, 928, 932, 942-948, and 966 of FIG. 9.

In the example of FIG. 21, the asset 2110 travels through the manufacturing wing 2120, the storage facility 2130, the first distribution center 2140, the second distribution center 2150, and the loading dock 2160. The manufacturing wing 2120, the storage facility 2130, the first distribution center 2140, the second distribution center 2150, and the loading dock 2160 each includes infrastructure 2122, 2132, 2142, 2152, and 2162, respectively. The infrastructure 2122, 2132, 2142, 2152, and 2162 may each represent one or more of a tool, a machine, an asset, a computing device, and some other piece of infrastructure that is normally stationary at the plant 2101. During normal operation of the plant 2101, the asset 2110 moves through areas 2120, 2130, 2140, 2150, and 2160 and is actively tracked by the tape node 2112 attached/assigned to the asset 2110.

In certain embodiments, the tape node 2112 may be instructed by the IOT system to perform diagnostic tests on the infrastructure 2122, 2132, 2142, 2152, and 2162 encountered in each of the areas 2120, 2130, 2140, 2150, and 2160. For example, when the asset 2110 and the tape node 2112 enter the manufacturing wing 2120, the infrastructure 2122 is within wireless communication range of the tape node 2112, and the tape node 2112 wirelessly communicates with the infrastructure 2122, instructing it to perform at least one diagnostic and/or test. The tape node 2112 may capture and store results of the at least one diagnostic and/or test and may report the results to a central database and controller (e.g., central database and controller 1020 of FIG. 10) of the IOT system for further evaluation. Later, asset 2110 moves from the manufacturing wing 2120 to the storage facility 2130, and the infrastructure 2132 is within wireless communication range of the tape node 2112. Accordingly, the tape node 2112 instructs the infrastructure 2132 to perform at least one diagnostic and/or test, collects the results of at least one diagnostic and/or test, and sends the results to the central database and controller 1020. Similarly, as the asset 2110 and the tape node 2112 move through areas 2140, 2150 and 216, for encountered infrastructure 2142, 2152, 2162, the tape node 2112 performs at least one diagnostic and/or test, collects the results of at least one diagnostic and/or test, and sends the results to the central database and controller 1020. Advantageously, the IOT system uses the tape node 2112 to perform diagnostic testing of the infrastructure 2122, 2132, 2142, 2152, and 2162 by without requiring additional visits to the areas 2120, 2130, 2140, 2150, and 2160 by maintenance personnel. In certain embodiments, the roles of the tape node and the gateway device are reversed, whereby the gateway device instructs one or more tape nodes to perform at least one diagnostic test as they come into communication range. In one example of operation, the gateway device may instruct the mobile tape node to activate a new role (e.g., an added goal to its mission to execute 1054) that causes the tape node to act as an infrastructure testing tape. The tape node may still perform its original mission for tracking its associated asset, but may also perform new actions. In this example, the gateway node tasked with assigning the infrastructure testing role to a tape node in communication range that has the necessary resources, and so uses its distributed intelligent software (liquid OS) to identify and assign the task to the tape node.

In another example of operation, the gateway device may instruct all or specific tape nodes in communication range to perform diagnostic testing on themselves. The instructions may also inform the tape nodes where to report the test results (e.g., to report test results back to the gateway device, or to report the test results to another wireless node that needs that information). For example, the gateway device may instruct all tape nodes within wireless-communication range to determine their battery levels and send a status report to the IOT system.

Figure 22:
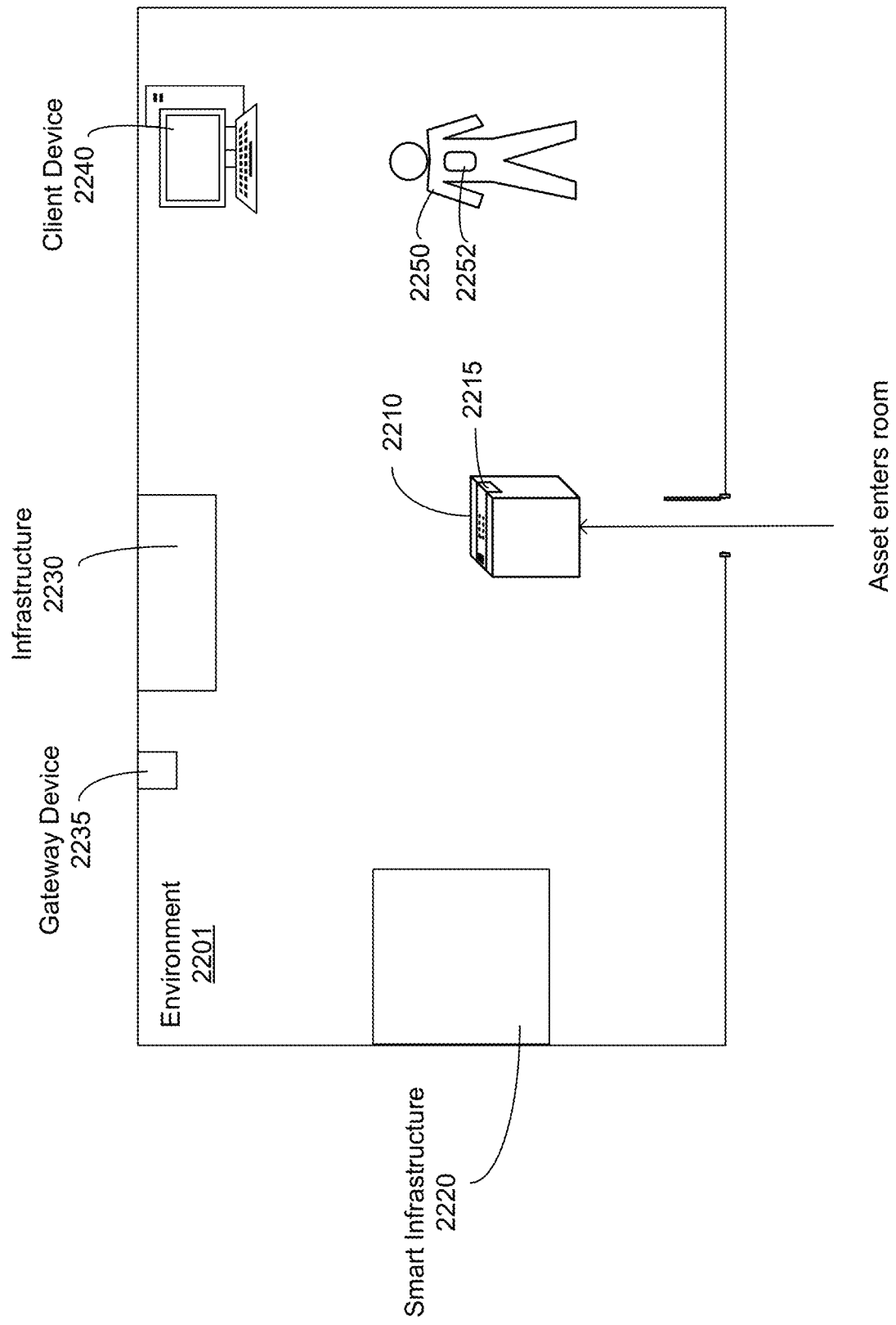
FIG. 22 is a schematic diagram illustrating one example scenario where an asset with an associated tape node enters a room that has various infrastructure pieces.

FIG. 22 is a schematic diagram illustrating one example scenario where an asset 2210 with an associated tape node 2215 enters an environment 2201 that has various infrastructure pieces 2220, 2230, and 2240. For example, environment 2201 may represent one of areas 2120, 2130, 2140, 2150, and 2160 of plant 2101 of FIG. 21, and may represent an indoor or outdoor space. Each infrastructure piece 2220, 2230, 2240 may be a tool, a machine, an asset, a computing device, or some other piece of infrastructure that is normally stationary and residing in the environment 2201. The environment 2201 may be a storage room, for example, in which the asset 2210 is stored in for a period of time (e.g., 2 days). The tape node 2215 may communicate with an IOT system (e.g., one or more of tracking system 1000 of FIG. 10, IOT system 1901 of FIG. 19, IOT system 2001 of FIG. 20) to track the asset 2110, as described above. The IOT system may include a gateway device 2235 (e.g., stationary gateway 914, FIG. 9) positioned within the environment 2201. In the scenario of FIG. 22, gateway device 2235 is added to environment 2201 and forms part of the IOT system infrastructure and is static (e.g., a node that is plugged into a power outlet, or otherwise statically positioned within environment 2201). For example, the gateway 2235 may be added to environment 2201 to communicate with infrastructure that is retrofitted with a node (e.g., a tape node or a gateway device) to have connectivity and intelligence for integration with the IOT system. As used herein, the infrastructure 2230, 2240 may represent any one or more of network infrastructure, equipment, security, and other such resources, such as electrical, communication, alarm, sensors, and so on. In some embodiments, the infrastructure includes the gateway device 2235 which does not have internet connectivity (no Wi-Fi connectivity, no cellular reception, etc.). In certain embodiments, the gateway device 2235 is a tape node fixed at a location and that does not draw power from an outlet (e.g., powered by a battery). Accordingly, the infrastructure 2230, 2240 includes tape node capability, but may not be in direct communication with the IOT system.

The tape node 2215 may represent any one or more of the segment 113 of FIGS. 1 and 2, the segment 332 of FIG. 3, the segment 640 of FIG. 6A, the master agent 832 of FIG. 8, and the master tape nodes 918, 928, 932, 942-948, and 966 of FIG. 9, and tape node 2112 of FIG. 21. The gateway device 2235 may be a tape node and represent one or more of stationary gateway 914 of FIG. 9, and gateway device 2016 of FIG. 20, according to some embodiments. In certain embodiments, a person 2250 working within environment 2201 wears a wearable tape node 2252, which may be in the form of a wristband, a smart badge, a smart necklace, and so on. In these embodiments, the wearable tape node 2252 may function similar to, and in place of, tape node 2215 to communicate with other infrastructure 2230, 2240 and/or smart infrastructure 2220 when the person 2250 is within the environment 2201.

Smart infrastructure 2220 may communicate with other infrastructure 2230, 2240 within the environment 2201 and the tape node 2215 wirelessly communicates instructions to the smart infrastructure 2220 (which has wireless communication capabilities that correspond to that of the tape node 2215) to perform one or more diagnostic tests on one or more of the smart infrastructure 2220, infrastructure 2230, and client device 2240. The smart infrastructure 2220 performs the tests and sends test results back to the tape node 2215. The tape node 2215 wirelessly sends, via the gateway device 2235, the test results to a central database and controller (e.g., central database and controller 1020 of FIG. 10) of the IOT system for further evaluation. The smart infrastructure 2220 represents a machine or device that has integrated wireless communication and intelligence of a node that allows the smart infrastructure 2220 to integrate with the IOT system (e.g., without a need to be retrofitted with a tape or gateway device). The smart infrastructure 2220 may communicate with the gateway device 2235 over short ranges, but neither the smart infrastructure 2220 nor the gateway device 2235 have internet access or other wide-area network connectivity. Accordingly, the tape node 2215 overcomes this problem by carrying any necessary updates, data, parameters, etc., in and out of the environment 2201.

When the smart infrastructure 2220 is connected to the internet or to other wide area networks, the IOT system could directly instruct the infrastructure 2230 to perform the tests and then receive the test results in return (e.g., at the cloud server(s) 2030. However, when directivity is not possible, (e.g., when communication is restricted and/or a communication issue occurs), then the test results cannot be returned to the IOT system unless transferred by the tape node 2215. In another example, where a certain component malfunctions, connectivity issues may occur. Advantageously, the tape node 2215 overcomes these connectivity issues because it is mobile (e.g., attached to the asset 2210). Thus, the tape node 2215 attached to the asset 2210 is useful to overcome operational issues for areas that normally have connectivity but are facing operational or functionality issues. In certain embodiments, this functionality may also be used to test the internet connectivity and maintain the health of the IOT system proactively.

In another aspect of the present embodiments, the liquid OS may distribute the tasks based on the expected path of the tape node 2215. This may simplify the auditing of the IOT system by prioritizing evaluation (e.g., auditing) of specific components by focusing the results on a physical trajectory of the asset 2210, instead of doing a blanket test of every infrastructure node of the IOT system. The IOT system uses the actual path of asset 2210 to audit results of components critical to path of the asset 2210 through the manufacturing facility, for example. However, the tape node 2215 may send the results to other devices (e.g., other tape nodes, client devices, etc.) without departing from the scope hereof.

In certain embodiments, the gateway device 2235 may instruct the smart infrastructure 2220 to perform at least one diagnostic and/or test, and send the test results back to the tape node 2215 or to other nodes of the IOT system 400 (e.g., the server(s)/cloud).

In certain embodiments, the tape node 2215 may communicate with the client device 2240 to perform diagnostic tests on infrastructure 2220, 2230, where the client device 2240 is in communication with each of the infrastructure 2220 and 2230.

Figure 23:
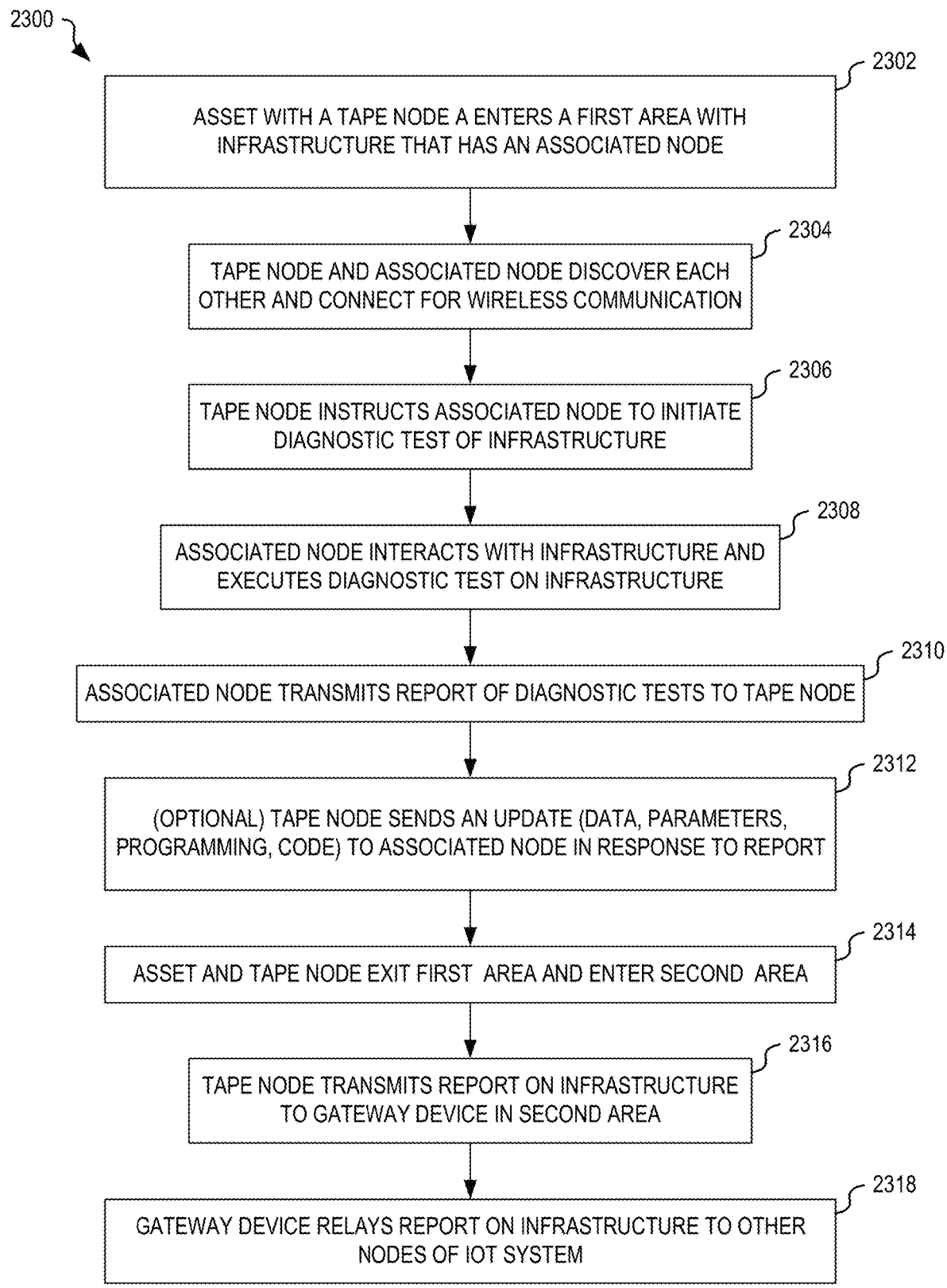
FIGS. 23 through 26 are flowcharts illustrating example scenarios of a tape node on an asset performing diagnostic testing on infrastructure, in embodiments.

FIG. 23 is a flowchart illustrating one example method 2300 for a tape node (e.g., tape node 2215 of FIG. 22) on an asset (e.g., asset 2210) to perform diagnostic testing on infrastructure (e.g., infrastructure 2220, 2230, 2240), according to some embodiments. In this scenario for FIG. 22, infrastructure 2220, 2230, 2240 represents equipment that is not intrinsically part of the IOT system, but that is fitted with a tape node, and where longer range (e.g., cellular, Wi-Fi, satellite, etc.) connectivity of the IOT system is not available. In this scenario, the tape node 2215 interacts directly with encountered nodes of infrastructure located in the environment 2201 to perform diagnostic testing on the infrastructure, capturing the test results and uploading the test results when connectivity with the IOT system is available. That is, in this scenario, the nodes of the infrastructure are not within direct communication range of the IOT system, and therefore diagnostic testing cannot be directly triggered. That is, the environment 2201 has low connectivity to the internet and therefore tape node 2215 is used to trigger diagnostic testing of the infrastructure as asset 2210 moves through the environment 2201. In this scenario, the tape node 2215 may also audit gateway device 2235 within the environment 2201 to minimize long-range and/or power-consuming communications required of gateway device 2235, which would otherwise be needed. That is, long-range high-power consuming communication by gateway device 2235 is avoided by using short-range communication with the tape node 2215, which gathers the results and performs communications at a more optimal time and/or with an optimal communication partner (e.g., another node of the IOT system). For example, where the gateway device 2235 has cellular communication capability, the IOT system may reserve such communication for emergency situations, thereby saving cost of a cellular plan and conserving battery power within the gateway device 2235. In another example, the environment 2201 has certain wireless communications restrictions (e.g., for security or safety reasons) and certain wireless communication frequency bands are forbidden or restricted. Accordingly, the use of tape node 2215 to facilitate communication with gateway device 2235 using short-range wireless communication overcomes the communication restriction within the environment 2201.

In block 2302, an asset with a tape node enters a first area with an infrastructure that has an associated node (e.g., one of tape node 928, 932, 1010, gateway device 914, and client device 1030). In one example of block 2302, asset 2210 with tape node 2215 enters environment 2201. In block 2304, the tape node and the associated node discover each other and connect for wireless communication. In one example of block 2304, tape node 2215 and gateway device 2235 discover each other and initiate communications when within wireless communication range. In block 2306, the tape node instructs the associated node to initiate at least one diagnostic test of the infrastructure. In one example of block 2306, tape node 2215 instructs gateway device 2235 to perform at least one diagnostic test of infrastructure 2230. In block 2308, the associated node interacts with the infrastructure and executes at least one diagnostic test of the infrastructure. In one example of block 2308, gateways device 2235 interacts with infrastructure 2230 to perform at least one diagnostic test of infrastructure 2230. In block 2310, the associated node transmits a test report of the diagnostic test to the tape node. In one example of block 2310, the gateway device 2235 sends a report on the diagnostic tests to the tape node 2215. Block 2312 is optional. If included, in block 2312, the tape node sends, in response to the received test report, an update (e.g., one or more of data, parameters, programming code, etc.) to the associated node. In one example of block 2312, the tape node 2215 sends an update that includes operational parameters for the infrastructure 2230 to the gateway device 2235. For example, the distributed intelligent software running in cloud server(s) 2030 (FIG. 20) determines and sends predetermined parameters to tape node 2215, which triggers tape node 2215 to update the infrastructure 2230 and the gateway device 2235. In certain embodiments, the parameters and/or programming code are loaded onto the tape node 2215 at initialization of the tape node 2215, or before tape node 2215 enters the environment 2201, in response to the distributed intelligent software identifying that the update is needed for the infrastructure 2230 and/or the gateway device 2235. In certain embodiments, where the tape node 2215 has cellular communication capabilities, the tape node 2215 may download the update for the infrastructure 2230 and/or the gateway device 2235 when triggered.

In block 2314, the asset and the tape node exit the first area and enter a second area. In one example of block 2314, the asset 2210 and the tape node 2215 leave environment 2201 to enter a second room (e.g., the storage facility 2130). In block 2316, the tape node transmits the test report on the infrastructure to a gateway device in the second area. In one example of block 2316, the tape node 2215 transmits the test report to a gateway device in the storage facility 2130. In block 2318, the gateway device relays the test report to one or more other nodes (e.g., a server(s)/cloud and/or other tape nodes etc.) of an IOT system that includes the tape node. In one example of block 2318, the gateway device in the storage facility 2130 sends the test report to the central database and controller, 1020 of IOT system 2001.

Figure 24:
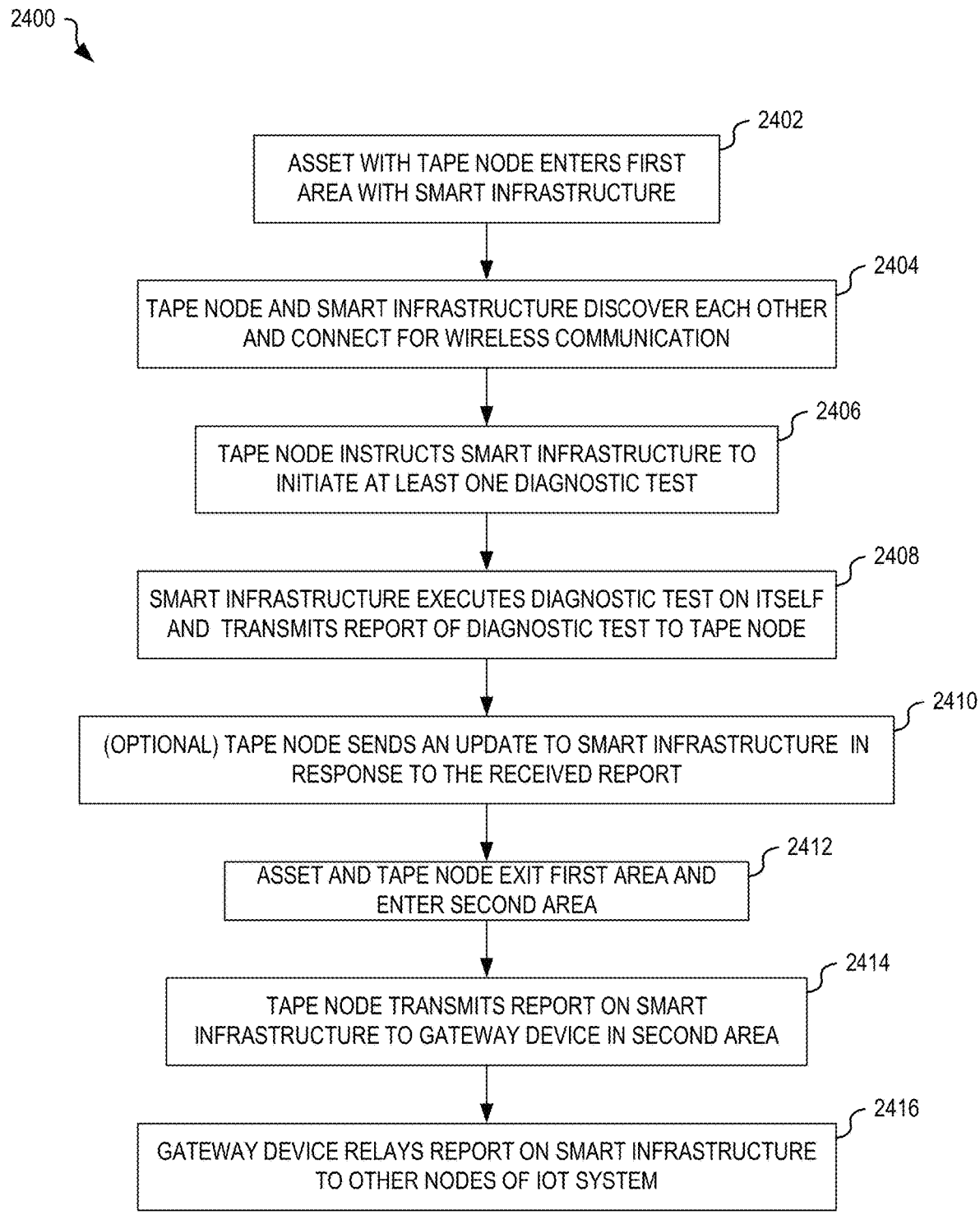

FIG. 24 is a flowchart illustrating an example method 2400 for a tape node (e.g., tape node 2215 of FIG. 22) on an asset (e.g., asset 2210) to perform diagnostic testing on smart infrastructure (e.g., smart infrastructure 2220), according to some embodiments. In this scenario for FIG. 22, the tape node interacts directly with encountered smart infrastructure (e.g., smart infrastructure 2220) located in an area where network connectivity of the IOT system is not available, and performs diagnostic testing on the infrastructure, capturing the test results and uploading the test results when connectivity with the IOT system is available. This scenario is similar to the scenario of FIG. 23, except that the smart infrastructure 2220 is built with the connectivity and intelligence of a node of the IOT system (e.g., the infrastructure has built in connectivity and intelligence and does not rely on an added tape node). In block 2402, an asset with a tape node enters a first area that has smart infrastructure. In one example of block 2402, asset 2210 with tape node 2215 enters environment 2201. In block 2404, the tape node and the smart infrastructure discover each other and connect for wireless communication. In one example of block 2404, when within wireless communication range of each other, tape node 2215 and smart infrastructure 2220 discover each other and initiate communications. In block 2406, the tape node instructs the smart infrastructure to initiate at least one diagnostic test. In one example of block 2406, tape node 2215 instructs smart infrastructure 2220 to perform at least one diagnostic test. In block 2408, the smart infrastructure executes the diagnostic test on itself and transmits a report of the diagnostic tests to the tape node. In one example of block 2408, the smart infrastructure 2220 performs a diagnostic test on itself and sends a test report of the results to the tape node 2215. Block 2410 is optional. If included, in block 2410, the tape node transmits an update (e.g., data, parameters, programming code, etc.) to the smart infrastructure, in response to the received report. In one example of block 2410, the tape node 2215 sends updated parameters to the smart infrastructure 2220 in response to the received test report. For example, the distributed intelligent software running in cloud server(s) 2030 (FIG. 20) determines and sends predetermined parameters to tape node 2215, which triggers tape node 2215 to update the smart infrastructure 2220. In certain embodiments, the parameters and/or programming code are loaded onto the tape node 2215 at initialization of the tape node 2215, or before tape node 2215 enters the environment 2201, in response to the distributed intelligent software identifying that the update is needed for the smart infrastructure 2220. In certain embodiments, where the tape node 2215 has cellular communication capabilities, the tape node 2215 may download the update for the smart infrastructure 2220 when triggered. In block 2412, the asset and the tape node exit the first area and enter a second area. In one example of block 2412, the asset 2210 and the tape node 2215 leave environment 2201 to enter a second room (e.g., the storage facility 2130). In block 2414, the tape node transmits the report on the smart infrastructure to a gateway device in the second area. In one example of block 2414, the tape node 2215 transmits the test report to a gateway device in the storage facility 2130. In block 2416, the gateway device relays the report on the smart infrastructure to one or more other nodes (e.g., a server(s)/cloud and/or other nodes) of an IOT system that includes the tape node. In one example of block 2416, the gateway device in the storage facility 2130 sends the test report to the central database and controller 1020 of IOT system 2001.

Figure 25:
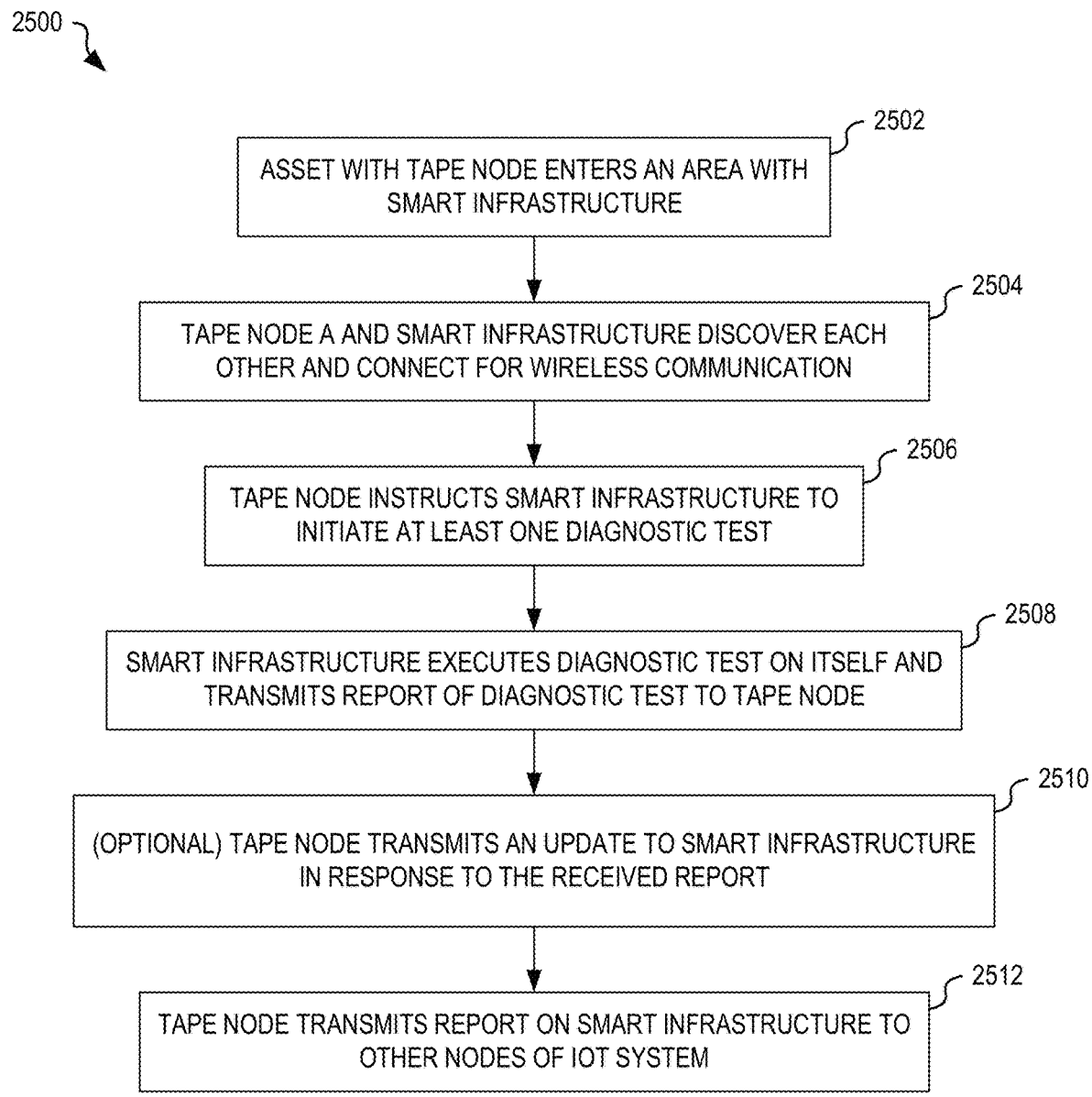

FIG. 25 is a flowchart illustrating one example method 2500 for a tape node (e.g., tape node 2215 of FIG. 22) on an asset (e.g., asset 2210) to perform diagnostic testing on smart infrastructure (e.g., smart infrastructure 2220), according to some embodiments. In this scenario for FIG. 22, the tape node interacts directly with encountered smart infrastructure to perform diagnostic testing, capturing and uploading the test results to the IOT system while in the same area. This scenario is similar to the scenario for the method 2400 of FIG. 24, except that the tape node communicates directly with the smart infrastructure 2220 and not the gateway device 2235. In block 2502, an asset with tape node enters an area with smart infrastructure. In one example of block 2502, asset 2210 with tape node 2215 enters environment 2201. In block 2504, the tape node and the smart infrastructure discover each other and connect for wireless communication. In one example of block 2504, when within wireless communication range of each other, tape node 2215 and smart infrastructure 2220 discover each other and initiate communications. In block 2506, the tape node instructs the smart infrastructure to initiate at least one diagnostic test. In one example of block 2506, tape node 2215 instructs smart infrastructure 2220 to perform at least one diagnostic test. In block 2508, the smart infrastructure executes the diagnostic test on itself and transmits a report of the diagnostic test to the tape node. In one example of block 2508, the smart infrastructure 2220 performs a diagnostic test on itself and sends a test report of the results to the tape node 2215. Block 2510 is optional. If included, in block 2510, the tape node transmits an update (e.g., one or more of data, parameters, programming code, etc.) to the smart infrastructure, in response to the received report. In one example of block 2510, the tape node 2215 sends updated parameters to the smart infrastructure 2220 in response to the received test report. For example, the distributed intelligent software running in cloud server(s) 2030 (FIG. 20) determines and sends predetermined parameters to tape node 2215, which triggers tape node 2215 to update the smart infrastructure 2220. In certain embodiments, the parameters and/or programming code are loaded onto the tape node 2215 at initialization of the tape node 2215, or before tape node 2215 enters the environment 2201, in response to the distributed intelligent software identifying that the update is needed for the smart infrastructure 2220. In certain embodiments, where the tape node 2215 has cellular communication capabilities, the tape node 2215 may download the update for the smart infrastructure 2220 when triggered. In block 2512, the tape node transmits the report on the smart infrastructure to one or more other nodes of an IOT system that includes the tape node. In one example of block 2512, the tape node 2215 sends the test report to the central database and controller 1020 via gateway device 2235 of the IOT system 2001.

Figure 26:
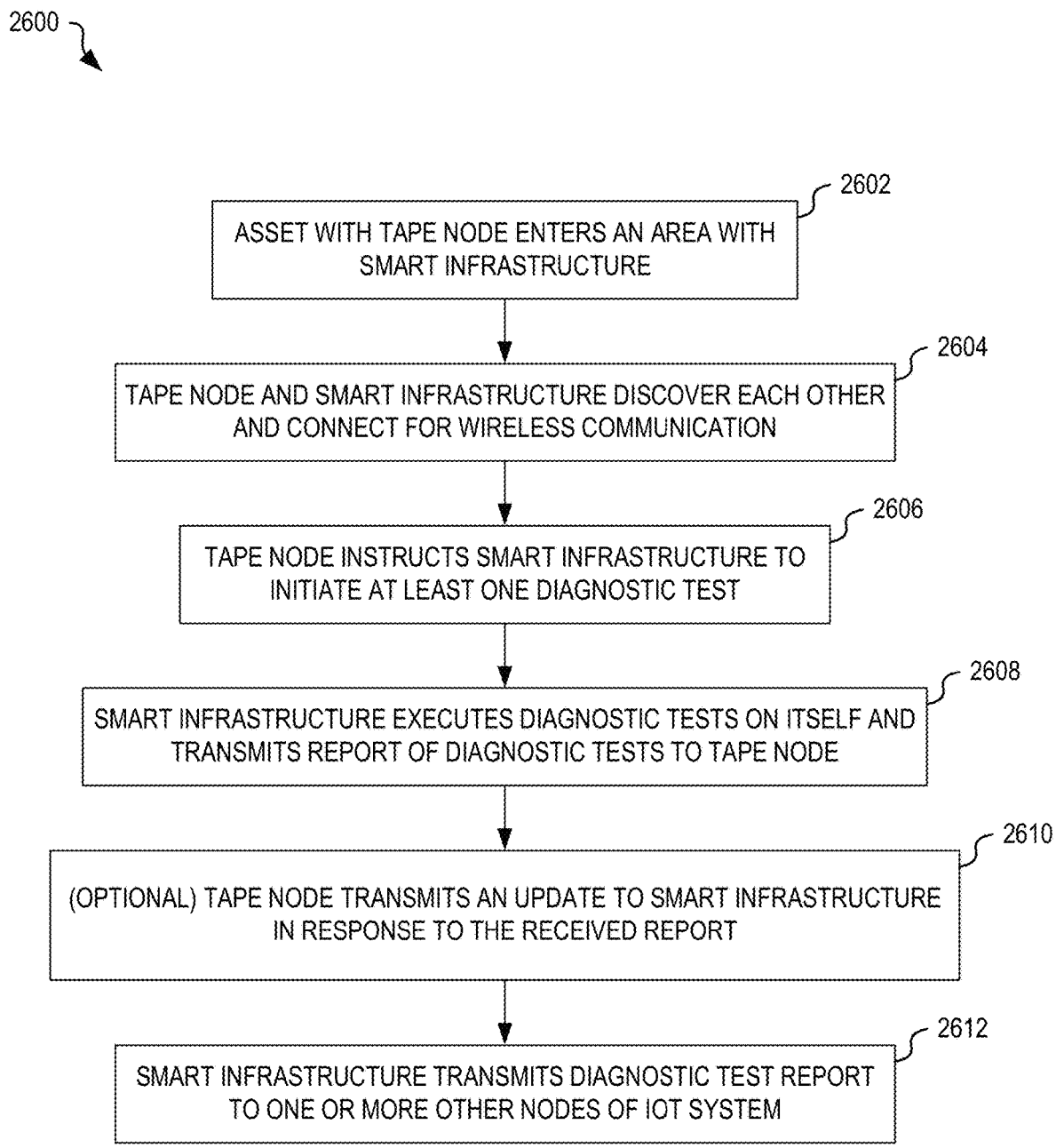

FIG. 26 is a flowchart illustrating one example method 2600 for a tape node (e.g., tape node 2215 of FIG. 22) on an asset (e.g., asset 2210) to perform diagnostic testing on infrastructure (e.g., infrastructure 2220, 2230, 2240), according to some embodiments. In this scenario for FIG. 22, the tape node interacts directly with encountered smart infrastructure to perform diagnostic testing, capturing and directly uploading the test results to the IOT system 2001. In this scenario, smart infrastructure 2220 does not report test results to the tape node 2215, but instead, sends the test results to the IOT system via one or more other nodes (e.g., gateway device 2235 or another tape node that enters the environment 2201 later). That is, the tape node 2215 initiates the diagnostic testing of the infrastructure, even when there is internet and/or other connectivity options, but does not need to wait to receive the test results. In block 2602, the asset and the tape node enter an area with smart infrastructure. In one example of block 2602, asset 2210 and tape node 2215 enter environment 2201. In block 2604, the tape node and the smart infrastructure discover each other and connect for wireless communication. In one example of block 2604, when within wireless communication range of each other, tape node 2215 and smart infrastructure 2220 discover each other and initiate communications. In block 2606, the tape node instructs the smart infrastructure to initiate at least one diagnostic test. In one example of block 2606, tape node 2215 instructs smart infrastructure 2220 to perform at least one diagnostic test. In block 2608, the smart infrastructure executes the diagnostic test on itself and transmits a report of the diagnostic test to the tape node. In one example of block 2608, the smart infrastructure 2220 performs a diagnostic test on itself and sends a test report of the results to the tape node 2215. Block 2610 is optional. If included, in block 2610, the tape node transmits an update (e.g., one or more of data, parameters, programming code, etc.) to the smart infrastructure in response to the received report. In one example of block 2610, the tape node 2215 sends updated parameters to the smart infrastructure 2220 in response to the received test report. For example, the distributed intelligent software running in cloud server(s) 2030 (FIG. 20) determines and sends predetermined parameters to tape node 2215, which triggers tape node 2215 to update the smart infrastructure 2220. In certain embodiments, the parameters and/or programming code are loaded onto the tape node 2215 at initialization of the tape node 2215, or before tape node 2215 enters the environment 2201, in response to the distributed intelligent software identifying that the update is needed for the smart infrastructure 2220. In certain embodiments, where the tape node 2215 has cellular communication capabilities, the tape node 2215 may download the update for the smart infrastructure 2220 when triggered. In block 2612, the infrastructure transmits the diagnostic test report to one or more other nodes of an IOT system that includes the tape node and the smart infrastructure. In certain embodiments, the smart infrastructure 2220 represents a node of the IOT system. For example, where the smart infrastructure is a third-party apparatus, it may include an application programming interface (API) that allows an incorporated node to interact with the apparatus (e.g., perform diagnostic, pull reports, etc.). In certain embodiments, the third-party apparatus could allow software installation to facilitate testing and reporting. In one example of block 2612, the smart infrastructure 2220 sends the test report to the central database and controller 1020 via gateway device 2235 of the IOT system 2001.

In one embodiment, when the tape node delegates the tasks to another node, the nodes communicate with each other to achieve consensus on how to delegate the tasks. For example, if the task a second node is asking the first node to accomplish would interfere with the first node's mission, the first node will reject the second node's request.

In one example of operation, a wireless IOT device of a tracking system, receives a mission, determined by the liquid operating system (OS) of the wireless IOT device, defining at least one goal for the wireless IOT device. The wireless IOT device acts as a master agent of the tracking system to complete each of a plurality of tasks defined by the mission, and manages power usage of the battery to complete the mission, whereby the liquid OS may delegate a first task of the plurality of tasks to another node of the tracking system to reduce power usage. The wireless IOT device acts as a master agent, and the other node of the tracking system acts as a slave agent, in response to receiving instructions based on the delegation of the first task to the other node. The wireless IOT device may broadcast a manifest of available services and capabilities of the wireless IOT device for helping other nodes of the tracking system complete respective missions, and diagnostic information of the wireless IOT device to the other node. The wireless IOT device may receive from the other node instructions to perform a second task corresponding to a mission determined by a respective liquid OS of the other node, and the wireless IOT device of the tracking system may perform the second task from the other node; the wireless IOT device acting as a slave in response to receiving instructions to perform the second task. Prior to the performing the second task, the wireless IOT device and the other node may achieve consensus that the wireless IOT device is an optimal agent for performing the second task.

Advantages of the above systems and methods that use a mobile tape node to perform infrastructure testing is that the tape node may utilize low-power short-range communications, thereby saving battery power in comparison to a solution where everything is wirelessly connected at all times. By taking advantage of the expected movement of an asset, the assigned tape node may use short-range communication to communicate with infrastructure when it is nearby. Longer-range communication may be used when necessary, but the use of short-range communication of a mobile tape node conserves battery usage.

For example, infrastructure may perform self-tests and communicate results (e.g., battery levels) to tape nodes in its environment (within wireless communication range, for example). The tape node can make an assessment on whether the infrastructure functions satisfactory to meet its mission. If not, it can request a service from the infrastructure (potentially a different node of the infrastructure) to resolve identified problems. Gateway devices, and similar infrastructure, may run their own diagnostic test for antenna functionality (checking received, return, and transmitted signal strength), battery life, sensor functionality, check if certain components are alive, etc. A mobile tape node that initiates the test may be loaded with threshold conditions that determine whether the gateway device or infrastructure needs replacement or refurbishment. For example, when the gateway device performs a wireless communications test and reports a signal strength that is 30% below an expected level, the tape node informs the IOT system that the gateway device has failed and needs replacement. The above test and diagnostics functions can be combined with a normal tape node as part of normal functional operation of the label. Optionally some tape nodes can decide to take on the role to repair or communicate the failures in the infrastructure it detected. This will take battery life but only needs to happen maybe in 1 out of 1000 labels. Only some of the tape nodes may be configured to perform repair or program the infrastructure.

Wireless Agent Attributes

FIG. 27 is a table 2729 showing attributes of the three different types of agents used in the IOT systems and the tracking system: master agent, secondary agent, and tertiary agent. This table 2729 may be preprogrammed into the memory (e.g., 658, 658', 658", FIG. 6A-6C) of each agent, where the processors (e.g., 650, 650', 650", FIG. 6A-6C) of each agent may execute instructions according to the role of each agent. The left column of table 2729 lists the attributes of the master agent. Among the attributes of the master agent are a master agent role (e.g., the agent may have a role that includes directing other agents to perform predetermined functions, such as instructing other master agents, or secondary or tertiary agents, to perform the predetermined functions); a child agent (e.g., the child agent may have a role that includes being directed by a parent agent to perform predetermined functions according to the parent-agent's instructions) placement in physical premises (a peripheral or leaf node placement); and a low-power wireless-communications interface (e.g., a Bluetooth LE communications interface or a Zigbee communications interface). The master agent role attribute enables the master agent to exercise unilateral control over other non-master types of agents, such as a secondary agent and a tertiary agent. However, when the secondary or tertiary agent is a parent and the master agent is a child, the parent may instruct the child to perform tasks. The child node attribute configuration corresponds to a peripheral end node or leaf node that interacts in a particular environment (e.g., physical premises, such as a building, warehouse, loading dock, etc.).

In some embodiments, rather than a server being an end node, the end nodes or leaf nodes may be a master agent. In some embodiments, the end nodes may have high-power or medium-power wireless-communication interfaces. The end nodes attach to and directly track and monitor assets (e.g., the safety devices and containers). For example, the end node may be a attached to a safety device or storage container, and transmit the collected sensor data pertaining to the assets to other nodes (e.g., secondary or tertiary nodes). The end nodes (master agents) may drive the flow of information and determine when to transmit the sensor data or any information pertaining to the assets. This way, the flow of information is dictated by the end nodes and the secondary and tertiary nodes do not lose battery power constantly listening for when the master agents (end nodes) transmit the sensor data. In the illustrated embodiment, the master-child node has a low power communications interface (e.g., Bluetooth LE) for communicating with other nodes (secondary and tertiary agents) over short distance wireless communications links, as discussed in FIG. 6A.

In some embodiments, the master agents may request resources or data from the secondary and tertiary agents. The requested resources may be to complete specific functions or tasks that the master agent is configured to perform. In some cases, the master agent does not have the capabilities, components, or configuration associated with the requested resources or data, and may rely on the secondary and tertiary agents to provide the resources and data. For example, a master agent may not include a GPS sensor, but may determine its relative location by requesting location data from a secondary or tertiary agent nearby that is equipped with a GPS sensor.

The center column of table 2729 lists the attributes of the secondary agent. Among the attributes of the secondary agent are a secondary agent role (e.g., the secondary agent may include a medium-power wireless-communication interface, such as indicated with reference to FIG. 6B, that may communicate with a stationary or mobile gateway); an intermediate parent-node placement in a physical premises within communication range of one or more child nodes (e.g., a master agent child node) and optionally within communication range of one or more of the tertiary agent parent nodes; and low and intermediate-power wireless-communications interfaces (e.g., Bluetooth LE and LoRa communications interfaces). The intermediate parent-node attribute configuration corresponds to an intermediate node that communicates with the child nodes in the physical premises and communicates with the tertiary agent. In the illustrated embodiment, the secondary agent may also have a low-power wireless-communications interface (e.g., Bluetooth LE communications interface) for communicating with the child nodes and a medium-power wireless-communications interface (e.g., LoRa communications interface) for communicating with a parent node (e.g., a tertiary agent) or server node (e.g., a stationary gateway) over longer-distance wireless-communication links. In the illustrated embodiment, the communications interfaces of the secondary tape agent are backward compatible with the child nodes.

The right column of table 2729 lists the attributes of the tertiary agent. Among the attributes of the tertiary agent are a tertiary agent role; a placement in relation to the physical premises that is within range of the of the secondary agent and optionally within communication range of one or more of the master agents; and low, intermediate, and high-power communications interfaces (e.g., with reference to FIG. 7C, that may include Bluetooth LE, LoRa, Cellular, NFC, and RFID communications interfaces) for communicating with the master and secondary agents. In the illustrated embodiment, the communications interfaces of the tertiary agent are backward compatible with the master and secondary agents.

Computer Apparatus

Figure 28:
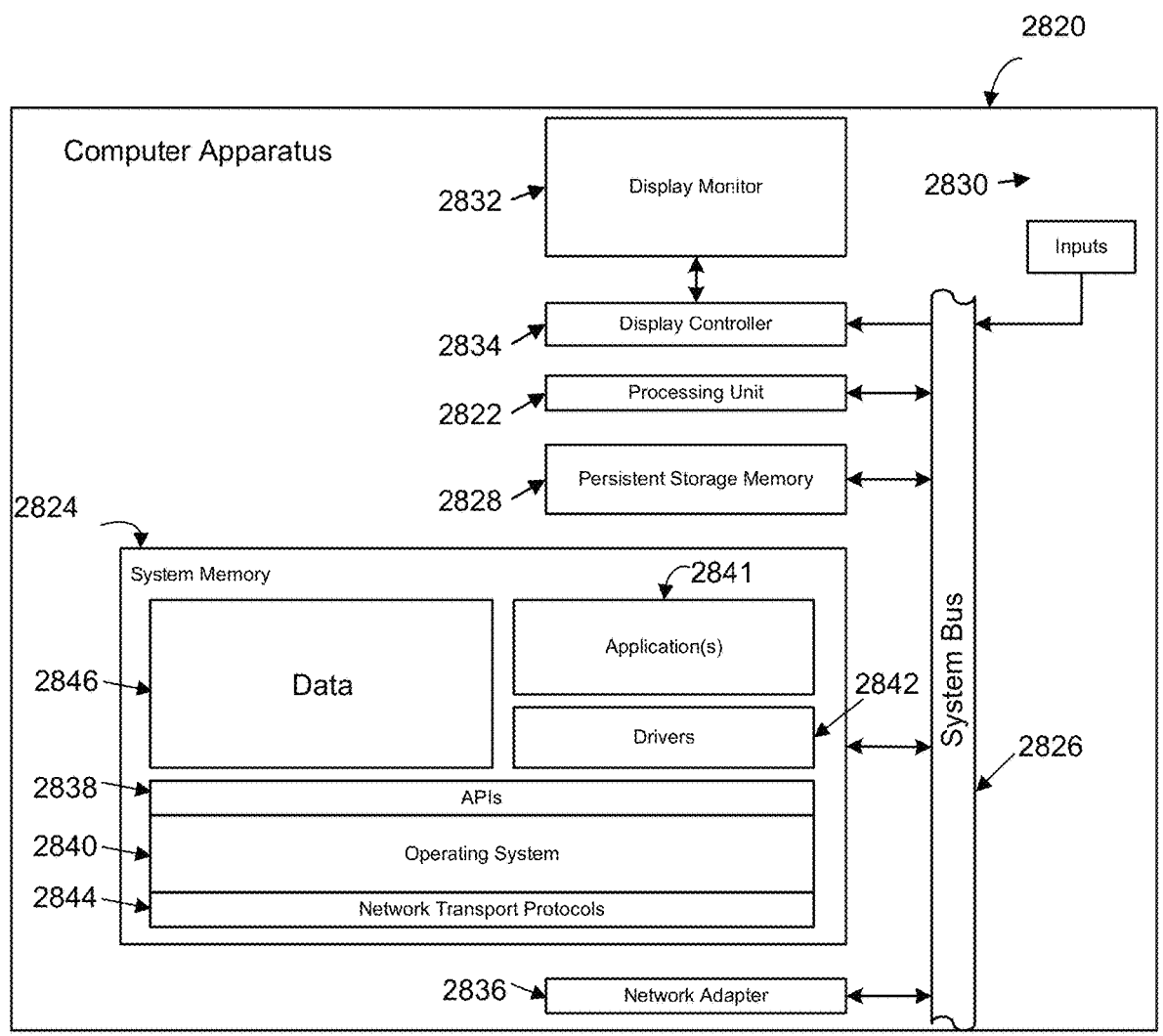
FIG. 28 shows one example embodiment of computer apparatus that, either alone or in combination with one or more other computing apparatus, is operable to implement one or more of the computer systems described in this specification.

FIG. 28 shows one example embodiment of computer apparatus 2820 that, either alone or in combination with one or more other computing apparatus, is operable to implement one or more of the computer systems described in this specification. For example, computer apparatus 2820 may represent any of . . . . The computer apparatus 2820 includes a processing unit 2822, a system memory 2824, and a system bus 2826 that couples the processing unit 2822 to the various components of the computer apparatus 2820. The processing unit 2822 may include one or more data processors, each of which may be in the form of any one of various commercially available computer processors. The system memory 2824 includes one or more computer-readable media that typically are associated with a software application addressing space that defines the addresses that are available to software applications. The system memory 2824 may include a read only memory (ROM) that stores a basic input/output system (BIOS) that contains start-up routines for the computer apparatus 2820, and a random-access memory (RAM). The system bus 2826 may be a memory bus, a peripheral bus, or a local bus, and may be compatible with any of a variety of bus protocols, including PCI, VESA, Microchannel, ISA, and EISA. The computer apparatus 2820 also includes a persistent storage memory 2828 (e.g., a hard drive, a floppy drive, a CD ROM drive, magnetic tape drives, flash memory devices, and digital video disks) that is connected to the system bus 2826 and contains one or more computer-readable media disks that provide non-volatile or persistent storage for data, data structures and computer-executable instructions.

A user may interact (e.g., input commands or data) with the computer apparatus 2820 using one or more input devices 2830 (e.g. one or more keyboards, computer mice, microphones, cameras, joysticks, physical motion sensors, and touch pads). Information may be presented through a graphical user interface (GUI) that is presented to the user on a display monitor 2832, which is controlled by a display controller 2834. The computer apparatus 2820 also may include other input/output hardware (e.g., peripheral output devices, such as speakers and a printer). The computer apparatus 2820 connects to other network nodes through a network adapter 2836 (also referred to as a "network interface card" or NIC).

A number of program modules may be stored in the system memory 2824, including application programming interfaces 2838 (APIs), an operating system (OS) 2840 (e.g., the Windows® operating system available from Microsoft Corporation of Redmond, Washington U.S.A.), software applications 2841 including one or more software applications programming the computer apparatus 2820 to perform one or more of the steps, tasks, operations, or processes of the positioning and/or tracking systems described herein, drivers 2842 (e.g., a GUI driver), network transport protocols 2844, and data 2846 (e.g., input data, output data, program data, a registry, and configuration settings).

Examples of the subject matter described herein, including the disclosed systems, methods, processes, functional operations, and logic flows, can be implemented in data processing apparatus (e.g., computer hardware and digital electronic circuitry) operable to perform functions by operating on input and generating output. Examples of the subject matter described herein also can be tangibly embodied in software or firmware, as one or more sets of computer instructions encoded on one or more tangible non-transitory carrier media (e.g., a machine-readable storage device, substrate, or sequential access memory device) for execution by data processing apparatus.

The details of specific implementations described herein may be specific to particular embodiments of particular inventions and should not be construed as limitations on the scope of any claimed invention. For example, features that are described in connection with separate embodiments may also be incorporated into a single embodiment, and features that are described in connection with a single embodiment may also be implemented in multiple separate embodiments. In addition, the disclosure of steps, tasks, operations, or processes being performed in a particular order does not necessarily require that those steps, tasks, operations, or processes be performed in the particular order; instead, in some cases, one or more of the disclosed steps, tasks, operations, and processes may be performed in a different order or in accordance with a multi-tasking schedule or in parallel.

Other embodiments are within the scope of the claims.

Additional Configuration Information

The foregoing description of the embodiments have been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

COMBINATION OF FEATURES

Features described above as well as those claimed below may be combined in various ways without departing from the scope hereof. For example, it will be appreciated that aspects of one sensing device/sensing material described herein may incorporate or swap features of another sensing device/material described herein. The following examples illustrate possible, non-limiting combinations of embodiments described above. It should be clear that many other changes and modifications may be made to the methods and apparatus herein without departing from the spirit and scope of this invention:

(A) A tracking system for tracking an asset includes: a first tape node attachable to the asset and having a liquid operating system (OS) that causes the first tape node to: receive a first mission defining goals for the first tape node, and operate as a master agent to complete the first mission; a second tape node having the liquid OS that causes the second tape node to operate as a secondary agent and provide a slave service to the first tape node.

(B) In the system denoted as (A), the liquid OS causing the first tape node to operate as a secondary agent and provide a slave service to the second tape node.

(C) In either of the systems denoted as (A) or (B), the liquid OS causing the first tape node to evaluate remaining battery power and delegate the task to the second tape node when the remaining battery power is below a threshold value.

(D) In any of the systems denoted as (A)-(C), the liquid OS of the second tape node causing the second tape node to act as a master agent to complete a second mission of the second tape node.

(E) In any of the systems denoted as (A)-(D), the first tape node and the second tape node communicating wirelessly.

(F) In any of the systems denoted as (A)-(E), the liquid OS causing the first tape node to make decisions relating to the first mission when operating as the master agent.

(G) In any of the systems denoted as (A)-(F), the liquid OS causing the first tape node to maintain a graph of resources available to the first tape node and delegate the task to the second tape node when the graph indicates a lower cost.

(H) In any of the systems denoted as (A)-(G), the cost being based on battery usage of the first tape node for at least one of wireless communication and computation.

(I) In any of the systems denoted as (A)-(H), wherein each of the tape nodes may communicate with intermediary devices to convey mission data to a central database and controller or any other tape node.

(J) A tape node of a tracking system, including: a battery; a short-range wireless interface; a processor; a memory storing a liquid operating system (OS) having machine readable instructions that when executed by the processor cause the processor to: receive, within the tape node, a mission defining at least one goal for the tape node, the tape node acting as a master agent of the tracking system to complete each of a plurality of tasks defined by the mission; manage power usage of the battery to complete the mission, the liquid OS delegating the task to another node of the tracking system to reduce power usage; and perform a second task received from a second node, the tape node acting as a slave in response to the second task.

(K) In the tape node denoted as (J), the liquid OS causing the tape node to make decisions corresponding to the mission when operating as the master agent.

(L) In either of the tape nodes denoted as (J) or (K), the first node having only short-range wireless transceiver, wherein the liquid OS delegates, via the short range wireless transceiver, a long-range communication task to the second node.

(M) In any of the tape nodes denoted as (J)-(L), the liquid OS determining a graph of resources available to the tape node, the graph having edges indicative of cost of the resource to the tape node, the liquid OS using selecting a least cost path thought the graph to identify resources to use.

(N) In any of the tape nodes denoted as (J)-(M), the cost being based on battery usage for at least one of wireless communication and computation.

(O) A tracking system, including a plurality of tape nodes, each tape node having a liquid operating system (OS) and being capable to operate as a master agent to fulfil a first mission of the tape node and capable to operate as a slave node to support a second missions of other tape nodes.

(P) In the tracking system denoted as (O), wherein each of the tape nodes may communicate with intermediary devices to convey mission data to a central database and controller or to any other tape node.

(Q) In either of the tracking systems denoted as (O) or (P), wherein the second missions are sensing missions of a first plurality of the plurality of tape nodes, and wherein the first mission is of one tape node not in the first plurality and to evaluate sensor data received from tape nodes of the first plurality.

(R) A method includes receiving, by a wireless IOT device of a tracking system, a mission determined by the liquid operating system (OS) of the wireless IOT device defining at least one goal for the wireless IOT device, the wireless IOT device acting as a master agent of the tracking system to complete each of a plurality of tasks defined by the mission; and managing, by the wireless IOT device, power usage of the battery to complete the mission, the liquid OS delegating a first task of the plurality of tasks to another node of the tracking system to reduce power usage, wherein the wireless IOT device acts as a master agent, and the other node of the tracking system acts as a slave agent, in response to receiving instructions based on the delegation of the first task to the other node.

(S) The method denoted as (R) further including broadcasting, by the wireless IOT device, the mission, of the wireless IOT device, a manifest of available services and capabilities of the wireless IOT device for helping other nodes of the tracking system complete respective missions, and diagnostic information of the wireless IOT device to the other node; receiving, by the wireless IOT device, instructions to perform a second task from the other node, the second task corresponding to a mission determined by a respective liquid OS of the other node; and performing, by the wireless IOT device of the tracking system, the second task from the other node, the wireless IOT device acting as a slave in response to receiving instructions to perform the second task.

(T) In either of the methods denoted as (R) and (S), wherein prior to the performing the second task, the wireless IOT device and the other node achieve consensus that the wireless IOT device is an optimal agent for performing the second task.

What is claimed is:

1. A tracking system for tracking an asset, comprising:
a first tape node attachable to the asset and having a liquid operating system (OS) that causes the first tape node to:
receive a first mission defining goals for the first tape node, and
operate as a master agent to complete the first mission, wherein the master agent is configured to generate instructions and transmit the instructions to at least one other tape node of the tracking system for the at least one other tape node to perform; and
an infrastructure component having the liquid OS that causes the infrastructure component to operate as a secondary agent and provide a slave service to the first tape node, wherein the secondary agent is configured to receive instructions from the master agent and perform tasks based on the received instructions.

2. The tracking system of claim 1, the liquid OS causing the first tape node to change its operations from operating as a master to agent to operating as a secondary agent and provide a slave service to the infrastructure component.

3. The tracking system of claim 1, the liquid OS causing the first tape node to evaluate remaining battery power and delegate the task to the infrastructure component when the remaining battery power is below a threshold value.

4. The tracking system of claim 1, the liquid OS of the infrastructure component causing the infrastructure component to act as a master agent to complete a second mission of the infrastructure component.

5. The tracking system of claim 1, the first tape node and the infrastructure component communicating wirelessly.

6. The tracking system of claim 1, the liquid OS causing the first tape node to make decisions relating to the first mission when operating as the master agent.

7. The tracking system of claim 1, the liquid OS causing the first tape node to maintain a graph of resources available to the first tape node and delegate the task to the infrastructure component when the graph indicates a lower cost.

8. The tracking system of claim 7, the cost being based on battery usage of the first tape node for at least one of wireless communication and computation.

9. The tracking system of claim 1, wherein the infrastructure component comprises at least one of a gateway device, an edge computer, an edge node, a tape node associated with a physical infrastructure, and a smart infrastructure.

10. A tape node of a tracking system, comprising:
a battery;
a short-range wireless interface;
a processor; and
a memory storing a liquid operating system (OS) having machine readable instructions that when executed by the processor cause the processor to:
receive, within the tape node, a mission defining at least one goal for the tape node, the tape node acting as a master agent of the tracking system to complete each of a plurality of tasks defined by the mission;
transmit instructions delegating at least one task of the plurality of tasks to another node of the tracking system, wherein the delegating the at least one task is based on optimizing one or more of airwave congestion and latency.

11. The tape node of claim 10, the liquid OS causing the tape node to make decisions corresponding to the mission when operating as the master agent.

12. The tape node of claim 10, the tape node having only a short-range wireless transceiver, wherein the delegating at least one task of the plurality of tasks comprises delegating a long-range communication task to the other node via the short range wireless transceiver.

13. The tape node of claim 10, the liquid OS determining a graph of resources available to the tape node, the graph having edges indicative of cost of the resource to the tape node, the liquid OS using selecting a least cost path thought the graph to identify resources to use.

14. The tape node of claim 13, the cost being based on battery usage for at least one of wireless communication and computation.

15. A tracking system, comprising:
a plurality of tape nodes, each tape node having a liquid operating system (OS) and being capable to operate as a master agent to fulfill first mission of the tape node and capable to operate as a slave agent to support second missions of other tape nodes,
wherein a first tape node of the plurality of tape nodes operates as a slave agent providing slave services to multiple tape nodes, and
each respective tape node of the multiple tape nodes operating operates as a master agent of the first tape node, the liquid OS causing each respective tape node to:
receive a first mission defining at least one goal for the respective tape node, the goal comprising a plurality of tasks; and
transmit instructions delegating at least one task of the plurality of tasks to the first tape node of the tracking system, wherein the delegating the at least one task is based on optimizing one or more of airwave congestion and latency.

16. The tracking system of claim 15, wherein at least one tape node of the plurality of tape nodes is configured to communicate with at least one intermediary device to convey mission data to a central database and controller or to at least one other tape node.

17. The tracking system of claim 15, wherein the second missions are sensing missions of a first plurality of the plurality of tape nodes, and wherein the first tape node is configured to evaluate sensor data received from tape nodes of the first plurality.

18. A method comprising:
receiving, by a wireless IOT device of a tracking system, a mission determined by the liquid operating system (OS) of the wireless IOT device defining at least one goal for the wireless IOT device, the wireless IOT device acting as a master agent of the tracking system to complete each of a plurality of tasks defined by the mission;
determining, by the wireless IOT device, one or more tasks of the plurality of tasks to delegate to other nodes of the tracking system based on the liquid OS;
identifying, by the wireless IOT device, one or more nodes of the tracking system capable of completing a first task of the one or more tasks;
transmitting, by the wireless IOT device, instructions delegating the first task to a first node of the one or more nodes, wherein the delegating the first task is based on optimizing one or more of airwave congestion and latency, and wherein the wireless IOT device acts as a master agent, and the first node acts as a slave agent, in response to the first node receiving the instructions delegating the first task.

19. The method of claim 18, further comprising, broadcasting, by the wireless IOT device, the mission, of the wireless IOT device, a manifest of available services and capabilities of the wireless IOT device for helping other nodes of the tracking system complete respective missions, and diagnostic information of the wireless IOT device to a second node;

receiving, by the wireless IOT device, instructions to perform a second task from the second node, the second task corresponding to a mission determined by a respective liquid OS of second node; and performing, by the wireless IOT device of the tracking system, the second task from the second node, the wireless IOT device acting as a slave in response to receiving instructions to perform the second task.

20. The method of claim 19, wherein prior to the performing the second task, the wireless IOT device and the second node achieve consensus that the wireless IOT device is an optimal agent for performing the second task.

* * * * *